United States Patent [19]

Noda et al.

[11] 3,950,608

[45] Apr. 13, 1976

[54] ELECTRONIC ENGRAVING AND RECORDING SYSTEM

[75] Inventors: Katsuhiko Noda; Taisuke Watanabe; Katsuyuki Niyada, all of Kawasaki, Japan

[73] Assignee: Matsushita Electric Industrial Co., Ltd., Osaka, Japan

[22] Filed: Feb. 21, 1974

[21] Appl. No.: 444,678

[30] Foreign Application Priority Data

Feb. 22, 1973 Japan ............................... 48-21467
June 12, 1973 Japan ............................... 48-66650

[52] U.S. Cl. ....... 178/6.6 B; 178/6.6 R; 178/DIG. 6
[51] Int. Cl.² ........................................ H04N 1/29
[58] Field of Search .......... 178/6.6 B, 6.6 R, DIG. 6

[56] References Cited

UNITED STATES PATENTS

| | | | |
|---|---|---|---|
| 3,075,895 | 1/1963 | MacLean | 178/6.6 B |
| 3,246,079 | 4/1966 | Teucher | 178/6.6 B |
| 3,396,401 | 8/1968 | Nonomura | 178/6.6 B |
| 3,506,779 | 4/1970 | Brown | 178/6.6 B |
| 3,728,712 | 4/1973 | Nagai | 178/DIG. 6 |
| 3,758,713 | 9/1973 | Sekimoto | 178/6.6 R |
| 3,770,888 | 11/1973 | Vos | 178/6.6 B |

FOREIGN PATENTS OR APPLICATIONS

| | | | |
|---|---|---|---|
| 878,474 | 9/1961 | United Kingdom | 178/6.6 B |

*Primary Examiner*—Bernard Konick
*Assistant Examiner*—Alan Faber
*Attorney, Agent, or Firm*—Stevens, Davis, Miller & Mosher

[57] ABSTRACT

An electronic engraving and recording system comprising a television camera for picking up an image of an object and converting this image into an electrical signal, means for generating control signals on the basis of the synchronizing signal used in the television camera, memory means for storing the electrical signal under control of the control signals, means for engraving and recording the image according to the signal read out from the memory means under control of the control signals, and monitoring display means for displaying the visible image of the object in response to the application of the signal read out from the memory means. An image of an object can be simply engraved and recorded on a card within a short period of time without requiring any photographic original of the object.

11 Claims, 57 Drawing Figures

ELECTRONIC ENGRAVING AND RECORDING SYSTEM

This invention relates to electronic engraving and recording systems, and more particularly to a system of the kind above described which can electronically engrave and record an image of an object on a sheet such as a card of suitable material which has a flat and smooth surface and is highly endurable against wear.

Various attempts have heretofore been made for the identification of the true user of an identification card such as a credit card, ID card, bank card, cash dispenser card, oil card, key card, consultation ticket, communication ticket, or license card. For instance, in one of the prior attempts, a photographic print of the face or other features of a user is affixed to a base plate of a card. In another prior art attempt, a photographic print of the face or other features of a user is utilized as an original to produce a printing plate which is used to print a picture of the face or other features of the user on a base plate of a card.

These methods have however had various defects. For example, the former method of affixing a photographic picture of, for example, the face of a user is unsatisfactory from the standpoint of preventing possible forgery. That is, if the card were stolen or lost, the card may be used illicitly by replacing the photograph affixed to the card and the true user of the card may suffer from unexpected damage. Another defect of this prior art method resides in the fact that the thickness of the photograph-bearing portion of the card is increased by the amount corresponding to the thickness of the photograph so that when, for example, the card is magnetically verified by a suitable mechanical apparatus, an inconvenience is frequently encountered in the mechanical handling of the card. In the latter method which resorts to printing, an individual printing plate must be prepared for producing a single card. Thus, this latter method is also defective in that the manufacturing cost of such a card increases considerably. Further, either of these prior art methods is defective in that the photographic picture or printed picture of the face of the user manifested on the base plate of the card is inferior in durability, and therefore, it tends to be worn away during prolonged use of the card to such an extent that the identifying function thereof is finally lost making it difficult to certify the identity of the user during the valid term of the card.

It is therefore an object of the present invention to provide an electronic engraving and recording system which eliminates the necessity for preparing a photographic original of an object such as a person.

Another object of the present invention is to provide an electronic engraving and recording system in which a visible image, which is a magnified image of an image to be engraved on a card and having exactly the same magnification with respect to the length and width is displayed on a visible image display means so that such image can be easily monitored.

The electronic engraving and recording system according to the present invention includes image pickup means for picking up an image of an object such as a person whose picture is to be engraved on a card, signal storage means for storing a digital signal obtained by converting an analog signal representative of a still picture of the image picked up by the pickup means, means for reading out the digital signal stored in the storage means and converting same into an analog signal, visible image display means or monitoring means for displaying a visible image in response to the application of the analog signal from the D-A converting means, and engraving means for engraving the image corresponding to the still picture of the object on a card which is highly endurable against wear.

Other objects, features and advantages of the present invention will become apparent from the following detailed description taken in conjunction with the accompanying drawings, in which.

Figure 3A:
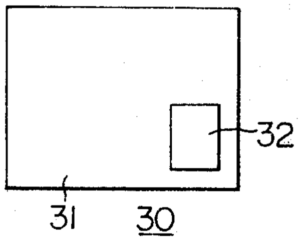
Figure 3B:
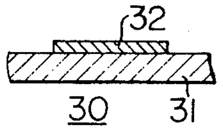
Figure 4:
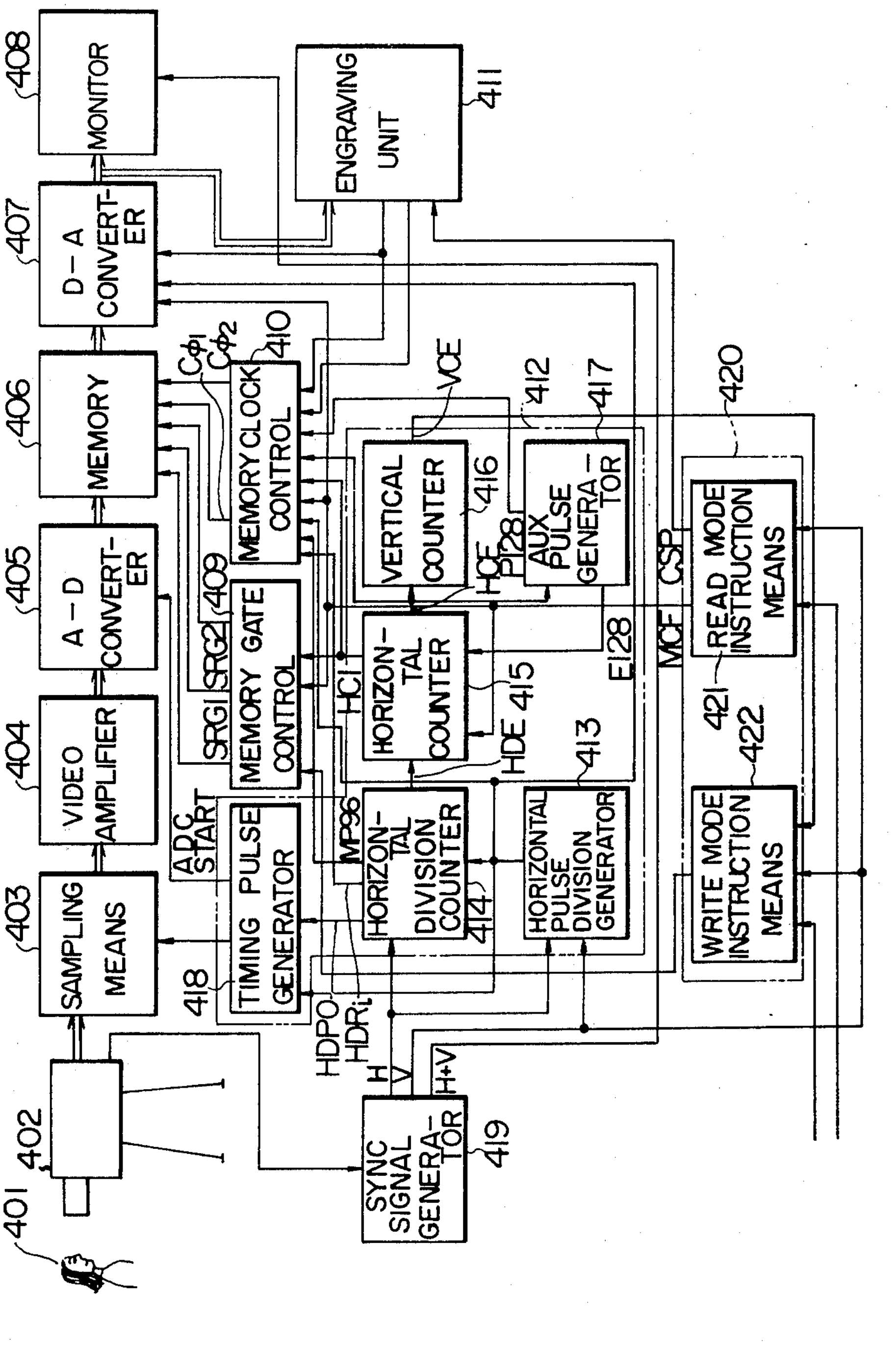
Figure 5:
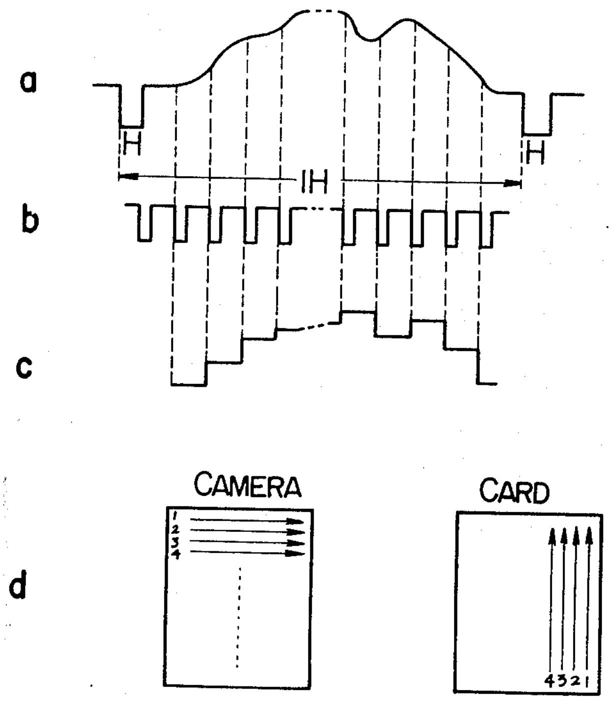
Figure 6:
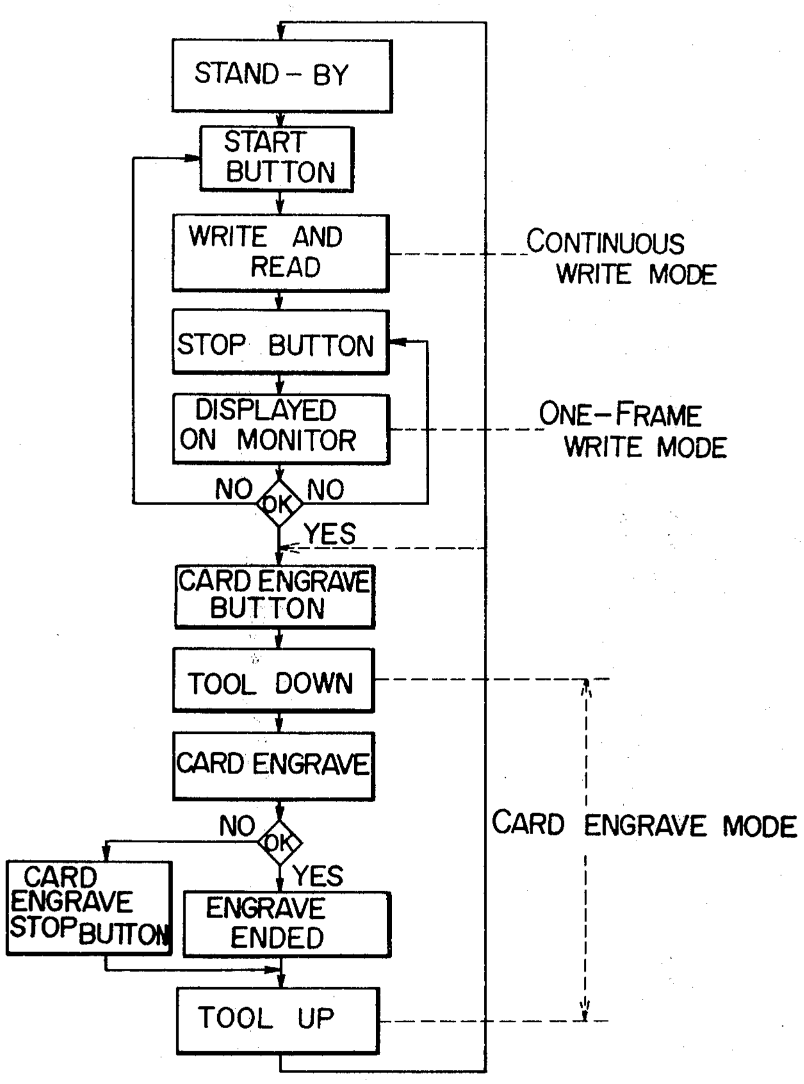
Figure 7:
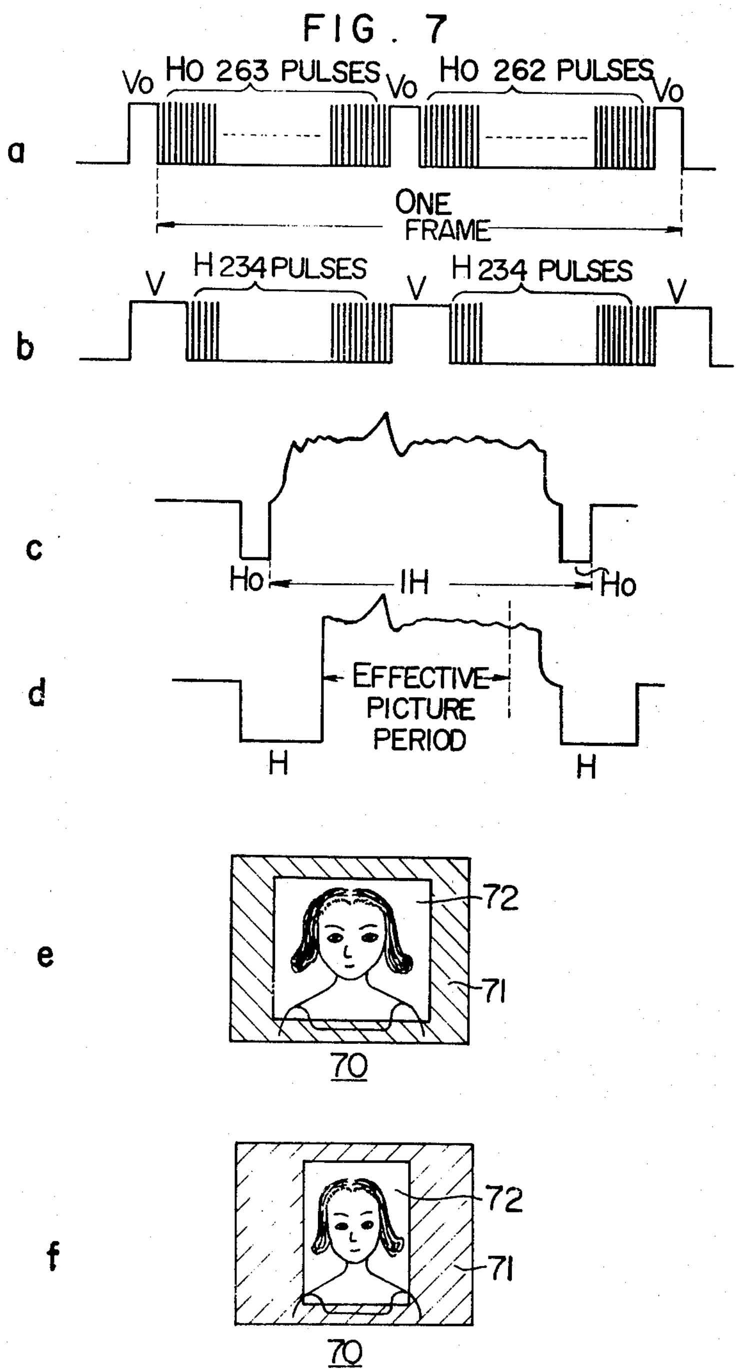
Figure 8:
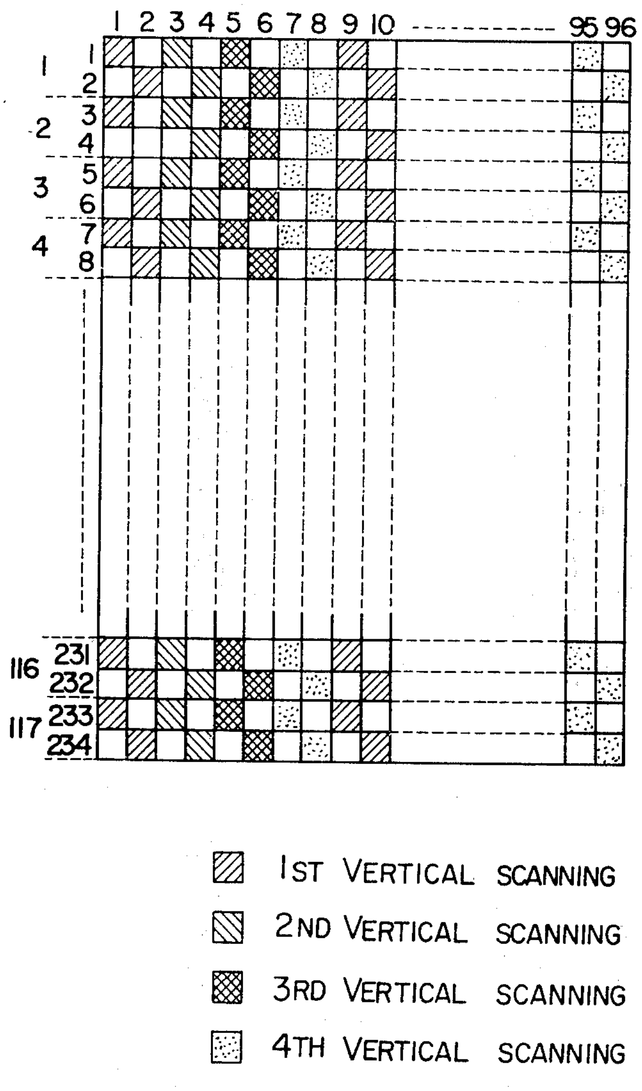
Figure 9:
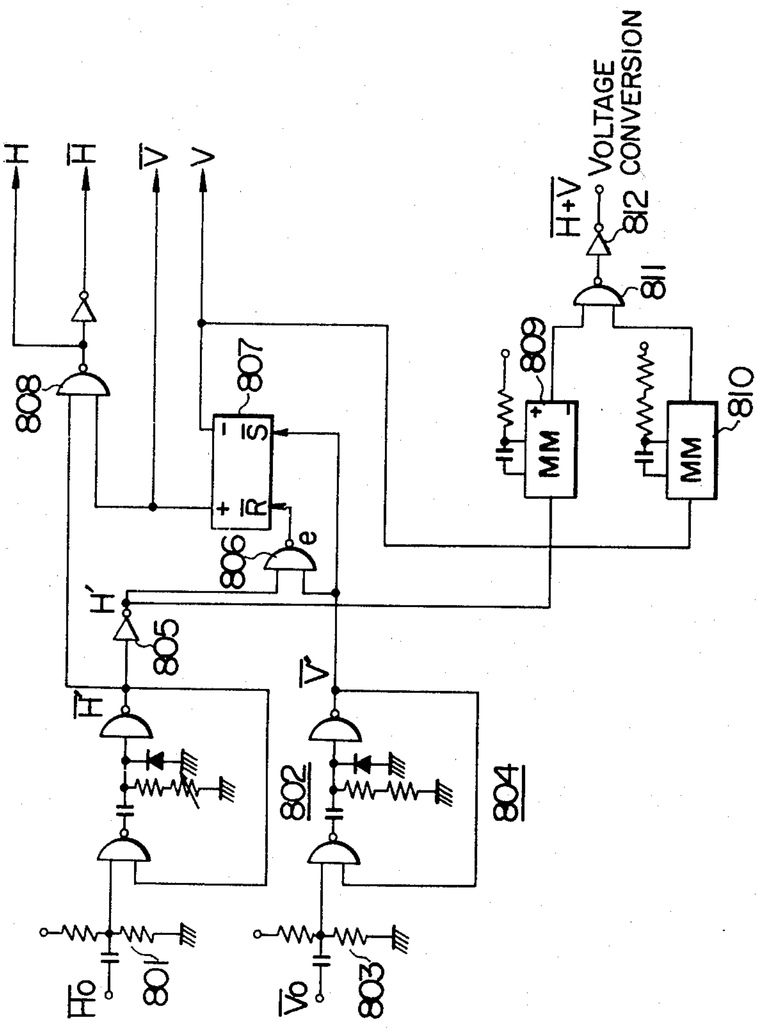
Figure 10:
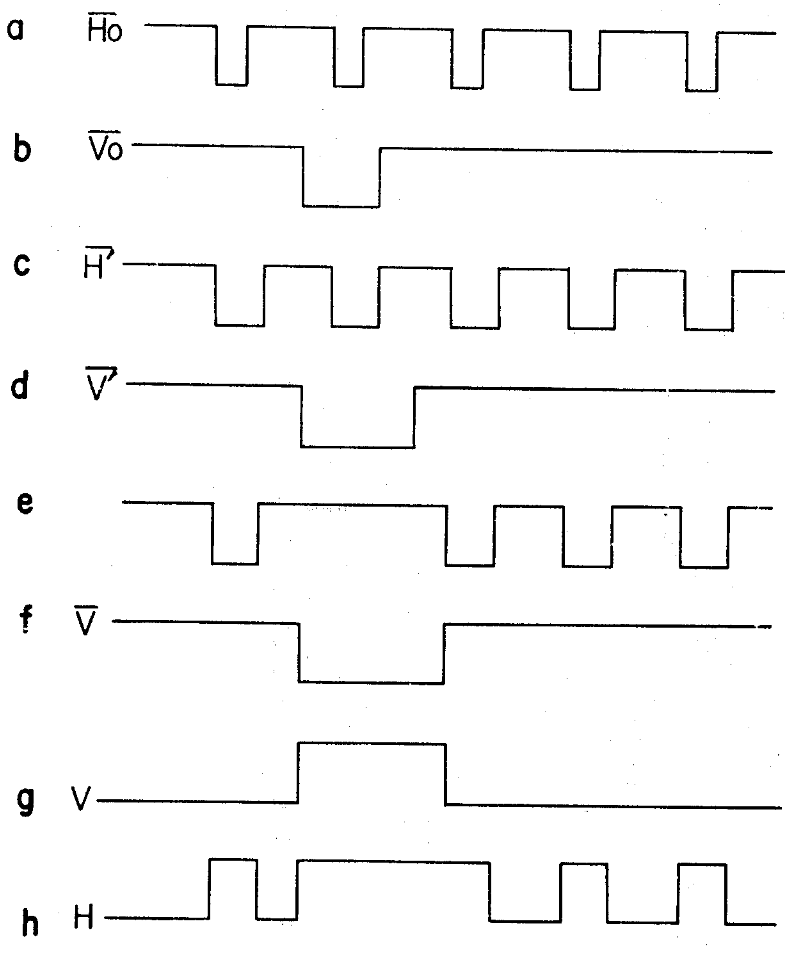
Figure 11:
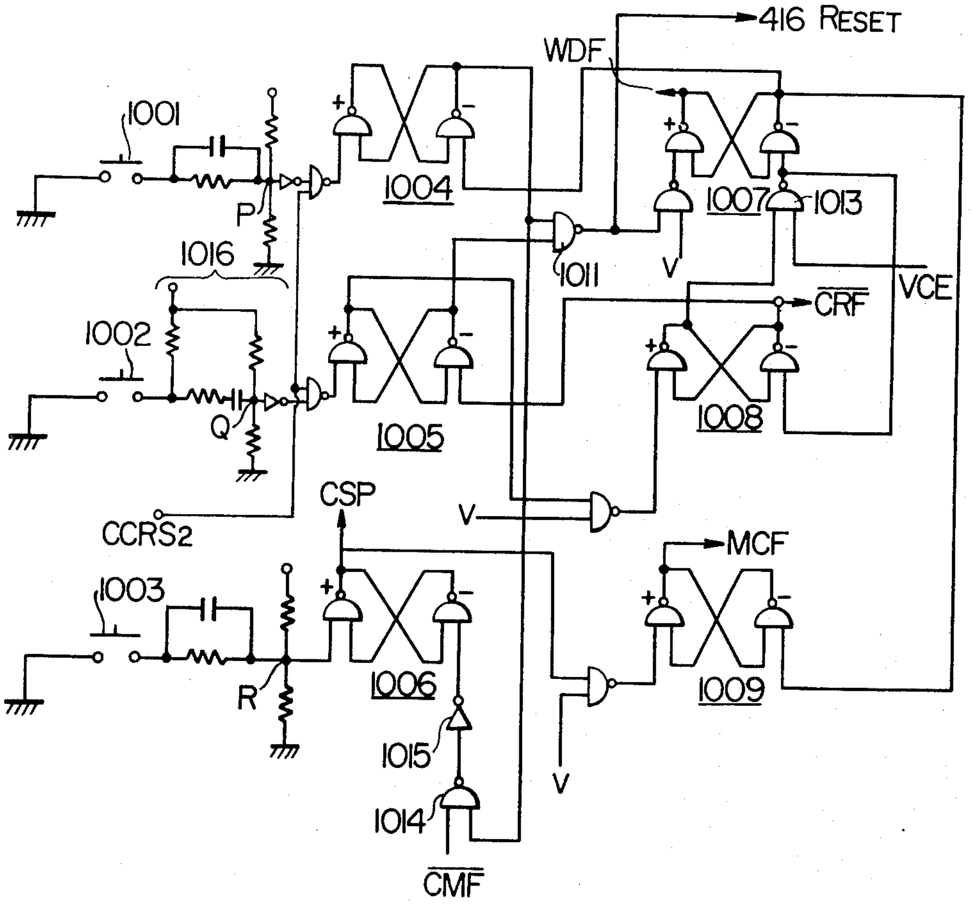
Figure 12:
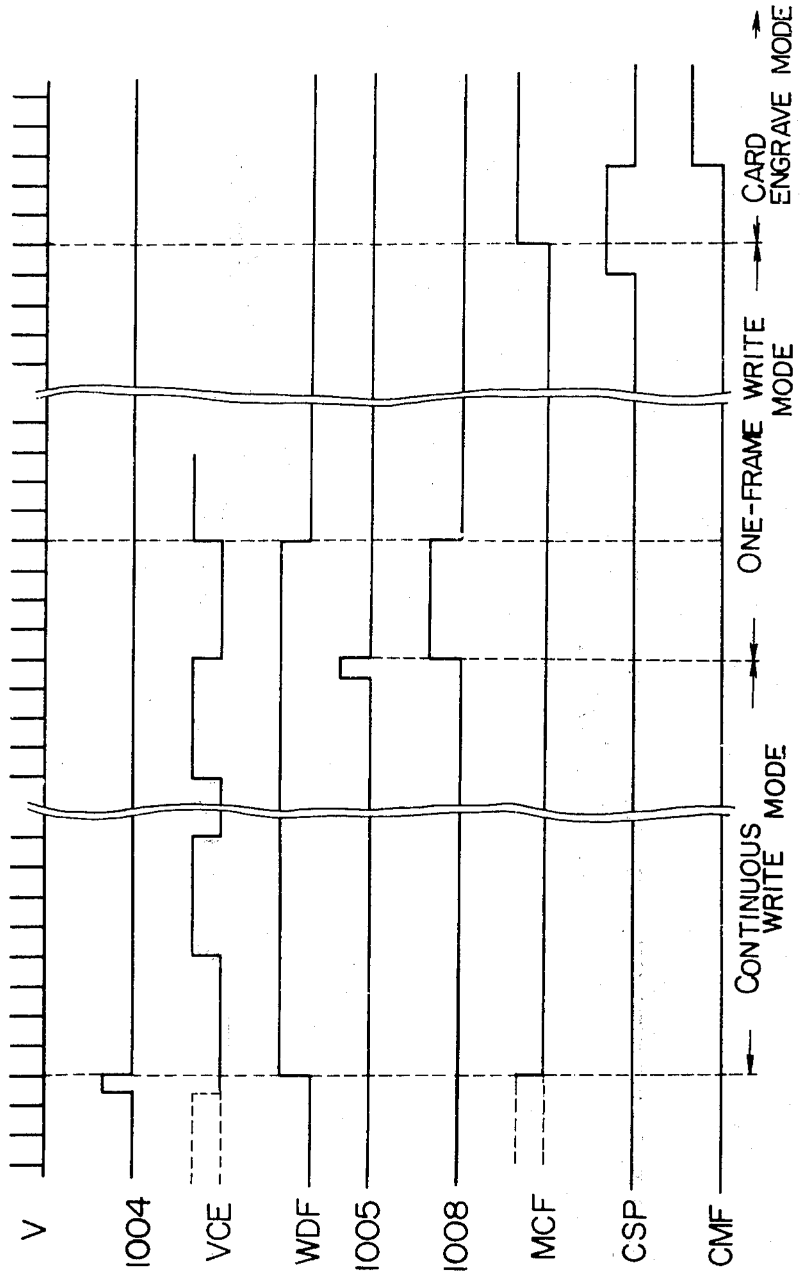
Figure 13:
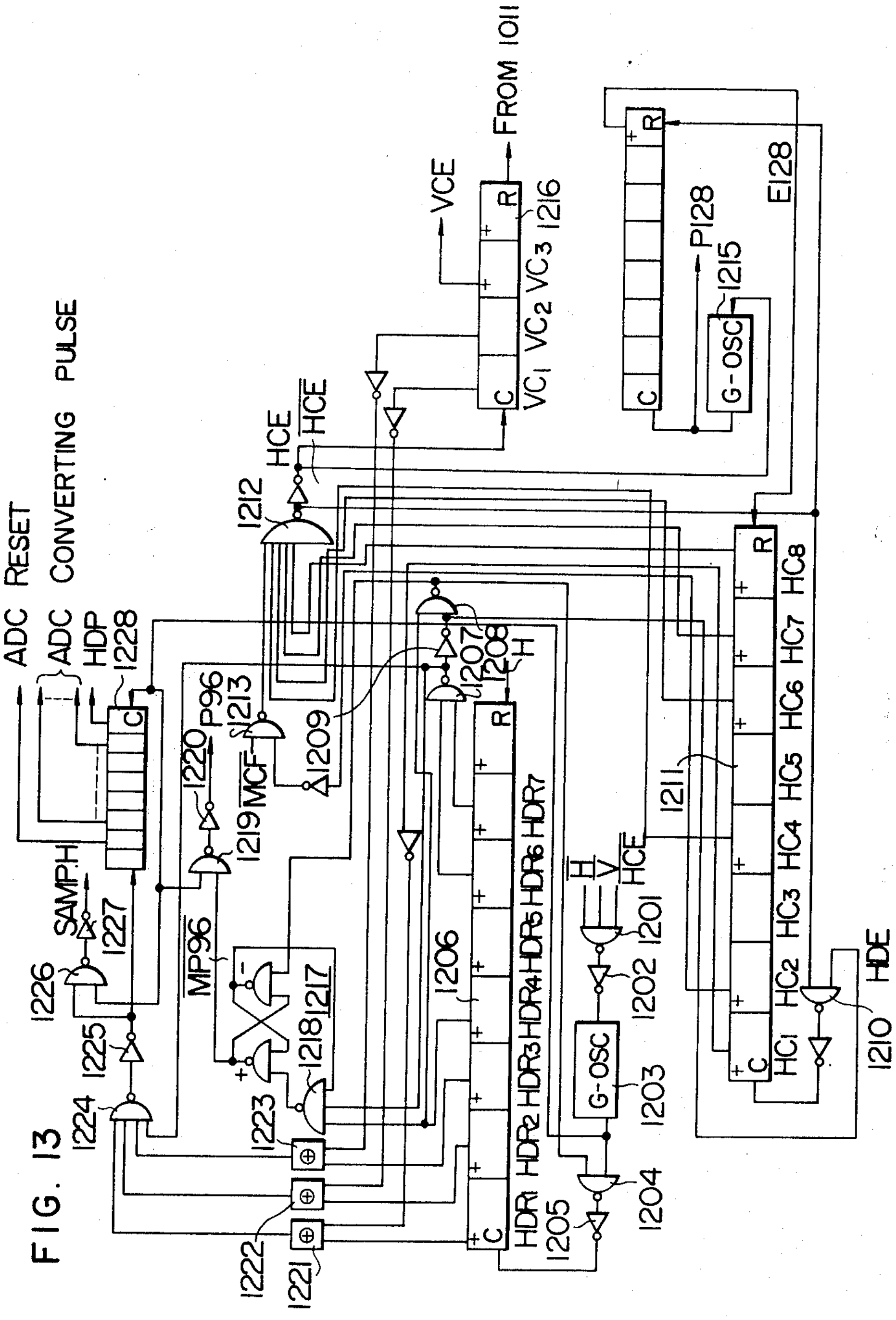
Figure 14:
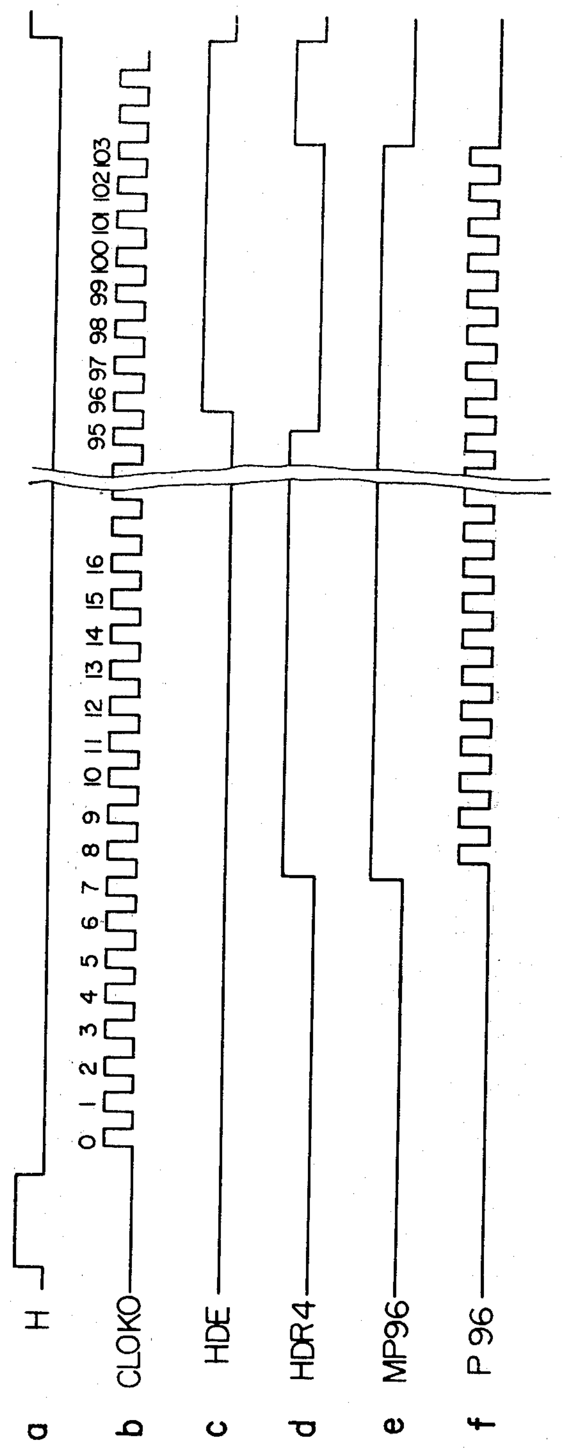
Figure 15:
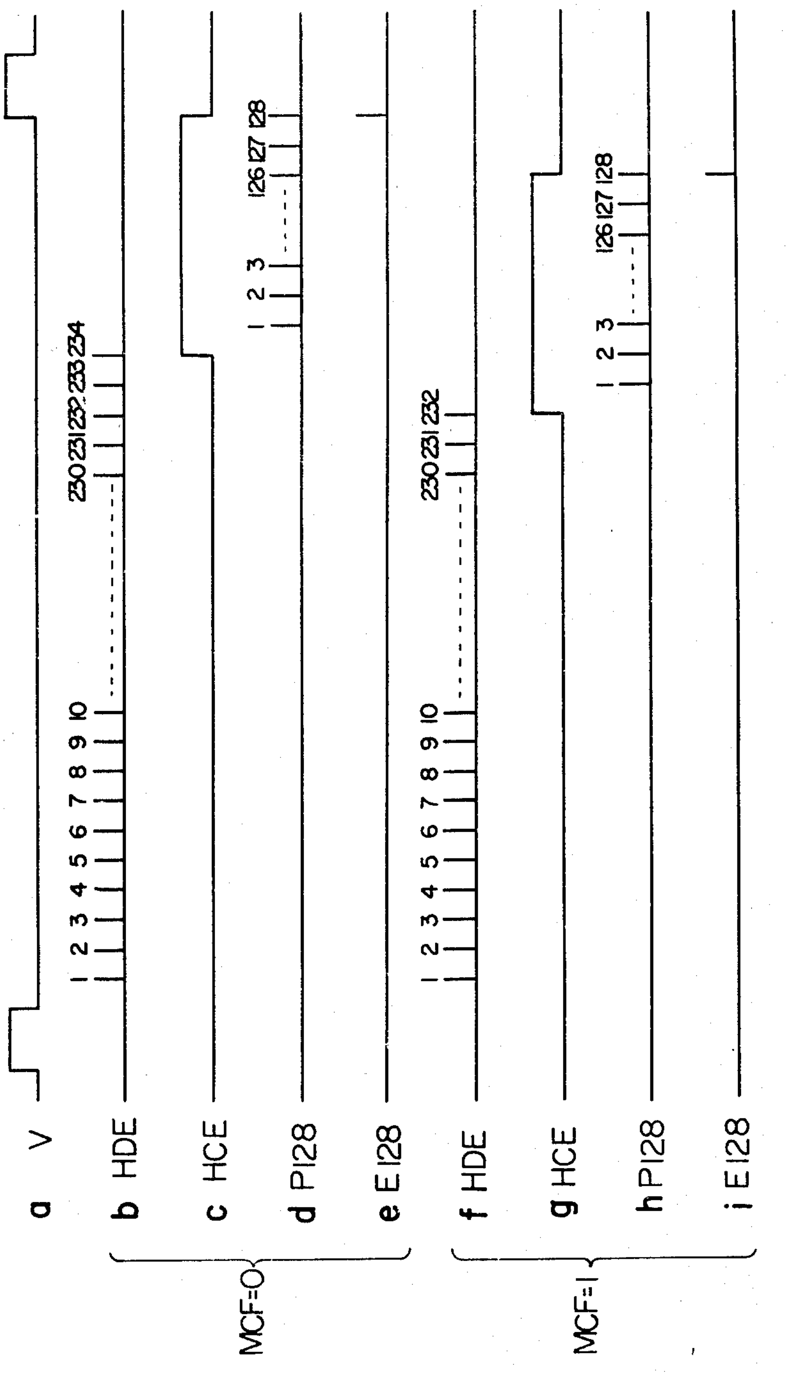
Figure 18:
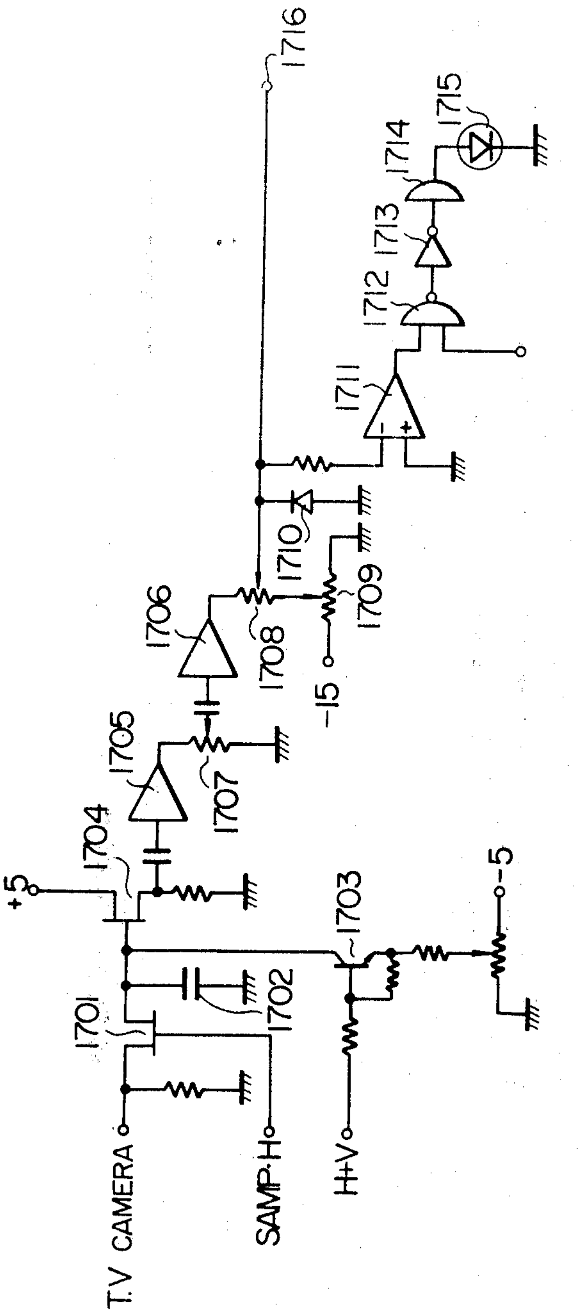
Figure 19:
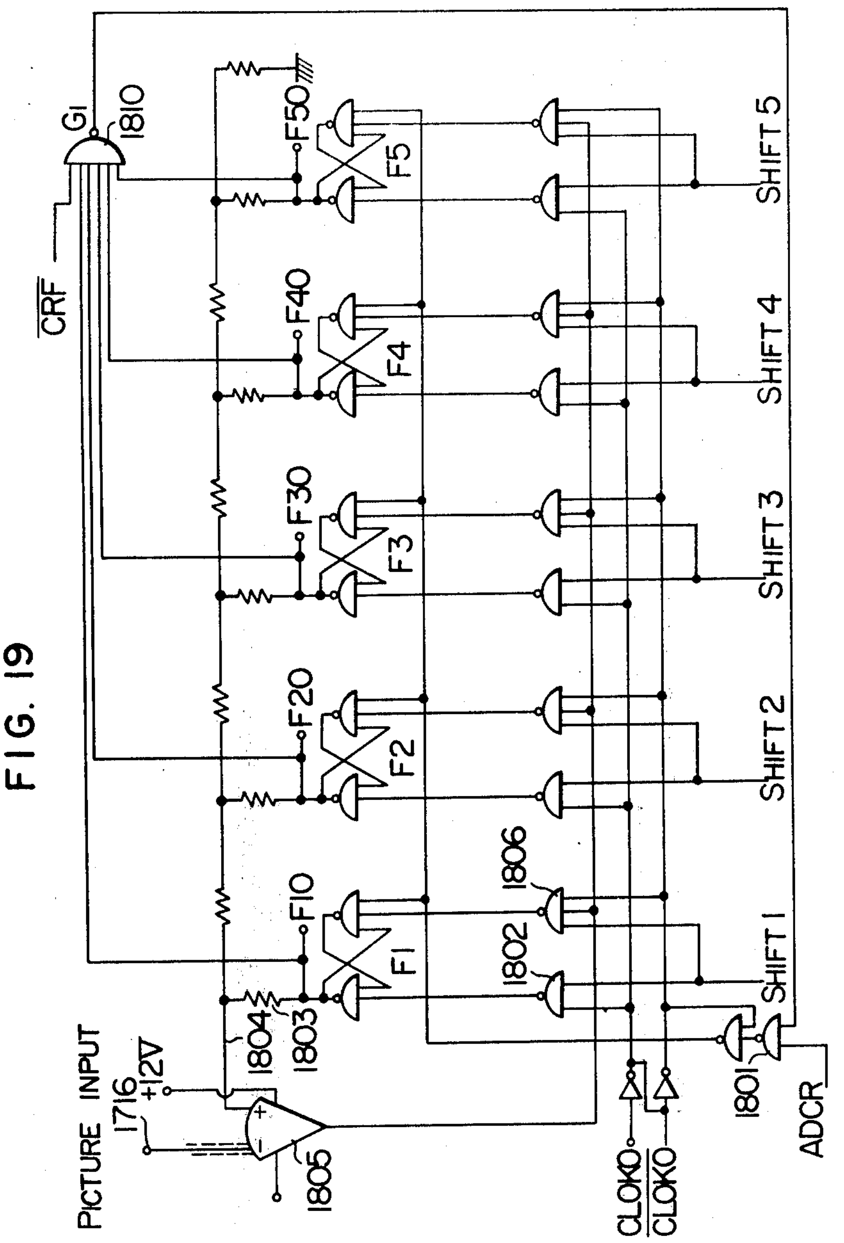
Figure 20:
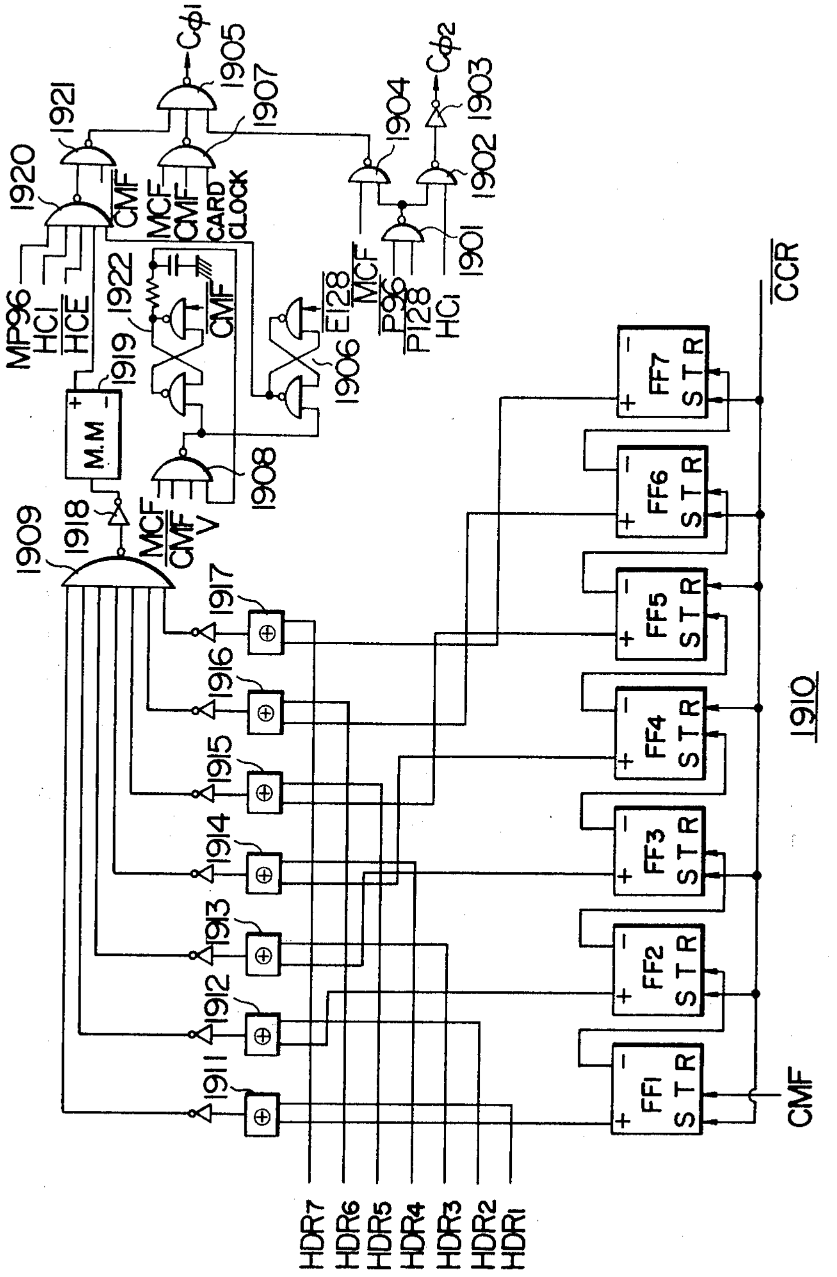
Figure 21:
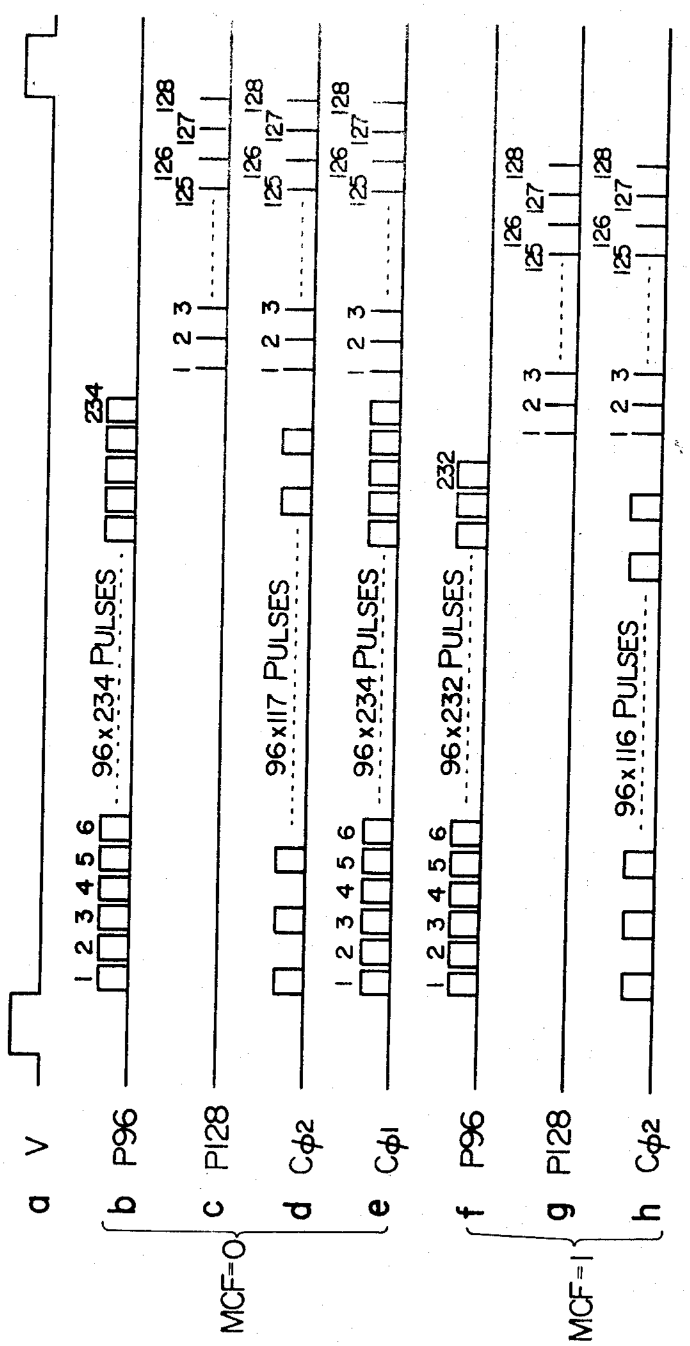
Figure 22:
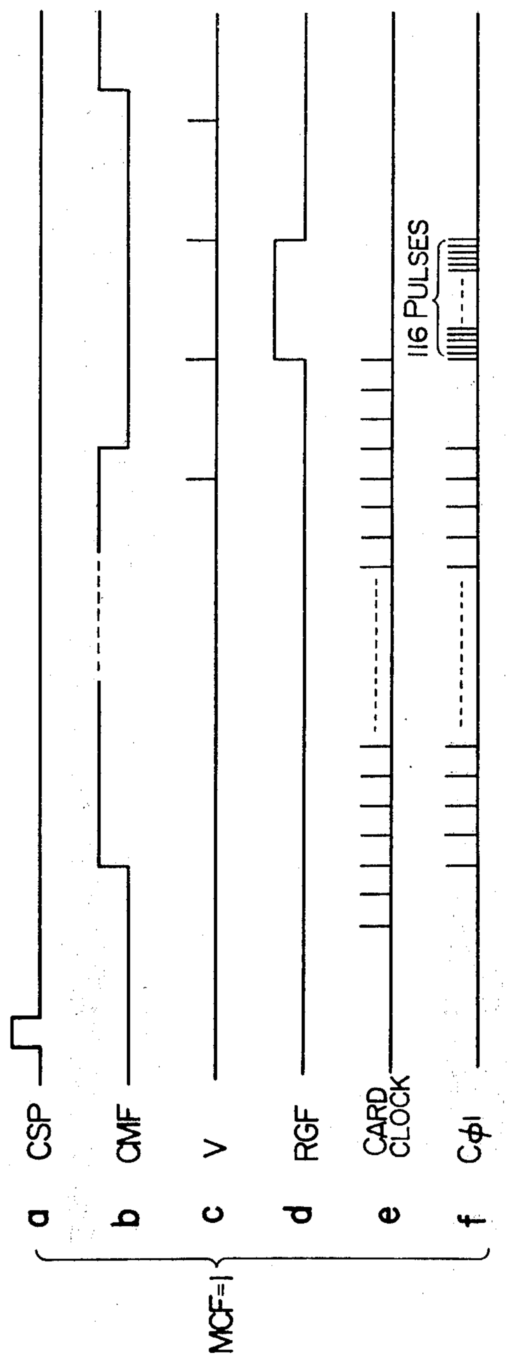
Figure 23:
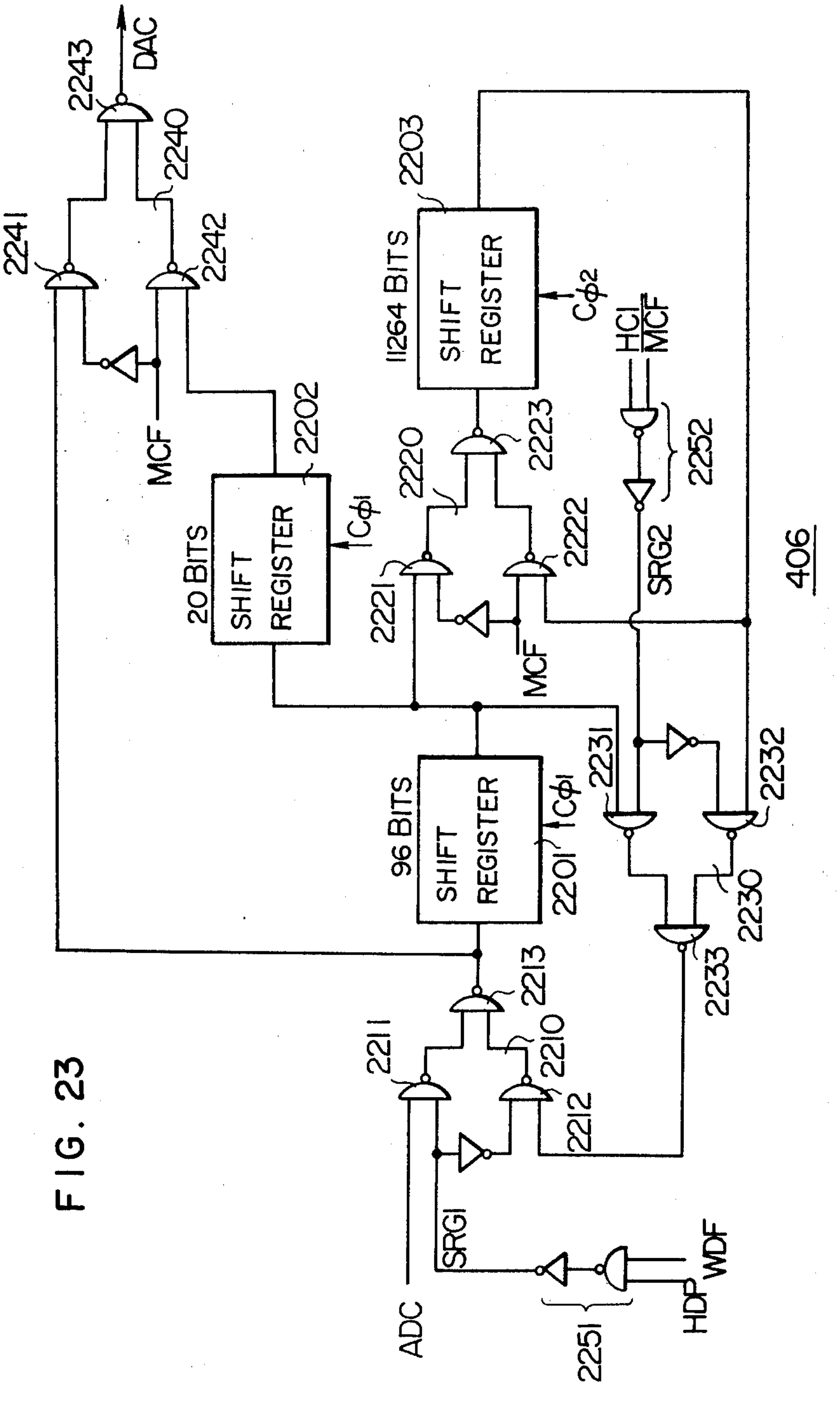
Figure 24:
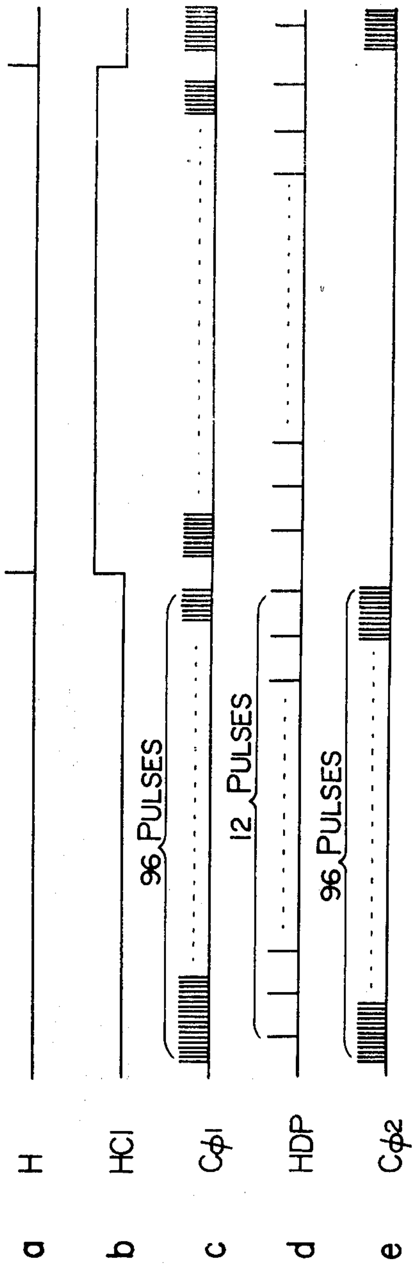
Figure 26:
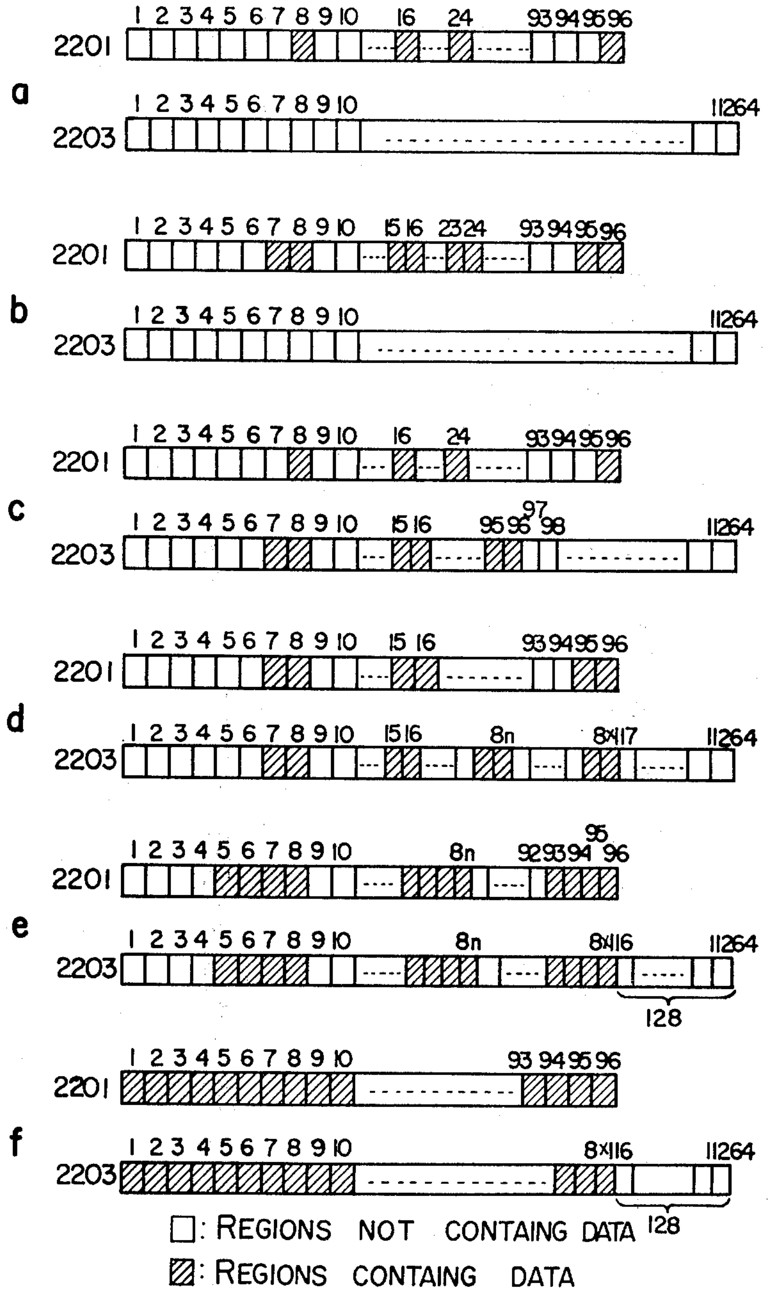
Figure 28:
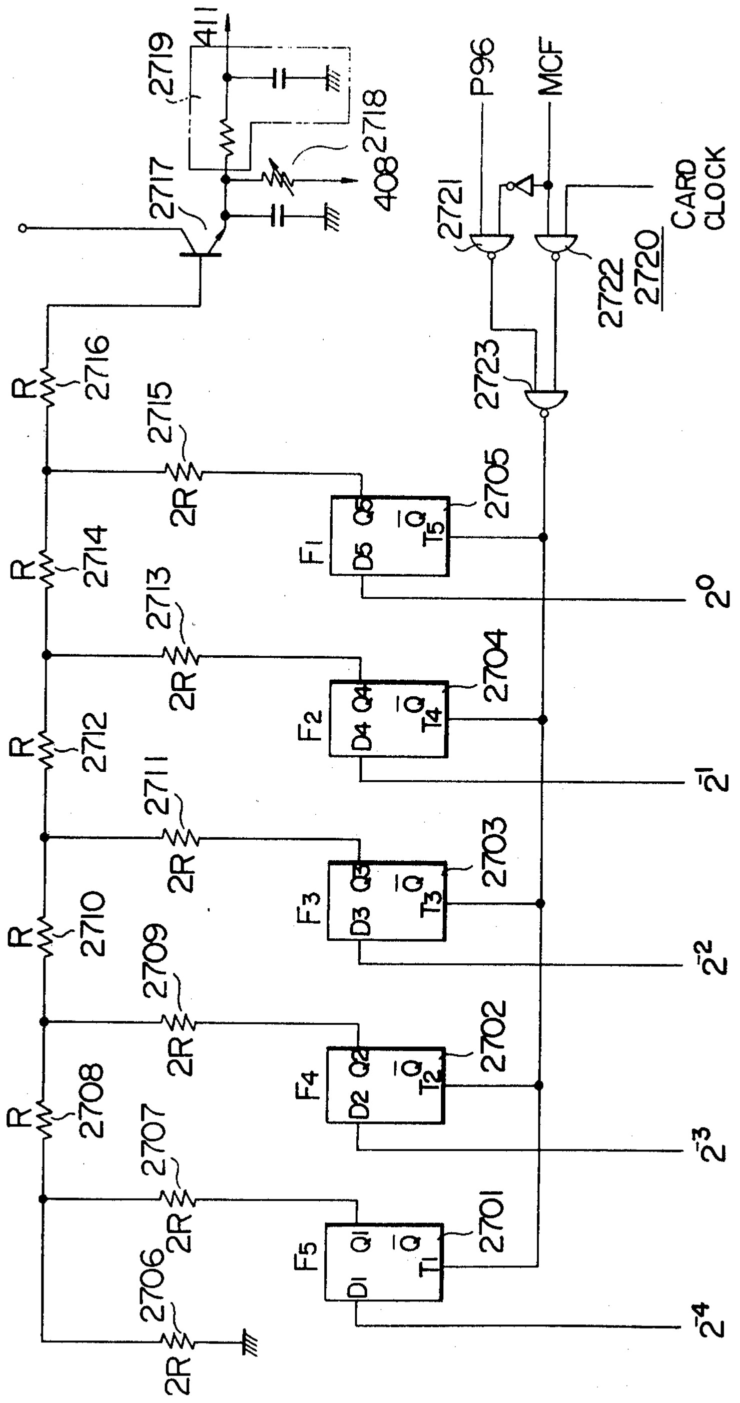
Figure 29:
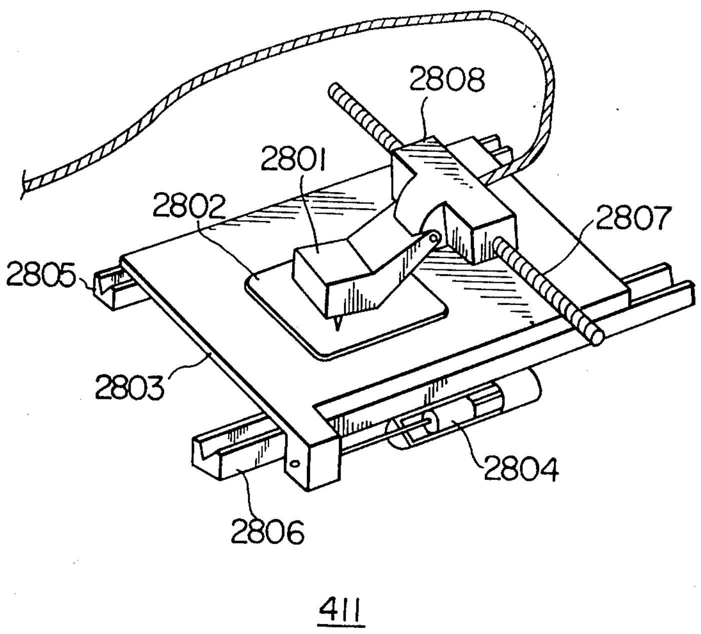
FIG. 29 PRIOR ART
Figure 30:
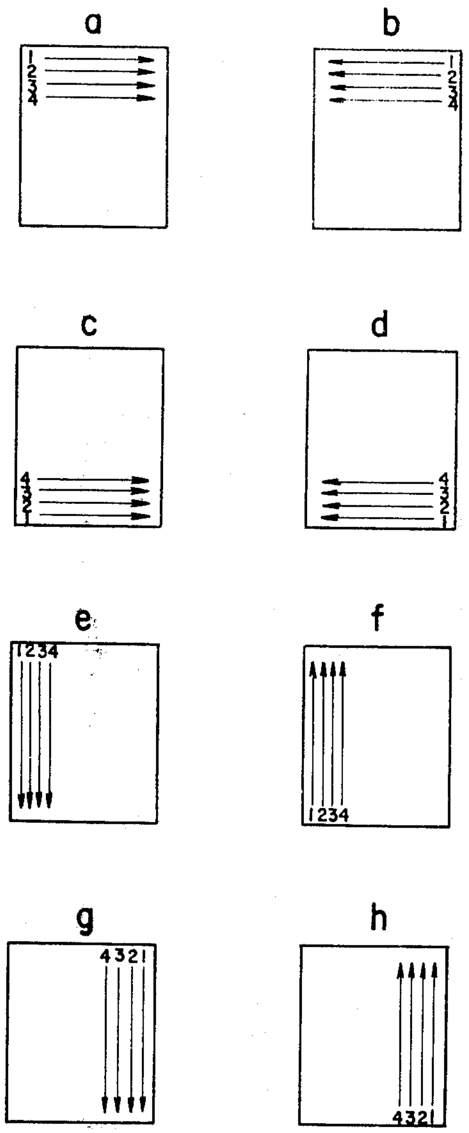
Figure 31:
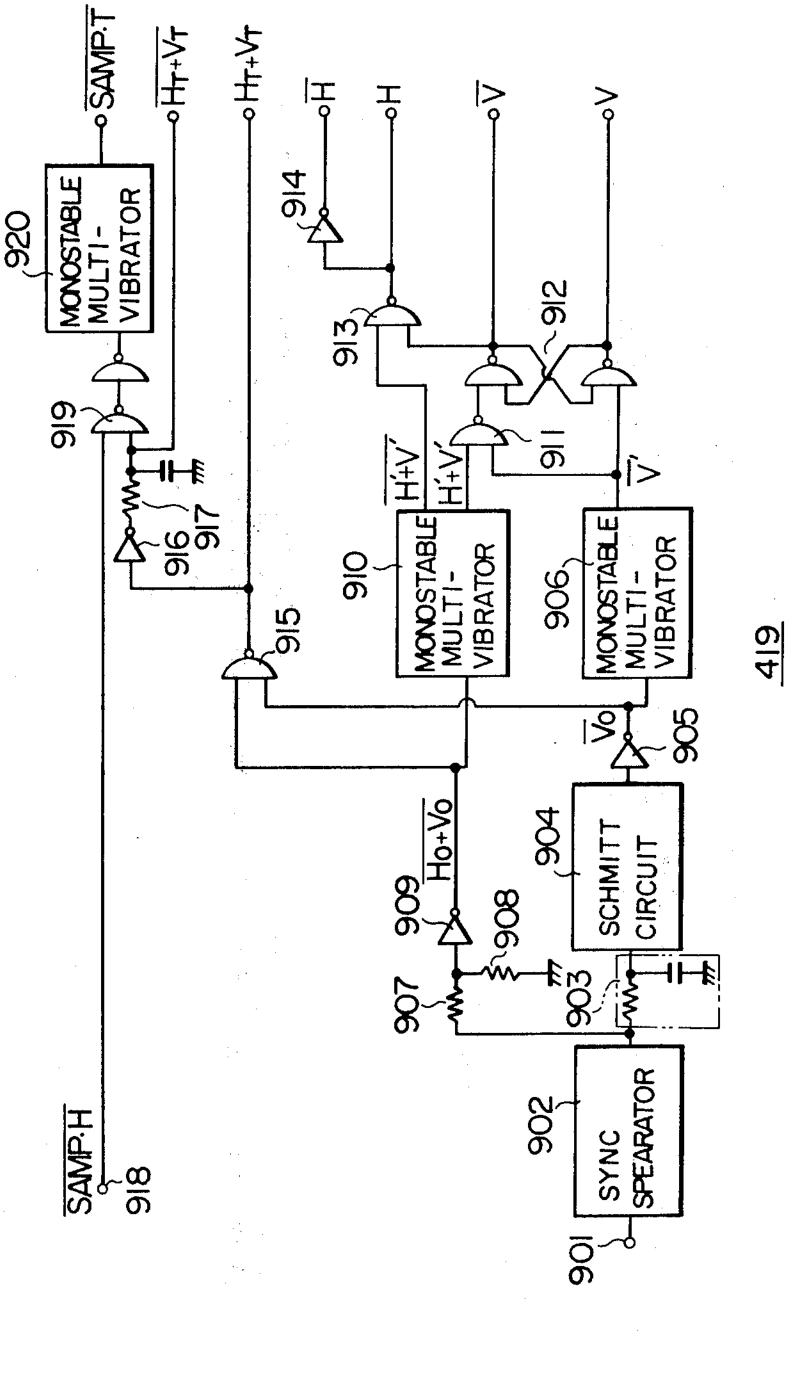
Figure 32:
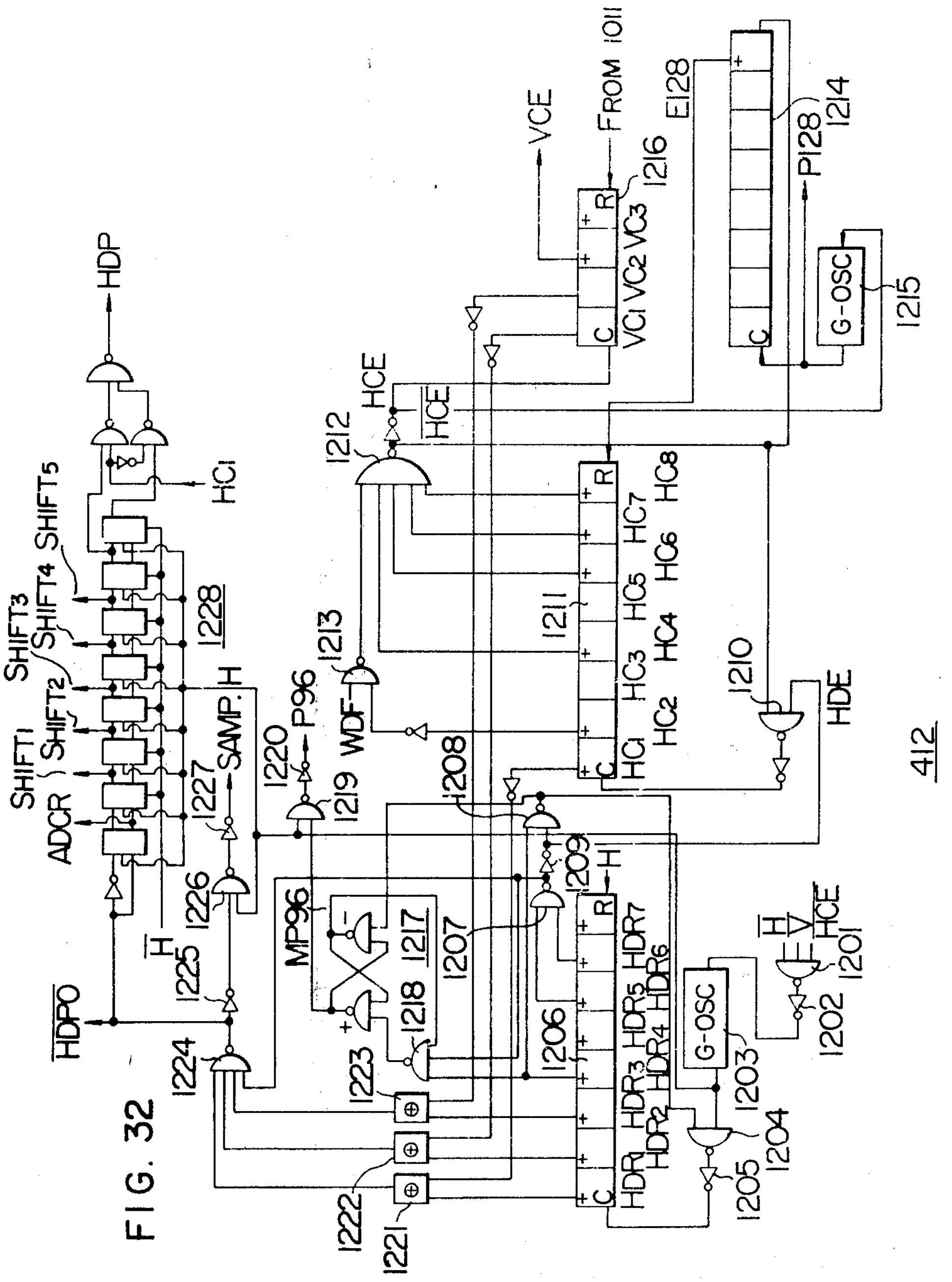
Figure 33:
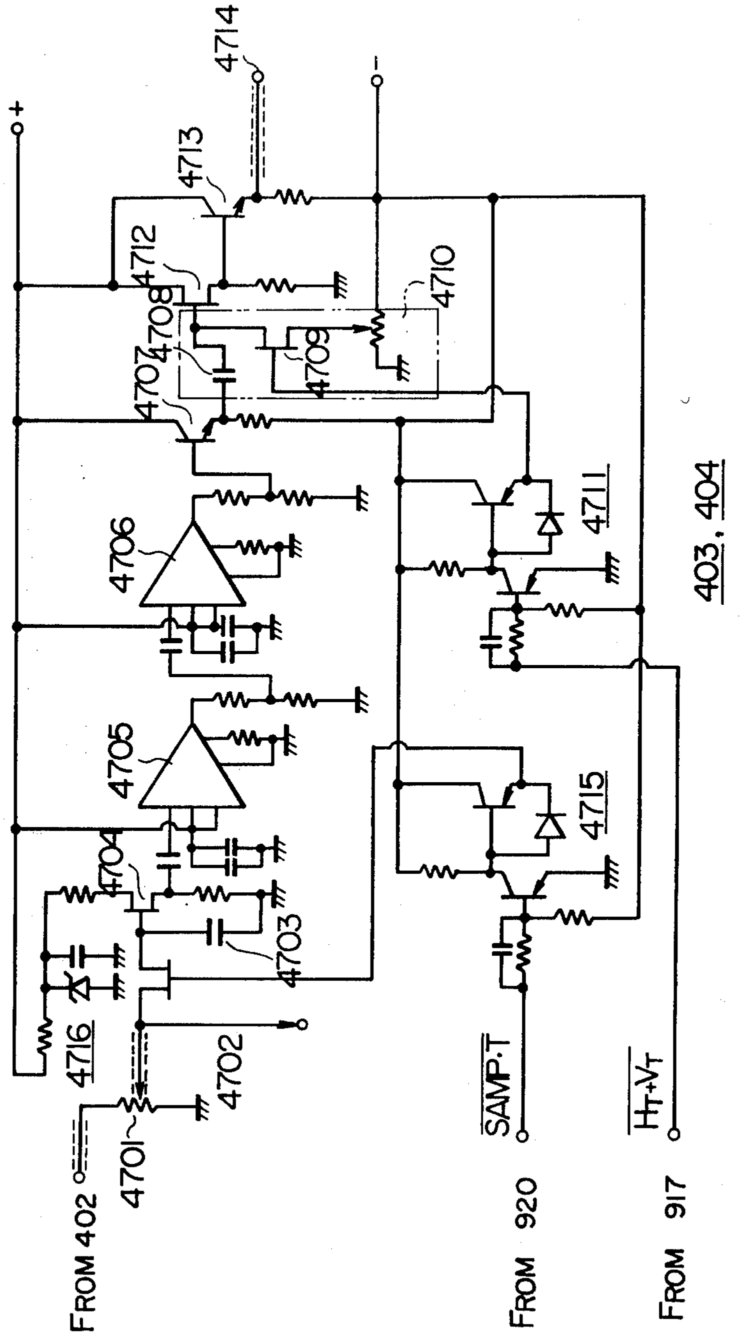
Figure 34:
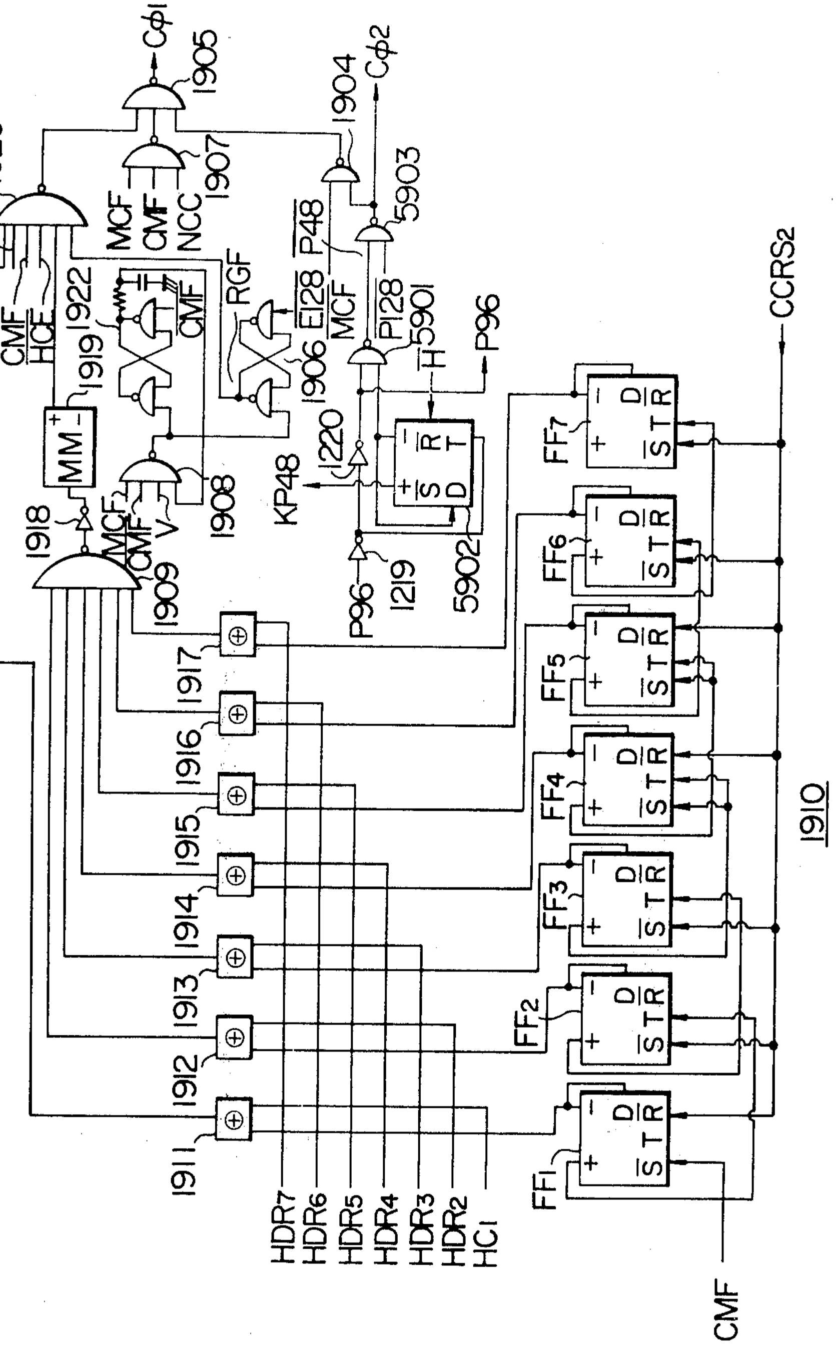
Figure 35:
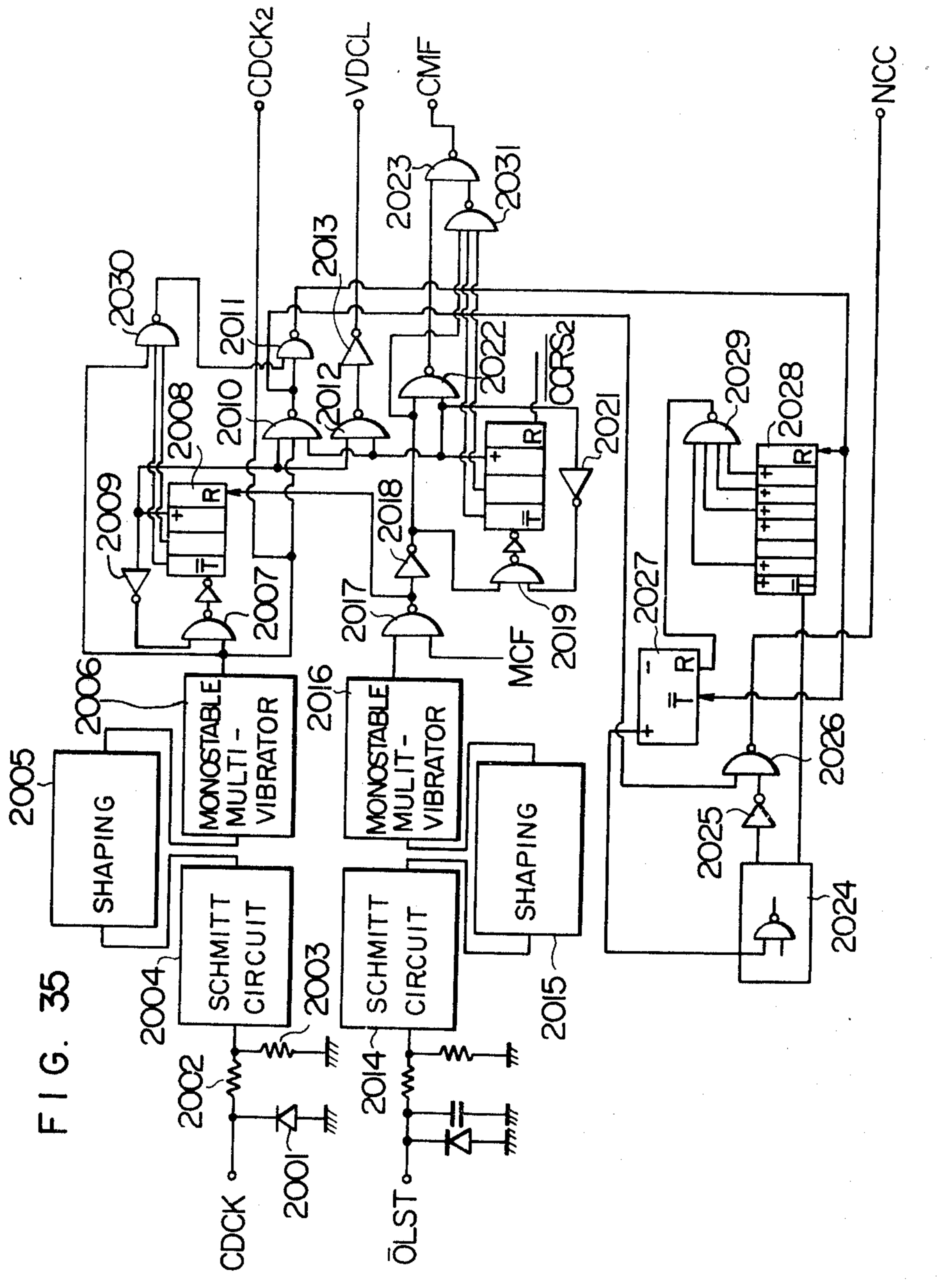
Figure 36:
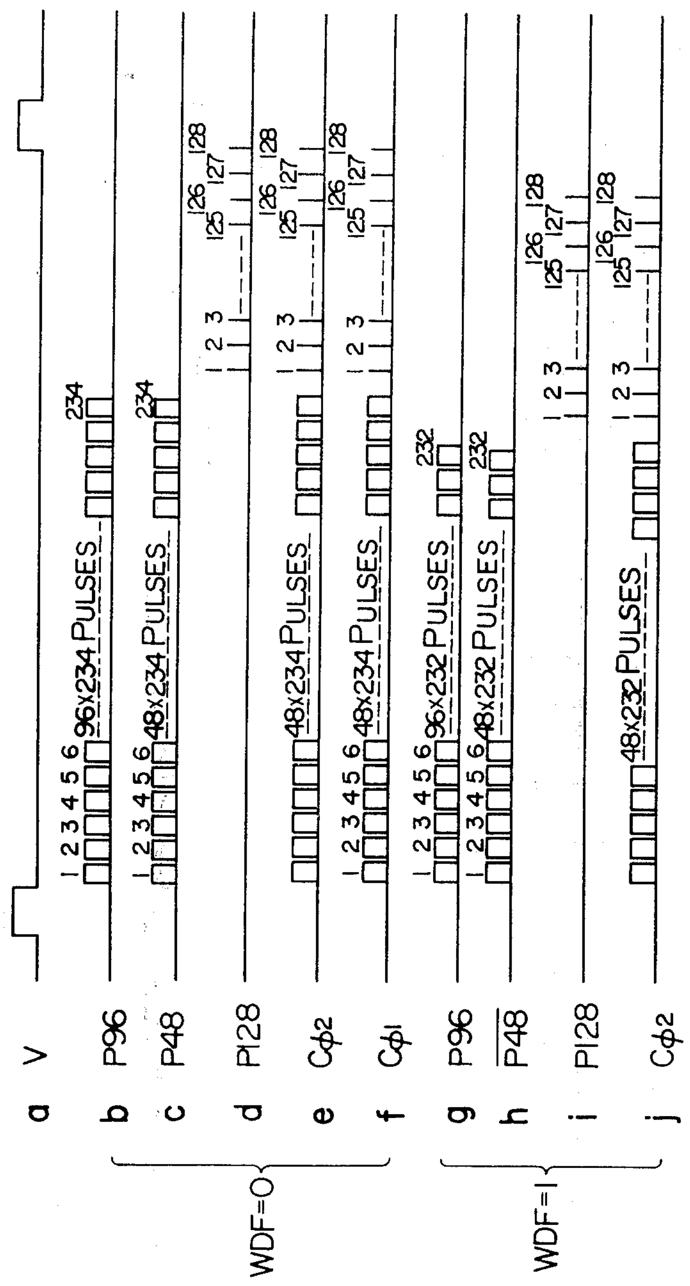
Figure 37:
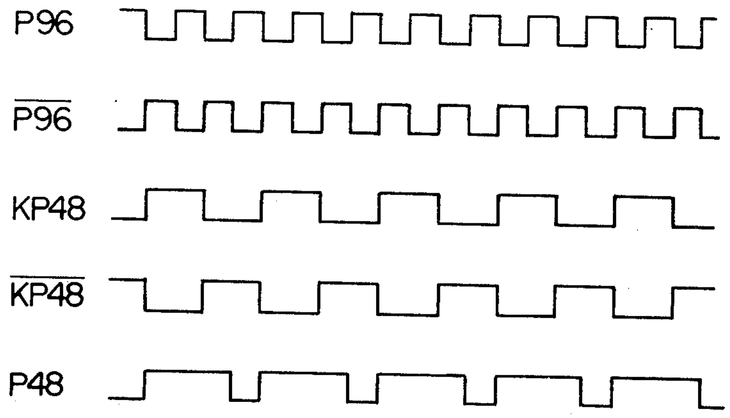
Figure 38:
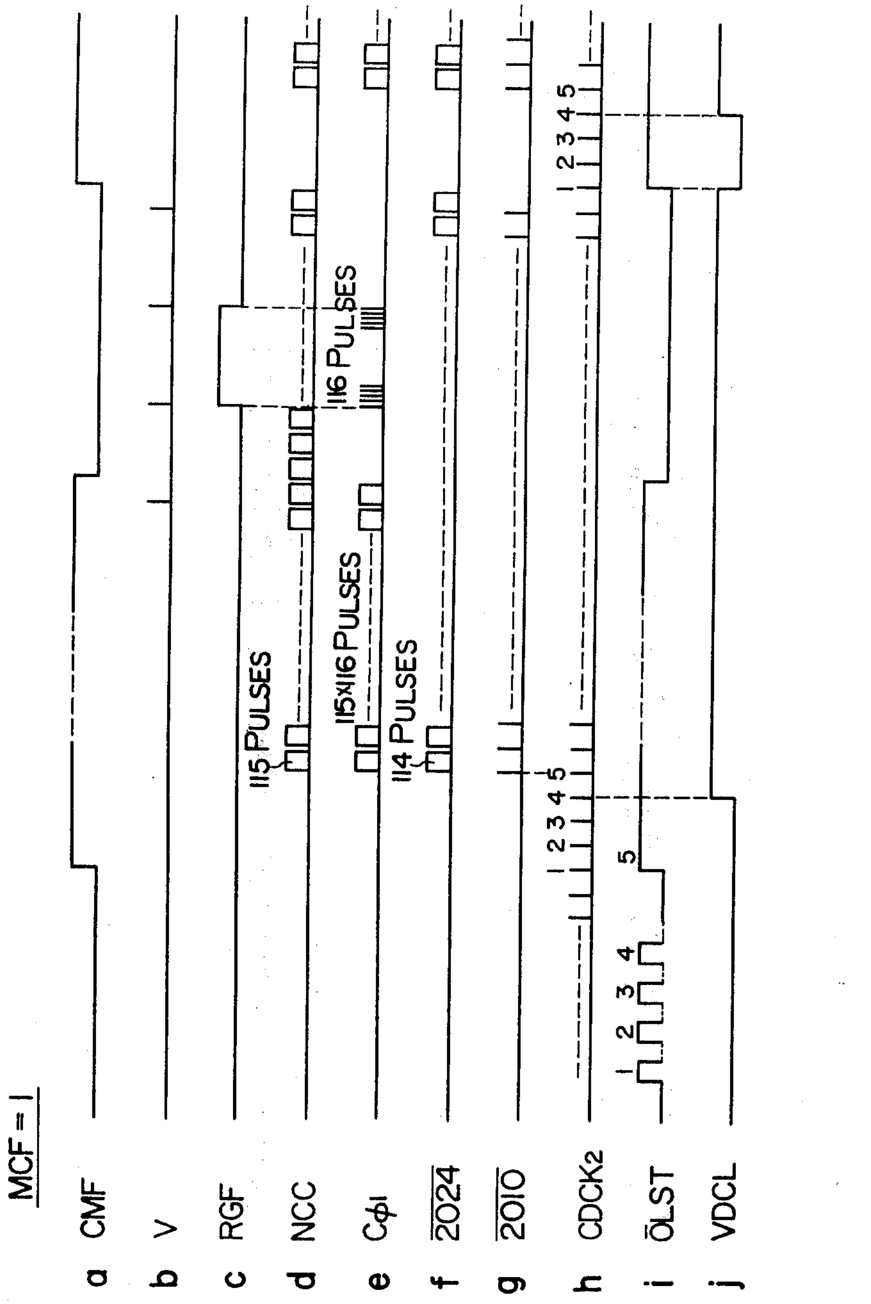
Figure 39:
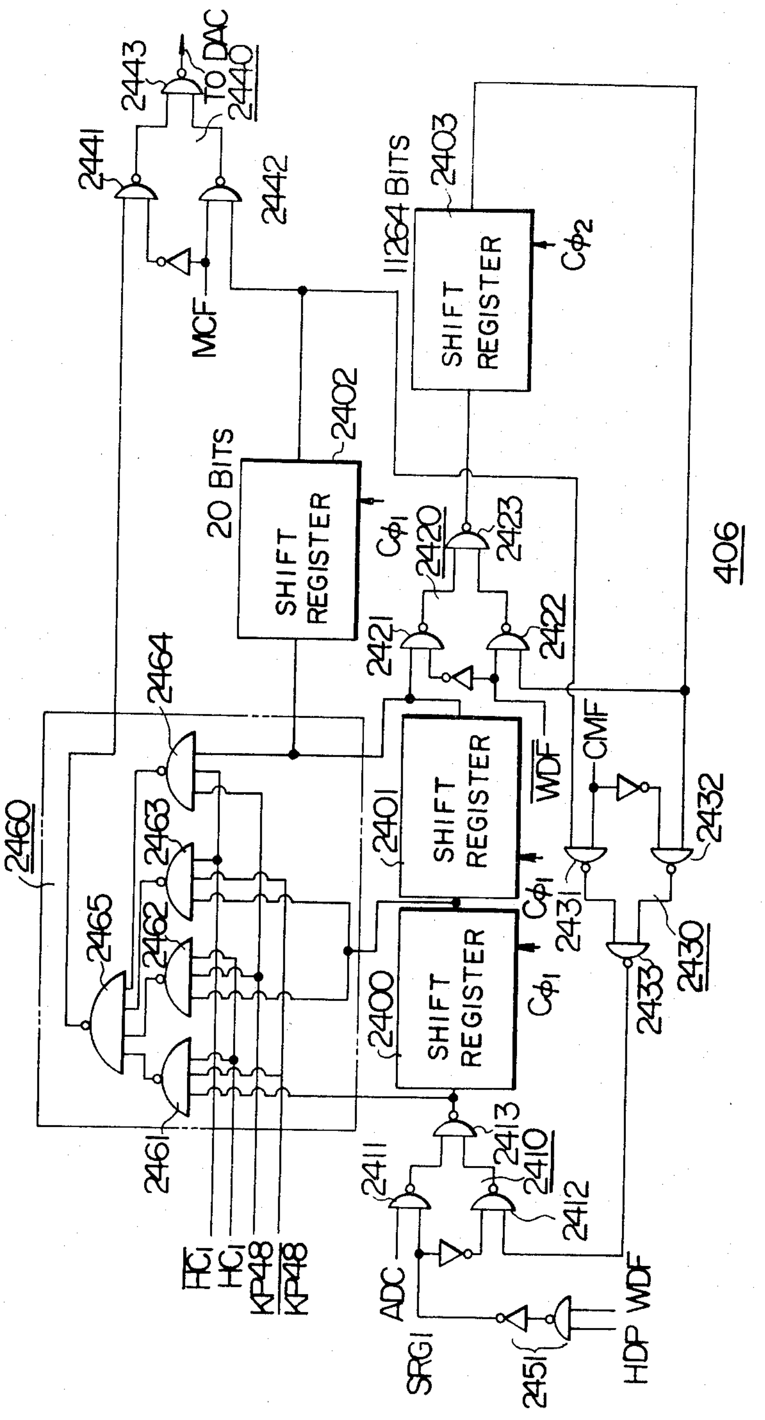
Figure 40:
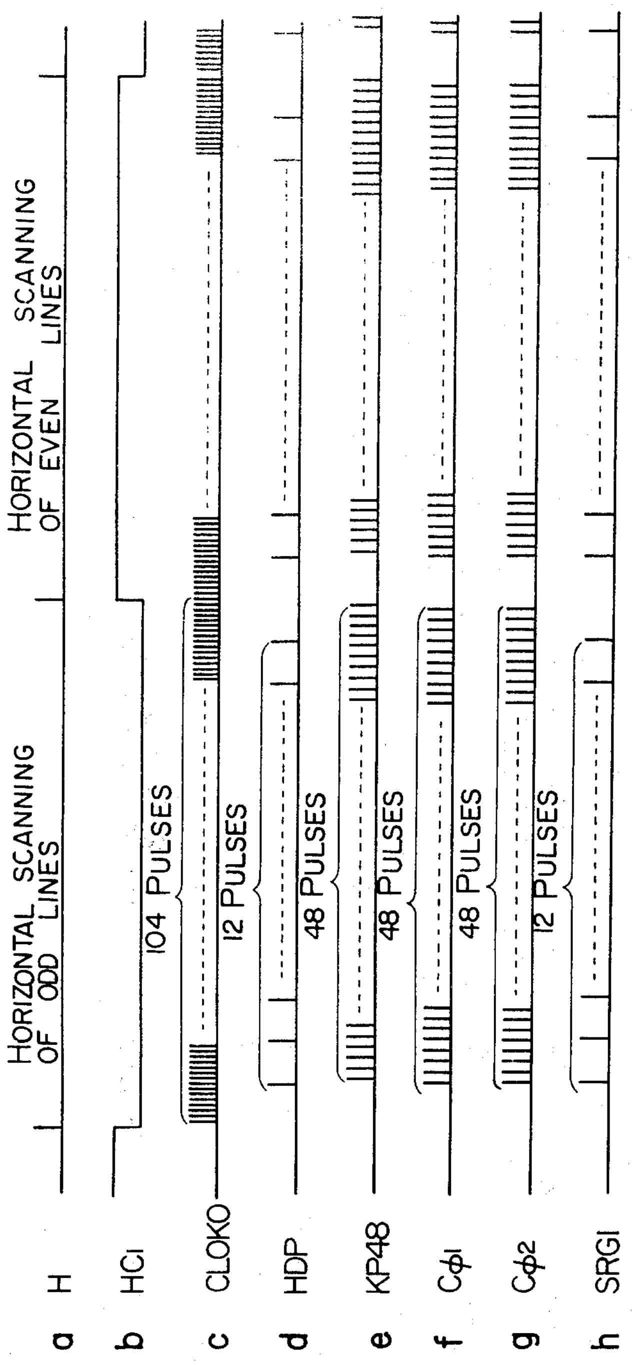

FIGS. 3*a* and 3*b* are a schematic plan view and a schematic sectional view respectively of a card blank preferably used in the present invention, in which engraving is not yet performed;

FIG. 4 is a block diagram showing the structure of an embodiment of the electronic engraving and recording system according to the present invention;

FIG. 5 shows sampling and sampled waveforms and scanning and engraving directions for illustrating the operation of the system shown in FIG. 4;

FIG. 6 is a flow chart for illustrating the operation of the system shown in FIG. 4;

FIG. 7 shows a manner of picture signal processing in the present invention;

FIG. 8 illustrates picture sampling positions in the present invention;

FIG. 9 is a circuit diagram showing one practical structure of the synchronizing signal generating or reshaping circuit in the system shown in FIG. 4;

FIG. 10 shows waveforms appearing at various parts of the circuit shown in FIG. 9;

FIG. 11 is a circuit diagram showing one practical structure of the mode instructing circuit in the system shown in FIG. 4;

FIG. 12 shows waveforms appearing at various parts of the circuit shown in FIG. 11;

FIG. 13 is a circuit diagram showing one practical structure of the control signal generating circuit in the system shown in FIG. 4;

FIGS. 14 to 17 show waveforms appearing at various parts of the circuit shown in FIG. 13;

FIG. 18 is a circuit diagram showing one practical structure of the sampling circuit and video amplifying circuit in the system shown in FIG. 4;

FIG. 19 is a circuit diagram showing one practical structure of the A-D converter in the system shown in FIG. 4;

FIG. 20 is a circuit diagram showing one practical structure of the memory clock control circuit in the system shown in FIG. 4;

FIGS. 21 and 22 show waveforms appearing at various parts of the circuit shown in FIG. 20;

FIG. 23 is a circuit diagram showing one practical structure of the memory in the system shown in FIG. 4;

FIG. 24 shows waveforms appearing at various parts of the circuit shown in FIG. 23;

FIGS. 25*a* to 25*d* and 27*a* to 27*c* show equivalent circuits of the circuit shown in FIG. 23 in various operating states;

FIG. 26 shows the contents of the shift registers in the memory shown in FIG. 23;

FIG. 28 is a circuit diagram showing one practical structure of the D-A converter in the system shown in FIG. 4;

FIG. 29 is a schematic perspective view showing parts of the card engraving unit shown in FIG. 4 which may be a known engraving means;

FIG. 30 illustrates various other directions of scanning by the television camera and engraving by the card engraving unit employed in the present invention;

FIG. 31 is a circuit diagram showing another practical structure of the synchronizing signal generating or reshaping circuit in the system shown in FIG. 4;

FIG. 32 is a circuit diagram showing another practical structure of the control signal generating circuit in the system shown in FIG. 4;

FIG. 33 is a circuit diagram showing another practical structure of the sampling circuit and video amplifying circuit in the system shown in FIG. 4;

FIGS. 34 and 35 are circuit diagrams showing another practical structure of the memory clock control circuit in the system shown in FIG. 4;

FIGS. 36 to 38 show waveforms appearing at various parts of the circuit shown in FIGS. 34 and 35;

FIG. 39 is a circuit diagram showing another practical structure of the memory in the system shown in FIG. 4;

FIG. 40 shows waveforms appearing at various parts of the circuit shown in FIG. 39.

Figure 42:
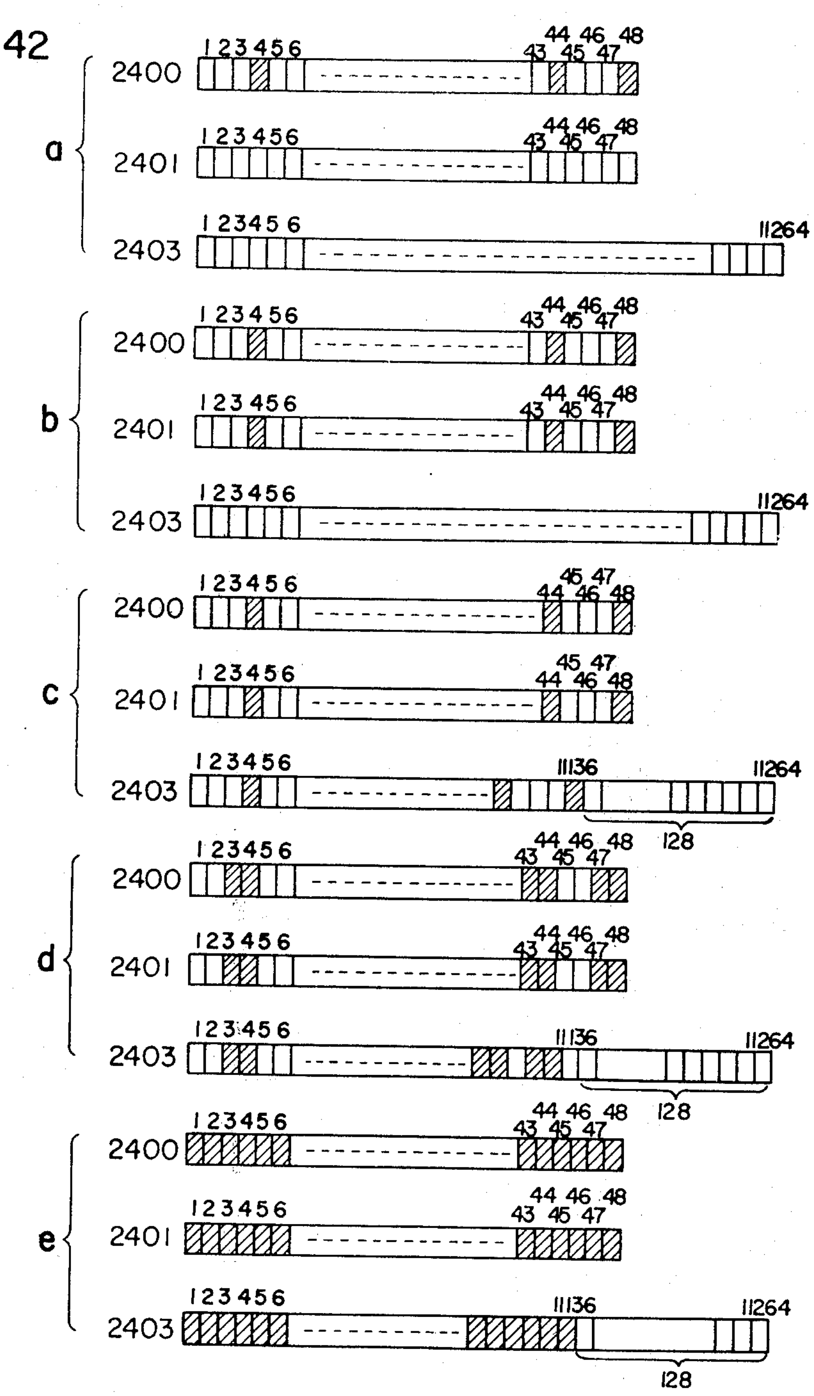
Figure 44:
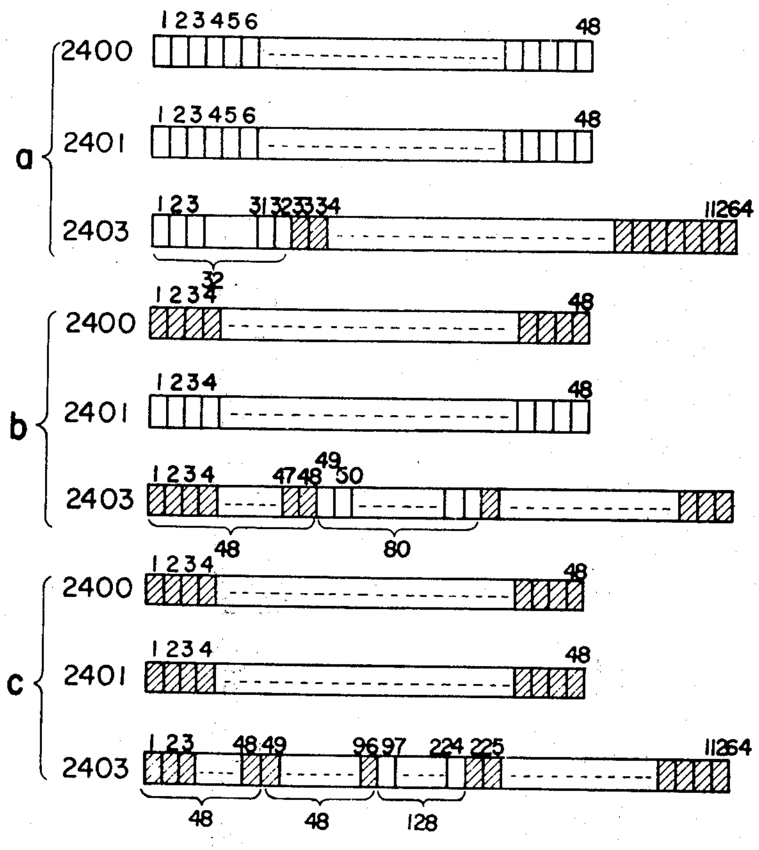
Figure 45:
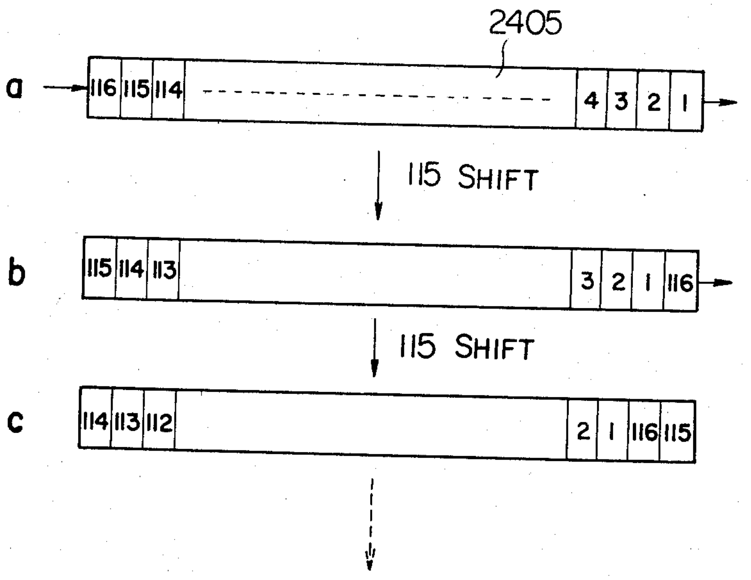
Figure 46:
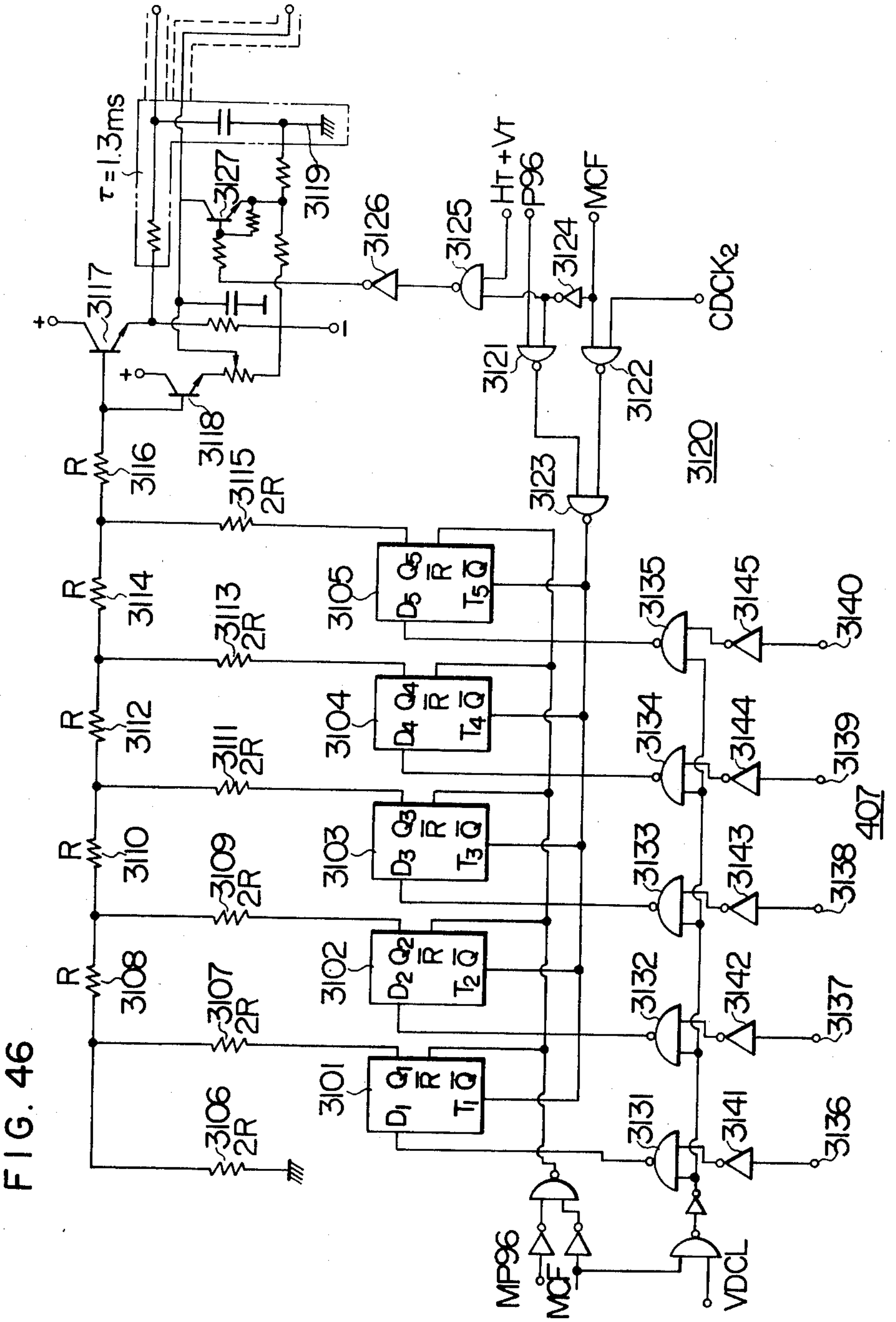

FIGS. 41*a* to 41*d* and 43*a* to 43*d* show equivalent circuits of the circuit shown in FIG. 39 in various operating states;

FIGS. 42, 44 and 45 show the contents of the shift registers in the memory shown in FIG. 39; and FIG. 46 is a circuit diagram showing another practical structure of the D-A converter in the system shown in FIG. 4.

Figure 1:
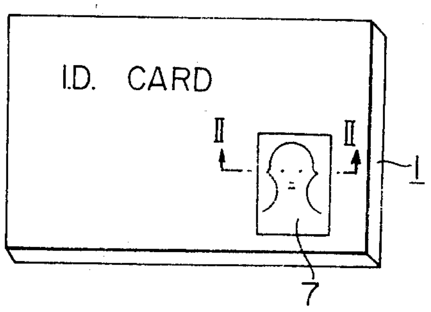
FIG. 1 is a schematic perspective view of a card blank on which a picture is engraved by the electronic engraving and recording system according to the present invention.
Figure 2:
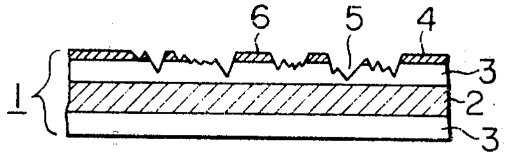
FIG. 2 is a schematic sectional view taken on the line II — II in FIG. 1.

FIGS. 1 and 2 show a card blank 1 preferably used in the present invention. This card blank 1 comprises a white sheet 2 of synthetic resin material having necessary items printed on one surface thereof, a pair of transparent protective layers 3 covering the opposite surfaces of the white sheet 2, and a region 4 colored in black, thin blue or any other suitable color for manifesting a picture therein. A known electronic engraving unit such as "VARIO-KLISHOGRAPH" (Registered Trade Mark) made by Hell Company in Germany or "AUTOCRAVER" (Registered Trade Mark) made by Dai-Nippon Screen Manufacturing Company in Japan may be used to cut in the aforesaid colored region 4 many fine linear or dotted grooves, slots or holes of varying depth of the order of several ten microns in accordance with the features of an object to be engraved, so that a difference can be produced in the luster and shade of color depending on the ratio of cut portions 5 to non-cut portions 6 of the colored region 4 thereby producing an engraved picture 7 representing the face or other features of the user of the card.

FIGS. 3*a* and 3*b* show another card blank 30 preferably used in the present invention. This card blank 30 comprises a white base plate 31 of plastic material and a colored plastic film 32 several ten micron thick bonded to the base plate 31. Many fine linear or dotted grooves, slots or holes of varying depth are cut in this colored plastic film 32 according to the features of an object to be engraved so that the picture of the object can be produced in the colored plastic film 32 depending on the depth of engraving representing the light and shade. The number of picture elements forming the picture produced in the colored plastic film 32 is 90 × 110 when the size of the colored plastic film 32 is 18 × 22 mm and the resolution of the picture is 5 dots per mm.

FIG. 4 is a block diagram showing the structure of an embodiment of the electronic engraving and recording system according to the present invention. The structure and operation of the system according to the present invention will be described with reference to FIGS. 4 and 5 supposing that the system is used for engraving a picture on the card blank 30 shown in FIG. 3.

An image of an object 401 is picked up by a pickup unit 402 such as an industrial television camera and a picture signal having a waveform as shown in FIG. 5*a* is delivered from the television camera 402. The picture signal shown in FIG. 5*a* is applied to a sampling circuit 403 where a sampling signal having a waveform as shown in FIG. 5*b* is used to sample the picture signal at 96 points during one horizontal scanning period H and the sampled signal is held in the sampling circuit 403. The picture signal thus sampled and held has a waveform as shown in FIG. 5*c*. Then, while controlling the gain of a video amplifying circuit 404, the picture signal is amplified to a level conforming to the dynamic range of an A-D converter 405. The picture signal applied to the A-D converter 405 is converted into a 5-bit signal, that is, a 32-stage digital signal, and one frame portion is stored in a memory 406 under control of control signals applied from a memory gate control circuit 409 and a memory clock control circuit 410. The one frame portion of the picture signal stored in the memory 406 is then converted into an analog signal by a D-A converter 407 to be displayed on a monitoring television set 408. The operation of the system in the portions above described is carried out at the scanning speed of the television camera 402.

The one frame portion of the digital signal is also read out from the memory 406 at a low speed synchronous with the engraving speed of a card engraving unit 411 described later, and the signal thus read out is converted into an analog signal by the D-A converter 407. This analog signal is applied to the card engraving unit 411 so that the picture can be engraved on the colored plastic film 32 of the card blank 30.

A control system generating circuit 412 is composed of a horizontal division pulse generator 413 for dividing one horizontal scanning period in synchronism with the horizontal scanning signal used in the television camera 402, a horizontal division counter 414 responsive to the pulse signal applied from the pulse generator 413 to allot 96 pulses to one horizontal scanning period H for the picture signal shown in FIG. 5a, a horizontal counter 415 for counting 234 horizontal synchronizing pulses within one vertical scanning period V of the television camera 402, a vertical counter 416 for detecting pickup of picture information corresponding to one frame, an auxiliary pulse generator 417 for generating auxiliary pulses during the period of time in which pickup of the next picture information is not started yet after the pickup of the preceding picture information so as to prevent undesirable destruction of the contents of the memory 406 during the vertical blanking period and vertical synchronizing period, and a timing pulse generator 418 for instructing the timing of sampling and A-D conversion. A synchronizing signal generating or reshaping circuit 419 is provided to separate the horizontal synchronizing signal and vertical synchronizing signal from the picture signal and to reshape these signals for attaining synchronization. A mode instructing circuit 420 is composed of a write mode instructing circuit 421 and a read mode instructing circuit 422.

In the present embodiment, the direction of scanning by the television camera 402 and the direction of engraving by the card engraving unit 411 are different from each other as shown in FIG. 5*d*. More precisely, the direction of scanning by the television camera 402 is entirely similar to that of an ordinary television camera and the scanning is carried out from left to right and from above to below. On the other hand, the card is scanned from below to above and from right to left.

FIG. 6 is a flow chart illustrating the operation of the system shown in FIG. 4. The system is placed in a continuous write mode when a starting button is depressed in the stand-by state, and one frame portion of the picture information delivered from the television camera 402 is continuously written in the memory 406, and at the same time, read out from the memory 406 to be displayed on the monitoring television set 408. In this mode, there is a concurrency between the object 401 being picked up and the picture displayed on the monitoring television set 408, and thus, the operator can adjust the position of the object 401 and the focus of the television camera 402 while looking at the picture displayed on the monitoring television set 408. Then, when a pickup button is depressed, the system is placed in a one-frame write mode, and one frame portion of the picture picked up at the moment of depression of the pickup button is solely stored in the memory 406, and at the same time, displayed on the monitoring television set 408. This stored information provides a picture to be engraved on the card blank 30. When this picture is not satisfactory, the starting button or pickup button may be depressed again to place the system in the continuous write mode or in another one-frame write mode. When the picture obtained in the one-frame write mode is satisfactory, a card engraving button is depressed to place the system in a card engraving mode. In this card engraving mode, the picture information corresponding to one frame portion stored in the memory 406 is read out in synchronism with the signal applied from the card engraving unit 411, and at the same time, a cutting tool is moved downward toward the card blank 30 to start engraving. Upon completion of engraving, the cutting tool is moved upward away from the card blank 30 and the system is restored to the stand-by state again. When mal-engraving occurs during the engraving step due to noise and other undesirable hindrance, a card engraving stopping button may be depressed. Upon depression of this button, the engraving operation is stopped immediately and the cutting tool is moved upward away from the card blank 30 to restore the system to the stand-by state or to the state which appeared immediately before the commencement of the card engraving mode.

The blocks shown in FIG. 4 will now be described in greater detail.

1. Television camera 402 and sampling of output signal of television camera

The television camera 402 is an industrial television camera employing a commercially available vidicon. Scanning by the vidicon is based on the interlaced scanning method similar to that used in ordinary television systems in which 263 horizontal lines are scanned at first and then 262 horizontal lines intermediate between the first scaned horizontal lines are scanned.

Therefore, one frame consists of 2 vertical synchronizing pulses V*o* and 525 horizontal synchronizing pulses H*o* as shown in FIG. 7*a*.

In the present invention, the vertical synchronizing pulse V*o* is enlarged and reshaped in the synchronizing signal generating or reshaping circuit 419 to obtain a vertical synchronizing pulse V followed by 234 horizontal synchronizing pulses H as shown in FIG. 7*b* so as to eliminate undesirable distortion and other defects which may appear in the picture displayed on the monitoring television set 408 and the picture engraved on the card blank 30. In other words, the upper and lower end portions of the frame are slightly removed.

The period of time of 1H includes a horizontal synchronizing pulse $H_o$ followed by a picture signal as shown in FIG. 7*c*. Similarly, the horizontal synchronizing pulse $H_o$ is enlarged and reshaped in the synchronizing signal generating or reshaping circuit 419 to provide a horizontal synchronizing pulse H as shown in FIG. 7*d*. In other words, the picture signal following the horizontal synchronizing pulse H is cut off at a predetermined portion so that the left-hand and right-hand end portions of the frame are removed. Thus, the portion of the picture signal used in the present invention is a central portion 72 of one frame 70 obtained by the vidicon, and unnecessary peripheral portions 71 of the region 72 subject to engraving are excluded.

When the picture elements of the picture signal are sampled in the order of the scanning lines for storing such a specific region 72 in the memory 406, an A-D conversion rate of the order of 3.2 MHz is required resulting in a very expensive A-D converter. Therefore, the sampling is carried out in the present invention in the manner described below.

According to the present invention, as shown in FIG. 8, vertical scanning is carried out 4 times to pick up one frame, that is, the period of time required for scanning one frame is equal to 4V, and 96 points are sampled preferably at intervals of, for example, 8 points in each horizontal scanning line during each vertical scanning. More precisely, one frame is stored in the memory 406 by sampling the picture signal in a manner as described below.

First vertical scanning:

Points 1, 9, 17, 25, . . . 89 are sampled during the horizontal scanning of the odd-numbered lines.

Points 2, 10, 18, 26, . . . 90 are sampled during the horizontal scanning of the even-numbered lines.

Second vertical scanning:

Points 3, 11, 19, 27, . . . 91 are sampled during the horizontal scanning of the odd-numbered lines.

Points 4, 12, 20, 28, . . . 92 are sampled during the horizontal scanning of the even-numbered lines.

Third vertical scanning:

Points 5, 13, 21, 29, . . . 93 are sampled during the horizontal scanning of the odd-numbered lines.

Points 6, 14, 22, 30, . . . 94 are sampled during the horizontal scanning of the even-numbered lines.

Fourth vertical scanning:

Points 7, 15, 23, 31, . . . 95 are sampled during the horizontal scanning of the odd-numbered lines.

Points 8, 16, 24, 32, . . . 96 are scanned during the horizontal scanning of the even-numbered lines.

On the other hand, one line in the lateral direction of an engraved picture is represented by each signal derived during the period of time of 2H. When the sampling is carried out in this manner, one frame can be converted into a signal consisting of 117 lateral lines each including 96 points during the period of time of 4V, that is, 1/15 second. Therefore, the rate of A-D conversion can be reduced to about 400 KHz which is about one-eighth of the aforesaid value of 3.2 MHz.

2. Synchronizing signal generating or reshaping circuit 419

When the television camera employed is such that the horizontal synchronizing signal H*o* is not synchronous with the vertical synchronizing signal V*o*, an overlap between H*o* and V*o* may occur as shown in FIGS. 10*a* and 10*b*. This may result in a reduction of the period of the picture signal, hence in a partial removal of the picture. It is therefore necessary to ensure synchronization between H*o* and V*o*.

This synchronizing signal reshaping circuit 419 acts to regulate synchronization between H*o* and V*o*, to enlarge and reshape H*o* and V*o*, and to produce a signal H + V which is applied to the monitoring television set 408 as a synchronizing signal.

The structure and operation of one form of the circuit 419 will be described with reference to FIGS. 9 and 10. The signal $\overline{Ho}$ shown in FIG. 10*a* is differentiated by a differentiator 801, and the output of the differentiator 801 triggers a monostable multivibrator 802 composed of a NAND gate, a CR combination, clipper diode and an inverter to be converted into a signal $\overline{H'}$ as shown in FIG. 10*c* which is enlarged in its pulse width depending on the time constant of the CR combination. Similarly, the signal $\overline{Vo}$ shown in FIG. 10*b* is also enlarged to be converted into a signal $\overline{V'}$ as shown in FIG. 10*d* by another differentiator 803 and another monostable multivibrator 804.

Then, the signal $\overline{H'}$ shown in FIG. 10*c* is inverted by an inverter 805, and the output of the inverter 805 and the signal $\overline{V'}$ shown in FIG. 10*d* are applied to a NAND gate 806 to obtain a waveform as shown in FIG. 10*e*. This waveform is applied to a resetting input terminal of an RS type flip-flop 807. In the meantime, the signal $\overline{V'}$ shown in FIG. 10*d* is applied to a setting input terminal of the flip-flop 807. Consequently, a signal $\overline{V}$ shown in FIG. 10*f* and a signal V shown in FIG. 10*g* are delivered from the flip-flop 807 in response to the setting and resetting of the flip-flop 807 respectively. The signal $\overline{V}$ shown in FIG. 10*f* and the signal $\overline{H'}$ shown in FIG. 10*c* are also applied to a NAND gate 808, and a signal H as shown in FIG. 10*h* appears from the NAND gate 808. In the meantime, the output H' of the inverter 805 and the output V of the flip-flop 807 are applied to respective monostable multivibrators 809 and 810, and the outputs of these multivibrators 809 and 810 are applied through a NAND gate 811 to an inverter 812 to obtain s synchronizing signal $\overline{H+V}$ for the monitoring television set 408.

3. Mode instructing circuit 420

This mode instructing circuit 420 generates two signals WDF and MCF for instructing the three operating modes described with reference to FIG. 6. The relation between these two signals and the individual modes is shown in Table 1.

Table 1

| | WDF | MCF |
|---|---|---|
| Continuous write mode | 1 | 0 |
| One-frame write mode | 1 → 0 | 0 |
| Card engraving mode | 0 | 1 |

It will be seen from Table 1 that the signal WDF is in the state "1" and the signal MCF is in the state "0" in the continuous write mode. In the one-frame write mode, the signal WDF is initially in the state "1", while the signal MCF remains in the state "0" during writing of one frame, that is, during the period of time 4V. In the card engraving mode, the signal WDF is in the state "0" and the signal MCF is in the state "1".

The structure and operation of one form of the mode instructing circuit 420 will be described with reference to FIGS. 11 and 12. In the state in which a starting button 1001, a pickup button (stop button) 1002 and a card engraving button 1003 are not depressed, RS flip-flops 1004, 1005, . . . 1008 each consisting of a pair of NAND gates are in the reset position, while another flip-flop 1009 is either in the set position or in the reset position. When now the starting button 1001 is depressed, a temporary drop occurs in the potential at a point P. As a result, the flip-flop 1004 is set. Since, in this case, th flip-flop 1005 remains in the reset position, an output in the state "1" appears from a NAND gate 1011, and the flip-flop 1007 is set in response to the application of the signal V. Thus, the output signal WDF of the flip-flop 1007 is in the state "1". On the other hand, the flip-flop 1009 is reset due to the fact that the signal $\overline{WDF}$ is in the state "0", and the output signal MCF of the flip-flop 1009 is in the state "0". At the same time, the flip-flop 1004 is also reset. Such a state occurs in the continuous write mode. The output of the NAND gate 1011 is used also as a resetting signal for the vertical counter 416.

Then, when the pickup button 1002 is depressed, one pulse of narrow width is applied to the flip-flop 1005 to set same. In response to the application of the signal V, the flip-flop 1008 is set. As a result, the flip-flop 1005 is reset. When a signal VCE informing completion of writing of one frame is applied to a NAND gate 1013 from the vertical counter 416 in the above state, an output appears from the NAND gate 1013 to reset the flip-flops 1007 and 1008 with the result that the signal WDF is turned to the state "0". Such a state occurs in the one-frame write mode. The mode instructing circuit 420 includes chattering preventing means.

When the card engraving button 1003 is depressed, a temporary drop occurs in the potential at a point R. Thus, the flip-flop 1006 is set to deliver an output CSP which is in the state "1". Therefore, in response to the application of the signal V, the flip-flop 1009 is set so that the signal MCF is turned to the state "1". The card engraving mode takes place since the signal WDF is in the state "0" in this case. In response to the application of a one-line starting signal CMF described later to the flip-flop 1006 through a NAND gate 1014 and an inverter 1015 in such a state, the flip-flop 1006 is reset and its output CSP is turned to the state "0". The operation timing of the flip-flop and waveforms of the individual signals relative to time are shown in FIG. 12.

4. Control signal generating circuit 412

The structure and operation of one form of the control signal generating circuit 412 will be described with reference to FIGS. 13 to 17.

The signals $\overline{H}$ and $\overline{V}$ are applied from the synchronizing signal reshaping circuit 419 to a NAND gate 1201 to which a signal $\overline{HCE}$ (described later) signalling completion of one field is also applied from the horizontal counter 415. The output of the NAND gate 1201 is applied to a 3.2-MHz synchronous oscillator 1203 after being inverted by an inverter 1202. Thus, the synchronous oscillator 1203 oscillators when none of the signals H, V and HCE appear. This oscillator 1203 generates a main clock signal CLOKO having a waveform as shown in FIG. 14*b* which is used as sampling pulses for sampling the picture signal during the horizontal scanning period. This clock signal CLOKO is applied to a horizontal division counter 1206 through a NAND gate 1204 and an inverter 1205.

The horizontal division counter 1206 is composed of seven flip-flops HDR1 to HDR7 which count $2^0=1$, $2^1=2$, $2^2=4$, $2^3=8$, $2^4=16$, $2^5=32$ and $2^6=64$ respectively. The clock pulses of the clock signal CLOKO are successively counted by the horizontal division counter 1206, and when the 96th clock pulse is counted, outputs appear from the respective flip-flops HDR6 and HDR7 to be applied to a NAND gate 1207. It will be seen that the output of the NAND gate 1207 is turned to the state "0" when the 96th clock pulse is counted. Similarly, another NAND gate 1208 detects counting of the 104th clock pulse. The output of the NAND gate 1207 is inverted by an inverter 1209 to provide a signal HDE having a waveform as shown in FIG. 14*c*, and this signal HDE is applied to a NAND gate 1210 to be counted by a horizontal counter 1211.

The horizontal counter 1211 is composed of eight flip-flops HC1 to HC8 and counts the number of horizontal scanning lines on the basis of the output HDE of the inverter 1209. The number of horizontal scanning lines counted by the horizontal couner 1211 is 234 when the signal MCF is in the state "0", that is, in the write mode, while the number of horizontal scanning lines counted by the horizontal counter 1211 is 232 when the signal MCF is in the state "1", that is, in the card engraving mode. When these horizontal scanning lines are counted, the output $\overline{HCE}$ of a NAND gate 1212 is turned to the state "0" and its inverted equivalent HCE is turned to the state "1" so that completion of scanning of one field can be detected. These signals HDE and HCE have waveforms as shown in FIGS. 15*b*, 15*c*, 15*f* and 15*g*. A NAND gate 1213 changes a count number depending on whether the signal MCF is in the state "0" or "1".

When the output $\overline{HCE}$ of the NAND gate 1212 is in the state "0", an 8-bit auxiliary pulse counter 1214 is reset, and at the same time, an auxiliary pulse oscillator 1215 starts to oscillate in response to the application of the signal HCE. An auxiliary pulse signal P128 having a waveform as shown in FIGS. 15*d* and 15*h* is applied to the memory clock control circuit described later. At the same time, these auxiliary pulses P128 are counted by the 8-bit auxiliary counter 1214. When the 128th auxiliary pulse is counted by the auxiliary counter 1214, a signal E128 having a waveform as shown in FIGS. 15*e* and 15*i* is applied to a resetting terminal of the horizontal counter 1211. Therefore, the horizontal counter 1211 is reset and the auxiliary pulse oscillator 1215 ceases to oscillate.

The signal HCE is also applied to a 4-bit vertical counter 1216 to be counted thereby. The vertical counter 1216 is composed of four flip-flops VC1 to VC4, and when it counts four pulses of the signal HCE, it generates a signal VCE by detecting the fact that one frame has been picked up. This vertical counter 1216 is reset by the output of the NAND gate 1011.

In the meantime, the output of the flip-flop HDR4 in the horizontal division counter 1206, that is, the signal detecting the counting of the 8th clock pulse and having a waveform as shown in FIG. 14*d*, is applied to a NAND gate 1218 to which the output of the NAND gate 1207, that is, the signal HDE detecting the counting of the 96th clock pulse, is also applied. Further, a negative output $\overline{MP96}$ of an RS flip-flop 1217 consisting of a pair of NAND gates is also applied to this NAND gate 1218. The output of the NAND gate 1208 is in the state "1" and the flip-flop 1217 is in the reset position when the horizontal division counter 1206 starts to count the clock pulses CLOKO. In such a state, the output of the NAND gate 1218 is in the state "1" due to the fact tha the output of the NAND gate 1207 is in the state "1" and the output of the flip-flop HDR4 is in the state "0". Therefore, the flip-flop 1217 remains in the reset position in which the signal MP96 is in the state "0". No clock pulses can pass through a NAND gate 1219, and therefore, the output P96 of an inverter 1220 is in the state "0" as seen in FIG. 14*f*.

When the horizontal division counter 1206 counts the 8th clock pulse, the output of the NAND gate 1218 is changed to the state "0" and the flip-flop 1217 is placed in the set position. Therefore, the NAND gate 1219 pərmits passage of the clock pulses therethrough. Thus, the 9th and succeeding clock pulses can pass through the NAND gate 1219. The output of the NAND gate 1208 is changed to the state "0" when the horzontal division counter 1206 counts the 104th clock pulse. The flip-flop 1217 is reset due to the fact that the output of the NAND gate 1207 has been changed to the state "0" as a result of counting of the 96th clock pulse by the horizontal division counter 1206. Therefore, the NAND gate 1219 inhibits passage of the clock pulses therethrough. Consequently, the output P96 of the inverter 1220 has a waveform as shown in FIG. 14*f* in which it will be seen that the signal P96 includes the 9th to the 104th clock pulse. This signal P96 corresponds to a horizontal division signal for the picture.

Figure 16:
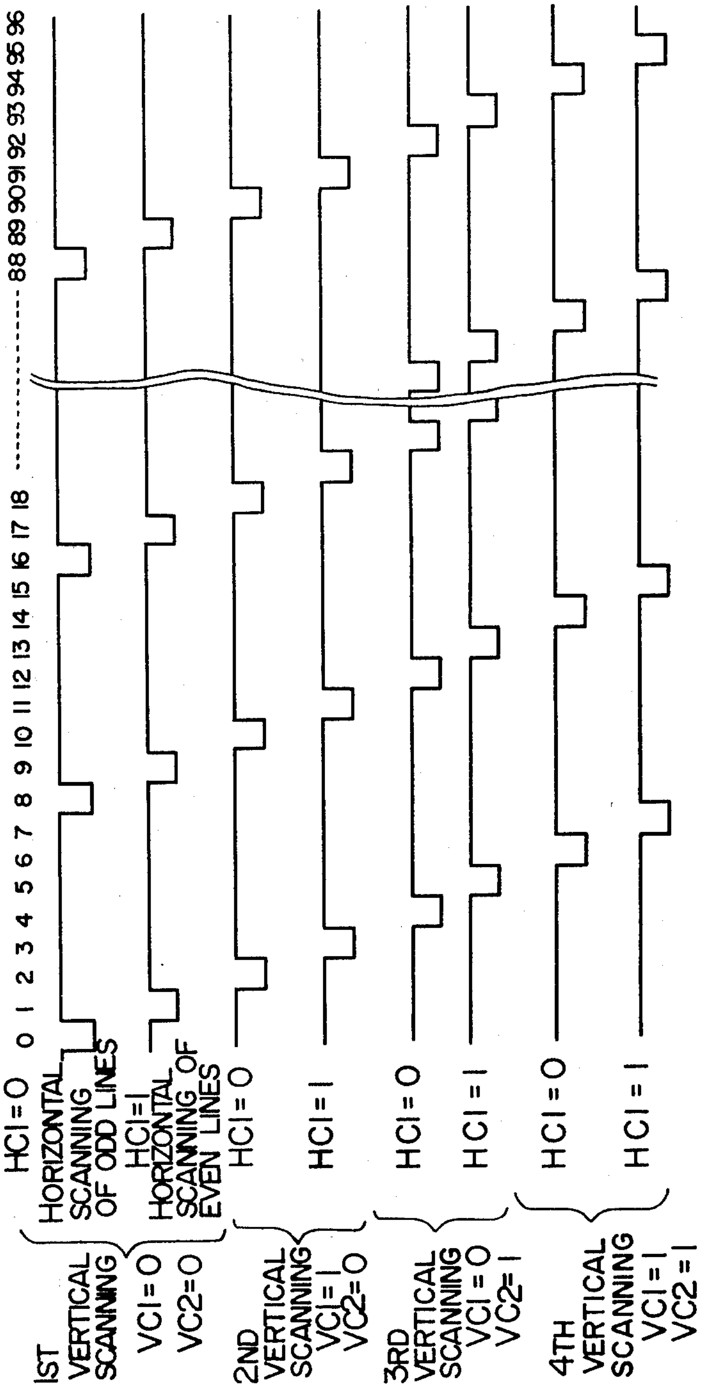

In the meantime, the outputs of the flip-flops HDR1 and HC1 are applied to an EXCLUSIVE-OR gate 1221, the outputs of the flip-flops HDR2 and VC1 are applied to another EXCLUSIVE-OR gate 1222, and the outputs of the flip-flops HDR3 and VC2 are applied to another EXCLUSIVE OR gate 1223. The outputs of these gates 1221, 1222 and 1223 and the output $\overline{HDE}$ Of the NAND gate 1207 are applied to a NAND gate 1224. Therefore, the output of the NAND gate 1224 is changed to the state "0" at intervals of eight clock pulses in each vertical scanning and horizontal scanning as seen in FIG. 16. The output of the NAND gate 1224 is inverted by an inverter 1225, and the inverted output of the inverter 1225 is applied to a NAND gate 1226 to be reshaped on the basis of the clock pulses. The reshaped output of the NAND gate 1226 is applied to an inverter 1227 to obtain a gate signal SAMP.H for sampling and holding the picture signal. This signal SAMP.H has a waveform which is an inversion of the waveform shown in FIG. 15.

Figure 17:
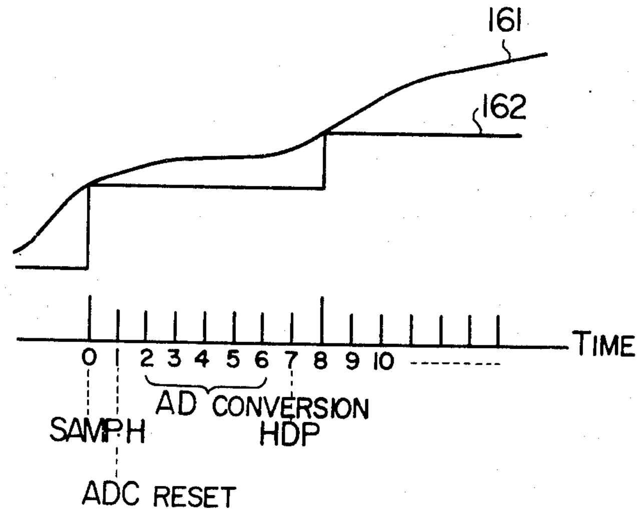

The output of the inverter 1225 is also applied to a 3-bit shift register 1228. Due to the fact that the clock pulses CLOKO are successively applied from the synchronous oscillator 1203 to the shaft register 1228, pulses are successively delivered from the individual bit positions of the shift register 1228. These pulses are used as a resetting pulse and a converting pulse for the A-D converter 405 and also as a timing pulse HDP for regulating the timing of application of the output signal of the A-D converter 405 to the memory 406. The manner of operation utilizing these pulses is shown in FIG. 17 in which the picture signal and the sampled and held picture signal are designated by the reference numerals 161 and 162 respectively. At time zero (0), the picture signal is sampled and held by the signal SAMP.H, and then at time 1, the A-D converter 405 is reset by the resetting pulse. From time 2 to time 6, the A-D conversion is carried out by the application of the converting pulses, and then at time 7, the timing pulse is applied for writing the A-D converted signal in the memory 406. Thereafter, similar operation is repeated.

5. Sampling circuit 403 and video amplifying circuit 404

One form of the sampling circuit 403 and video amplifying circuit 404 will be described with reference to FIG. 18.

The picture signal delivered from the television camera 402 passes through a field effect transistor 1701 during the sampling period determined by the sampling signal SAMP.H to be sampled and held while being maintained at a predetermined potential level by a capacitor 1702. The picture signal waveform thus sampled and held is clamped during the horizontal scanning period and vertical scanning period by a transistor 1703 which is driven by the signal V + H. The picture signal sampled and held is applied through a source follower circuit 1704 having a high input impedance to AC amplifiers 1705 and 1706 to be amplified up to the level of the full dynamic range of the A-D converter 405. Then, the amplified signal is applied to an input terminal 1716 of the A-D converter 405. Slide resistors 1707 and 1708 are provided for controlling the gain of the amplifiers 1705 and 1706.

When a portion of the analog signal to be subjected to the A-D conversion has a level lower than the zero level, the corresponding portion of the digital signal obtained by the A-D conversion will be zero. Therefore, the slide resistor 1709 is suitably adjusted so that the input video signal may not have a level lower than the zero level. A clamping diode 1710 is provided so that the input signal applied to the A-D converter 405 may not be lower than zero volt.

A comparator 1711 is provided for comparing the potential of the input signal with the ground potential, and "0" appears from a NAND gate 1712 when the input signal potential is lower than the ground potential. In this case, an output appears from an inverter 1713 to be applied to a current driver 1714, and a light emitting diode 1715 is energized to tell the fact that the input signal potential is lower than zero volt. In such a case, the slide resistor 1709 may be suitably adjusted to regulate the zero level.

6. A-D converter 405

Thirty-two stages may be sufficient to engrave the picture on the card blank 30. Therefore, the A-D converter 405 may be of a 5-bit sequential conversion type. One form of the A-D converter 405 is shown in FIG. 19.

In response to the application of an A-D converter resetting pulse ADCR to a NAND gate 1801, the output of the NAND gate 1801 is changed to the state "1", and therefore, all of flip-flops F1 to F5 are reset. At this time, the outputs appearing at output terminals F10 to F50 of the respective flip-flops F1 to F5 are in the state "0". Then, when a first A-D converting pulse (shift-1) is applied to a NAND gate 1802, "0" appears from the NAND gate 1802 due to the fact that the clock signal CLOKO is also applied thereto. Therefore, the flip-flop F1 is placed in the set position and "1" appears at its output terminal F10. This output is applied through resistors 1803 and 1804 to one end of a comparator 1805 to the other end of which the sampled and held picture signal is applied through the output terminal 1716 of the circuit shown in FIG. 18. These two signals are compared with each other in the comparator 1805. When the picture signal level is higher than the output level of the flip-flop F1, "0" appears from the comparator 1805, while when the former is lower than the latter, "1" appears from the comparator 1805. The output of a NAND gate 1806 is in the state "1" when the output of the comparator 1805 is in the state "0", and in this state, the flip-flop F1 remains in the set position. When the output of the comparator 1805 is in the state "1", the output of the NAND gate 1806 is in the state "0" and the flip-flop F1 is reset. Therefore, the output appearing at the output terminal F10 is in the state "0".

Then, when a second converting pulse (shift-2) is applied, the flip-flop F2 is set and "1" appears at the output terminal F20 thereof. This output is applied to the comparator 1805 while being superposed on the output of the flip-flop F1 to be compared with the picture signal. Similarly, "1" or "0" appears at the output terminal F20 of the flip-flop F2 depending on the relative magnitude of these signals. The same applies also to the remaining flip-flops F3 to F5. In this manner, the picture signal is converted into a digital signal which represents the level of the picture signal, hence the light and shade of the picture.

The outputs of the flip-flops F1 to F5 are applied to a NAND gate 1810. The outputs of all of the flip-flops F1 to F5 are in the state "1", and "0" appears from the NAND gate 1810 when the level of the picture signal input is higher than the convertible limit of the input to the A-D converter 405, that is, when an overflow of the input occurs, in the continuous write mode in which the signal CRF is in the state "1". In such a case, all of the flip-flops F1 to F5 are reset and "0" appears at all of the output terminals F10 to F50 due to the fact that the output of the NAND gate 1801 is in the state "1". A deep black picture is displayed on the monitoring television set 408 when such a digital signal is applied to the monitoring television set 408. In other words, the portions exceeding the convertible input limit level are displayed deep black indicating that an overflow of the input is occurring in the continuous write mode.

However, during writing in the one-frame write mode in which the signal $\overline{\text{CRF}}$ is in the state "0", the output of the NAND gate 1810 would not be in the state "0" even when the level of the picture signal input exceeds the convertible input limit level of the A-D converter 405. In such a case, therefore, the outputs of all of the flip-flops F1 to F5 remain in the state "1" and an entirely white picture is displayed on the monitoring television set 408. Thus, the A-D converter 405 acts as a limiter for the picture signal.

7. Memory clock control circuit 410

This circuit generates clock pulses $C\phi_1$ and $C\phi_2$ for driving the memory 406 in response to the application of various control signals from the control signal generating circuit 412. The structure and operation of one form of the memory clock control circuit 410 will be described with reference to FIGS. 20 to 22.

The pulse signals P96 and P128 have waveforms as shown in FIGS. 21*b* and 21*c* respectively when the signal MCF is in the state "0", and their waveforms are as shown in FIGS. 21*f* and 21*g* respectively when the signal MCF is in the state "1". A NAND gate 1901 acts as an OR gate for these signals P96 and P128. Thus, in response to the application of one of these signals P96 and P128, that signal appears as an output of the NAND gate 1901. (Both these signals do not exist simultaneously). The output of the NAND gate 1901 and the output of the flip-flop HC1 in the horizontal counter 415 are applied to a NAND gate 1902. Due to the fact that the flip-flop HC1 makes on-off each time the signal H is applied, an inverter 1903 delivers an output $C\phi_2$ which has a waveform as shown in FIG. 21*d* when the signal MCF is in the state "0" and which has a waveform as shown in FIG. 21*h* when the signal MCF is in the state "1". This signal $C\phi_2$ is applied as a clock signal for a main memory unit of the memory 406 described later.

The output of the NAND gate 1901 is also applied through a NAND gate 1904 to a NAND gate 1905 which acts as an OR gate. Therefore, when the signal MCF is in the state "0", that is, in the continuous write mode or one-frame write mode, the output of the NAND gate 1901 passes through the NAND gate 1905 to appear as an output $C\phi_1$ which has a waveform as shown in FIG. 21*e*. This signal $C\phi_1$ is applied as a clock signal for a sub-memory unit of the memory 406 described later.

On the other hand, the sub-memory clock signal $C\phi_1$ is produced in a manner as described below when the signal MCF is in the state "1", that is, in the card engraving mode. A card counter 1910 is composed of seven flip-flops FF1 to FF7, and a resetting signal $\overline{CCR}$ is applied from the card engraving unit 411 to resetting input terminals of the flip-flops FF4 and FF5 and to setting input terminals of the flip-flops FF1, FF2, FF3, FF6 and FF7. Therefore, the output of the card counter 1910 in this case is $2^0 + 2^1 + 2^2 + 2^5 + 2^6 = 103$. During engraving of one vertical line of the picture on the card blank 30 by the card engraving unit 411, 1 is substracted from the count of the card counter 1910 each time the one-line starting signal CMF having a waveform as shown in FIG. 22*b* is applied thereto. This signal CMF is in the state "1" when the cutting tool is cutting the line and "0" when the cutting tool is in the returned position. The outputs of the flip-flops FF1 to FF7 in the card counter 1910 are applied to one input terminal of respective EXCLUSIVE-OR gates 1911 to 1917. The outputs of the flip-flops HDR1 to HDR7 in the horizontal division counter 414 are applied to the other input terminal of the respective EXCLUSIVE-OR gates 1911 to 1917. Thus, when the count of the horizontal division counter 414 is equal to that of the card counter 1910, the outputs of all of the EXCLUSIVE-OR gates 1911 to 1917 are in the state "0" and the output of a NAND gate 1909 is in the state "0" at such time only. Since the count of the card counter 1910 specifies the position of the picture line on the card blank 30, the output of the NAND gate 1909 provides a signal by which the picture signal portions stored in the order of scanning by the television camera 402 are rearranged in the order of engraving on the card.

The output of the NAND gate 1909 is inverted by an inverter 1918, and the output of the inverter 1918 is applied to a monostable multivibrator 1919 in which the signal is reshaped before being applied to a NAND gate 1902. When now the one-line starting signal CMF is in the state "0", that is, when the cutting tool in the card engraving unit 411 is in the returned position, the output of a NAND gate 1908 is turned to the state "0" only when the first pulse of the signal V is applied after a flip-flop 1922 has been reset. Therefore, a flip-flop 1906 is maintained in the set position during the period of 1V only and an output RGF having a waveform as shown in FIG. 22*d* appears therefrom. This signal RGF is applied to the NAND gate 1920 together with the signals MP96, HC1 and $\overline{HCE}$ and the output of the monostable multivibrator 1919. The output of the NAND gate 1920 is applied to a NAND gate 1921. Due to the fact that the signal $\overline{CMF}$ is in the state "0", an inverted output appears from the NAND gate 1921 and is applied to the NAND gate 1905 to provide the clock signal $C\phi_1$.

On the other hand, the output of the NAND gate 1921 is in the state "1" when the signal CMF is in the state "1". In this case, a card clock signal having a waveform as shown in FIG. 22*e* applied to the NAND gate 1907 passes through the NAND gate 1905 to provide the clock signal $C\phi_1$. Thus, the clock signal $C\phi_1$ has a waveform as shown in FIG. 22*f* when the signal MCF is in the state "1". The card clock signal shown in FIG. 22*e* specifies the engraving position on the card blank 30 and is applied from the card engraving unit 411.

8. Memory 406

One frame portion of the picture signal subjected to the A-D conversion in the A-D converter 405 is stored in the memory 406. Therefore, this memory 406 is a one-frame memory. The structure and operation of one form of the memory 406 will be described in detail with reference to FIGS. 23 to 27. It is to be noted that the circuit shown in FIG. 23 is required by the number of bits of the digitized signal, that is, five such circuits are required in the present embodiment.

The one-frame memory comprises a 96-bit static shift register 2201, a 20-bit static shift register 2202, and a 11264-bit (96 × 116 + 128 bits) dynamic shift register 2203. In the foregoing, the number 96 corresponds to the number of bits 96 which is further equal to the sampling number in 1H period of time, the number 20 corresponds to the difference number of bits between the sampling number 116 in IV period of time and the sampling number 96 in 1H period of time, and the number 11264 is selected to be the number of bits which is not less than the sampling number in one frame. The memory is a digital memory, and the shift register 2201 is designed to store the signals contained in one widthwise line (lateral line) of a picture to be engraved, and the shift register 2202 is designed to store the signals contained in one lengthwise line of the picture to be engraved, and the shift register 2203 is designed to store the signals contained in one frame of the picture to be engraved. These shift registers are connected with one another by a plurality of switching means 2210, 2220, 2230 and 2240. Further, the memory includes two memory gate means 2251 and 2252 each consisting of a series connection of a NAND gate and an inverter. The operation of the memory will now be described in the order of the continuous write mode, one-frame write mode and card engraving mode.

a. Continuous write mode (WDF = "1", MCF = "0")

Figure 25A:
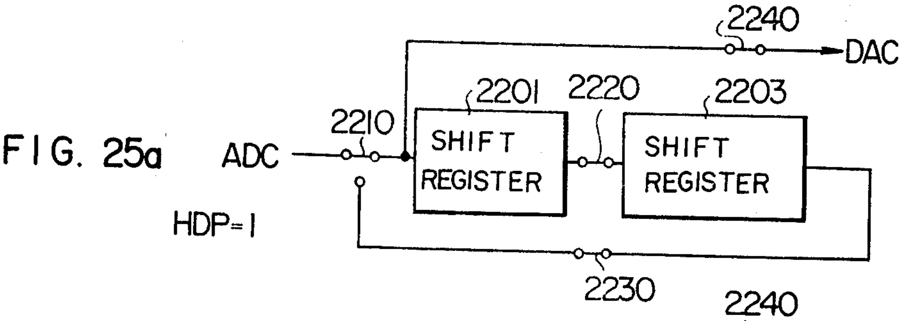
Figure 25B:
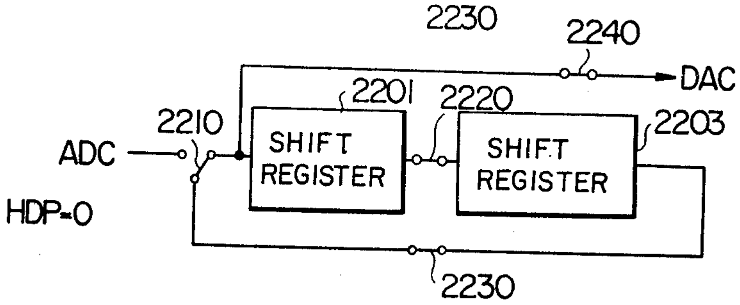

NAND gates 2221 and 2223 in the switching means 2220 and NAND gates 2241 and 2243 in the switching means 2240 are in the open position since the signal WDF is in the state "1" and the signal MCF is in the state "0". During the first horizontal scanning, the signal HC1 is in the state "0" as shown in FIG. 24*b*. Therefore, a NAND gate 2231 in the switching means 2230 is in the closed position, while NAND gates 2232 and 2233 are in the open position. When the signal HDP having a waveform as shown in FIG. 24*d* is applied to the memory gate means 2251 in such a state, this signal HDP passes through the memory gate means 2251 and is applied to a NAND gate 2211 to open this NAND gate 2211 and then a NAND gate 2213. This state is shown in FIG. 25*a*. The signal HDP is immediately turned to the state "0" since each pulse thereof appears at intervals of eight pulses of the clock signal $C\phi_1$. Therefore, the NAND gate 2211 is closed and a NAND gate 2212 is opened. This state is shown in FIG. 25*b*. Thus, the digital signal applied from the A-D converter 405 is registered in the shift register 2201 when the signal HDP is in the state "1" (FIG. 25*a*). At the next moment, the signal HDP is turned to the state "0" and the state shown in FIG. 25*b* occurs. In response to the application of the next pulse of the clock signal $C\phi_1$, the contents of the shift register 2201 are shifted by one bit and the content in the last bit position of the shift register 2201 is transferred to the first bit position of the shift register 2203. Thus, the contents of the shift register 2203 are shifted by one bit and the content in the last bit position of the shift register 2203 is transferred through the switching means 2230 to be added to the first bit position of the shift register 2201. Thereafter, seven bits are circulated in response to the application of the clock signals $C\phi_1$ and $C\phi_2$ until the next pulse of the signal HDP is applied. In response to the application of the next pulse of the signal HDP to the memory gate means 2251, the digital signal applied from the A-D converter 405 is registered in the shift register 2201, and at the same time, applied to the D-A converter 407. The signal HDP is immediately turned to the state "0" and seven bits are circulated again. Thereafter, similar operation is repeated until the end of the first horizontal scanning period. The contents of the shift registers 2201 and 2203 at the end of the first horizontal scanning period are shown in FIG. 26*a*.

Figure 25C:
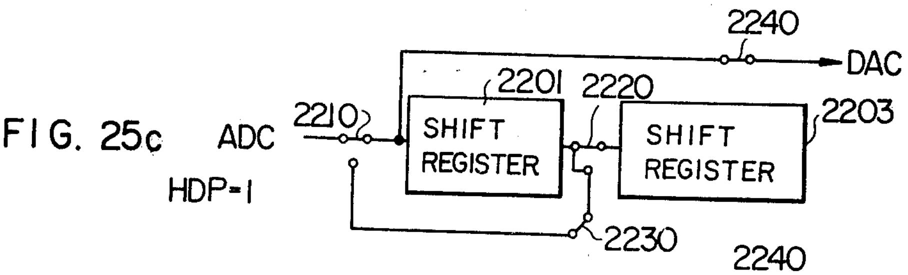
Figure 25D:
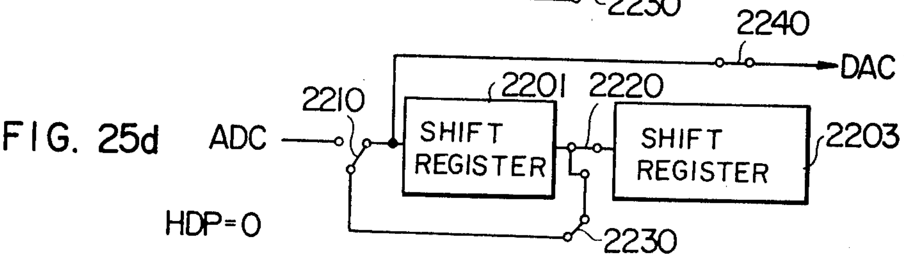

In the second horizontal scanning, the signal HCl is in the state "1" and the clock signal $C\phi_2$ is in the state "0" as shown in FIGS. 24*b* and 24*e* respectively. Therefore, the NAND gates 2231 and 2233 are opened and the NAND gate 2232 is closed. As a result, the states shown in FIGS. 25*a* and 25*b* are changed over to states as shown in FIGS. 25*c* and 25*d* respectively. In the case of the second horizontal scanning, the signal SAMP.H is shifted by one clock pulse position relative to that in the first horizontal scanning as seen in FIG. 16. Therefore, the timing of application of the signal HDP is also shifted by one clock pulse position compared with that in the first horizontal scanning, and one clock pulse of the clock signal $C\phi_1$ is applied before application of the first pulse of the signal HDP. Thus, one clock pulse of the clock signal $C\phi_1$ is applied during the period in which the signal HDP is in the state "0", and the contents of the shift register 2201 are shifted by one bit. The content of the last bit position of the shift register 2201 is circulated to the first bit position thereof through the switching means 2220, 2230 and 2210. Then, the signal HDP is turned to the state "1" and the digital signal applied from the A-D converter 405 is registered in the shift register 2201, and at the same time, applied to the D-A converter 407. The signal HDP is immediately turned to the state "0", and the contents of the shift register 2201 are shifted by one bit. The content of the last bit position of the shift register 2201 is circulated to the first bit position thereof through the switching means 2230 and 2210. Thereafter, similar operation is repeated until the end of the second horizontal scanning. In this case, the contents of the shift register 2203 remain unchanged due to the fact that the clock signal $C\phi_2$ is in the state "0". The contents of the shift registers 2201 and 2203 at the end of the second horizontal scanning are shown in FIG. 26b.

In the third horizontal scanning, the signal HCl is in the state "0" and the clock signal $C\phi_2$ is in the state "1". Thus, states of connection are as shown in FIGS. 25*a* and 25*b* and are similar to those in the first horizontal scanning, and entirely similar operation is carried out. Therefore, the contents of the shift registers 2201 and 2203 at the end of the third horizontal scanning are as shown in FIG. 26*c*.

In the fourth horizontal scanning, the signal HCl is in the state "1" and the clock signal $C\phi_2$ is in the state "0" as in the second horizontal scanning. In this manner, horizontal scanning of the succeeding odd-numbered lines is carried out in a manner entirely similar to that in the first horizontal scanning, and horizontal scanning of the succeeding even-numbered lines is carried out in a manner entirely similar to that in the second horizontal scanning. Repetition of the above horizontal scanning operation 234 times completes one vertical scanning. The contents of the shift registers 2201 and 2203 at the end of the 234th horizontal scanning are shown in FIG. 26*d*.

Each horizontal scanning in the second vertical scanning period is entirely similar to that above described. Absence of the memory clock signal $C\phi_2$ in the vertical blanking period results in erasion of the contents of the shift register 2203 since this register is a dynamic shift register. In order to avoid this trouble, the auxiliary pulse signal P128 shown in FIGS. 21*c* and 21*g* must be applied to the memory during the vertical blanking period. This auxiliary pulse signal P128 includes 128 pulses. Thus, immediately before the second vertical scanning takes place, the contents of the shift registers including the last bit position of the shift register 2203 are shifted to provide the same state as that existed immediately before the first vertical scanning took place. In the second vertical scanning, each pulse of the signal SAMP.H is shifted by two clock pulse position relative to that in the first vertical scanning as seen in FIG. 16. Therefore, the contents of the shift registers 2201 and 2203 at the end of the second vertical scanning are as shown in FIG. 26*e*.

At the end of the fourth vertical scanning, one frame portion of the picture signal is entirely registered in the shift registers 2201 and 2203 as seen in FIG. 26*f*. In the continuous write mode, the picture signal written in the memory is successively read out and applied through the D-A converter 407 to the monitoring television set 408 to be displayed thereon. The above operation is repeated in the continuous write mode.

b. One-frame write mode (WDF = "1"   "0 ", MCF = "0")

Figure 27A:
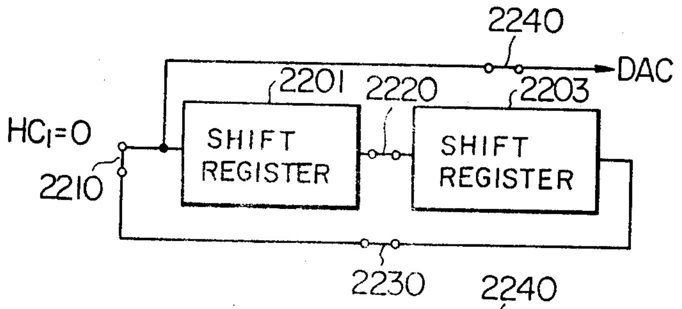
Figure 27B:
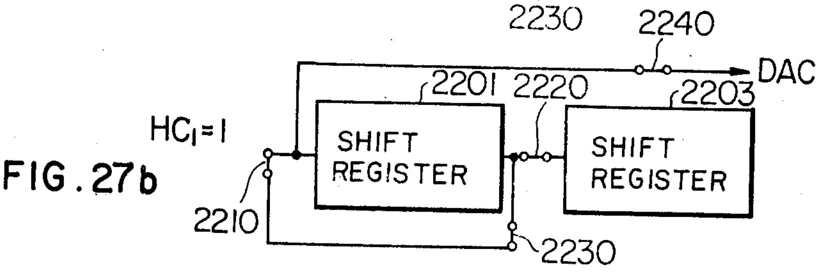

In this mode, the signal WDF remains in the state "1" during the period of time of 4 V and is then turned to the state "0". During the period of time in which the signal WDF is in the state "1", operation is entirely similar to that in the continuous write mode, and one frame portion of the picture signal is stored in the shift registers 2201 and 2203. After the period of time of 4 V, the signal WDF is turned to the state "0" and the memory gate means 2251 is closed. As a result, the NAND gate 2211 is closed and the NAND gate 2212 is opened. On the other hand, when the signal HCl is in the state "0", the NAND gate 2231 is closed and the NAND gates 2232 and 2233 are opened, while when the signal HCl is in the state "1", the NAND gate gates 2231 and 2233 are opened and the NAND gate 2232 is closed. Therefore, states of connection are as shown in FIGS. 27*a* and 27*b* respectively.

When the signal HCl is in the state "0", the contents corresponding to one line portion of the shift register 2203 are transferred to the D-A converter 407 and to the shift register 2201. After the transfer of the one line portion, the signal HCl is turned to the "1" and the switching means 2230 is changed over. Therefore, the contents of the shift register 2201, that is, the contents corresponding to one line portion transferred from the shift register 2203 when the signal HCl is in the state "0", are applied to the D-A converter 407. Thereafter, similar operation is repeated depending on whether the signal HCl is in the state "0" or "1", and the picture signal of one frame portion stored in the memory 406 is successively applied to the D-A converter 407 to be subjected to D-A conversion. This D-A converted signal is displayed on the monitoring television set 408 as a still picture.

c. Card engraving mode (WDF = "0", MCF = "1")

Figure 27C:
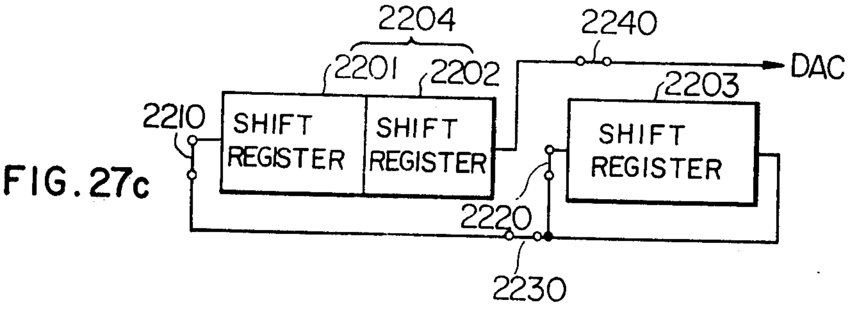

The NAND gates 2212 and 2213 in the switching means 2210, the NAND gates 2222 and 2223 in the switching means 2220, the NAND gates 2232 and 2233 in the switching means 2230, and the NAND gates 2242 and 2243 in the switching means 2240 are in the open position since the signal WDF is in the state "0" and the signal MCF is in the state "1". Therefore, the state of connection is as shown in FIG. 27*c*, and the shift registers 2201 and 2202 operate as a single shift register 2204.

The memory clock signal $C\phi_1$ has a waveform as shown in FIG. 22*f* and the memory clock signal $C\phi_2$ has a waveform as shown in FIG. 21*h*. When the signal CMF is in the state "0 ", the contents of the shift register 2203 are read out with the timing of the clock signal $C\phi_2$ to be circulated therethrough, and at the same time, applied to the shift register 2204. The shift register 2204 stores the transferred contents of the shift register 2203 with the timing of the clock signal $C\phi_1$. After repetition of the above operation 116 times, one lengthwise (vertical) line portion of the picture signal is stored in the shift register 2204. Then, when the signal CMF is turned to the state "1", the contents of the shift register 2204 are read out successively and applied to the D-A converter 407 with the timing of the clock signal $C\phi_1$, that is, in synchronism with the card clock signal. The picture signal subjected to the D-A conversion in the D-A converter 407 is applied to the card engraving unit 411 and engraving on the card blank 30 is carried out while adjusting the depth of engraving according to the level of the analog signal as described in detail later. Engraving of one frame is completed by 96 engraving steps dictated by 96 pulses of the signal CMF.

9. D-A converter 407

The D-A converter 407 converts the digital signal applied from the memory 406 into an analog signal and applies this analog signal to the monitoring television set 408 and to the card engraving unit 411. FIG. 28 shows the structure of one form of the D-A converter 407.

The outputs of the individual memory units consituting the memory 406 are applied to input terminals $D_1$ to $D_5$ of five D-type flip-flops 2701 to 2705 respectively. The outputs of these flip-flops 2701 to 2705 are applied through resistors 2706 to 2716 to an emitter follower transistor circuit 2717, and the output of this transistor circuit 2717 is applied through a slide resistor 2718 to the monitoring television set 408 and through an integrator 2719 to the card engraving unit 411.

A gate means 2720 determines the timing of application of the outputs of the memory 406 to the flip-flops 2701 to 2705. More precisely, in the continuous write mode and one-frame write mode, these inputs are applied with the timing of the signal P96 due to the fact that the signal MCF is in the state "0", a NAND gate 2722 is closed and NAND gates 2721 and 2723 are opened. On the other hand, in the card engraving mode, the card clock signal is applied to triggering input terminals $T_1$ to $T_5$ of the respective flip-flops 2701 to 2705 due to the fact that the signal MCF is in the state "1", the NAND gate 2721 is closed and the NAND gates 2722 and 2723 are opened. Therefore, the outputs of the memory 406 are applied with the timing of the card clock signal.

Outputs appearing at outpt terminals $Q_1$ to $Q_5$ of the respective flip-flops 2701 to 2705 depending on the outputs of the memory 406 pass through the resistors 2706 to 2716 and are combined with one another to be converted into an analog signal. This analog signal passes through the emitter follower transistor circuit 2717 to be applied to the monitoring television set 408 and to the card engraving unit 411. The integrator 2719 has a time constant of the order of 1.3 msec in order to eliminate noises from the picture signal and adjust the quality of the picture.

10. Card engraving unit 411

FIG. 29 is a schematic perspective view of the card engraving unit 411 which may be a known one.

Referring to FIG. 29, an engraving head 2801 having a vertically movable engraving stylus or cutting tool is disposed opposite to a table 2803 on which a card blank 2802 is fixedly mounted. A hydraulic cylinder 2804 is provided for causing reciprocating movement of the table 2803 on a pair of guide rails 2805 and 2806. Upon completion of one stroke, the engraving head 2801 is shifted by one pitch in the transverse direction by a nut 2808 which is in theaded engagement with a guide screw 2807. The signal representative of the light and shade of the object 401 delivered from the memory 406 is applied to the engraving head 2801 after being subjected to the D-A conversion in the D-A converter 407 so as to control the cutting depth of the cutting tool cutting into a colored layer portion of the card blank 2802. The cutting tool has a pointed end of, for example, pyramidal shape. Thus, when the cutting tool cuts deep into the colored layer of the card blank 2802, the cavity thus formed has a large area and the underlying portion of the colored layer left uncut has a correspondingly small area. More precisely, the deep cut portion represents the high light portion of the picture. Conversely, when the cutting tool cuts shallow into the colored layer of the card blank 2802, the cavity thus formed has a small area and the underlying portion of the colored layer left uncut has a correspondingly large area. Thus, this shallow cut portion represents the shadow portion of the picture as will be apparent from FIG. 2.

Upon completion of cutting of one line by the reciprocating movement or one stroke of the table 2803, the engraving head 2801 is shifted in the transverse direction by one pitch (0.2 mm in the present embodiment) which is determined depending on the number of lines cut in the card blank 2802, and another line is cut by the next reciprocating movement of the table 2803.

There is a most suitable value of the cutting speed in view of the fact that the cutting tool has a point of mechanical resonance, and thus, a period of time of about 30 seconds to 3 minutes is generally required for engraving a picture on a card having an area of the order of 25 mm × 25 mm. When the object 401 is a person, the object may make slight movement, and thus, the situation differs from the case in which a photographic original is used as the object. A person can stand still without making any movement for a short period of time of the order of several seconds. However, this period of time is quite short compared with the period of time required for engraving of the desired picture, and it has been considered utterly impossible to use directly a person as the object. According to the present invention, a person can be employed as the object. Further, the present invention is advantageous in that a recording medium such as a photographic printing sheet priorly commonly employed is utterly unnecessary and can inexpensively and very easily reproduce the face of a person, characters and any other desired patterns on a card blank.

In the first embodiment of the present invention above described, the direction of scanning by the television camera and the direction of engraving on the card differ entirely from each other as shown in FIG. 5*d*. However, the scanning direction and engraving direction are in no way limited to those illustrated in FIG. 5*d* and any desired direction may be employed. For example, these directions may be as shown in FIGS. 30*a* to 30*h*.

Further, in the first embodiment of the present invention, the card clock signal and one-line starting signal CMF instructing the engraving position on a card are delivered from the card engraving unit 411. However, these signals may be produced by the control signal generating circuit 412 or any other suitable means and may be applied to the card engraving unit 411, memory clock control circuit 410 and D-A converter 407.

It will be understood from the above description that, according to the present invention, an image of an object is picked up by a television camera to be converted into an electrical signal, and after displaying the picture signal on a monitoring television set and selecting the frame to be recorded, the picture is engraved on a card, all these operations being carried out simply by manipulating push buttons. Therefore, a so-called ID card such as an identification card or credit card can be easily obtained within a short period of time with simple manipulation.

The detailed structure and operation of the individual components of the system shown in FIG. 4 have been described in the above. In this embodiment, due to the fact that the speed of operation of the memory means (shift registers) corresponds to the sampling frequency, the operation speed of the shift register 2201 is about 3.2 MHz. There is a little problem, from the technical view point to operate the static shift registers with such a high speed. Accordingly, in this embodiment, the sampling frequency has to be lowered a little and thus a visible image which is magnified more in the width than the length is displayed on the monitoring television set.

In a second embodiment of the present invention which will be described hereunder, the drawbacks of the first embodiment are eliminated, and the operation speed of the shift registers is lowered to 1.6 MHz, a half of the operation speed mentioned previously. The operation of the shift registers are also stabilized. In this embodiment, the structure of the memory, hence the structure of the components asociated with the memory is suitably modified in order to improve the fact pointed out in the above so that the visible image displayed on the monitoring television set and the picture engraved on the card have an exactly analogous relationship to each other as shown in FIG. 7*f*.

To this end, the structure of some of the components of the system shown in FIG. 4 may be suitably modified. More precisely, in this second embodiment, the structure of the control signal generating circuit 412, sampling circuit 403, picture signal amplifying circuit 404, memory clock control circuit 410 and memory 406 is slightly modified. Further, the structure of the synchronizing signal generating or reshaping circuit 419 is also modified for compensating for the influence of deflection distortion in the output signal of the television camera thereby elminating undesirable distortion of the visible image displayed on the monitoring television set and the picture engraved on the card. These modified components will now be described in detail.

1. Synchronizing signal generating or reshaping circuit 419

This circuit separates the horizontal and vertical synchronizing signals from the output signal of the television camera 402 and reshapes these signals. The synchronizing signal generating or reshaping circuit in the second embodiment differs from that in the first embodiment in that these synchronizing signals are derived from the output signal of the television camera 402 and is thus advantageous in that less noise is involved.

Referring to FIG. 31, the output signal of the television camera 402 is applied to an input terminal 901 and the sum $Ho + Vo$ of the horizontal synchronizing signal $Ho$ and the vertical synchronizing signal $Vo$ is separated from the input signal by a synchronizing signal separator 902. A portion of the signal $Ho + Vo$ is applied through an integrator 903 to a Schmitt circuit 904 for separating the vertical synchronizing signal $Vo$ from the signal $Ho + Vo$. This vertical synchronizing signal $Vo$ is inverted by an inverter 905 and the inverted output of the inverter 905 is applied to a monostable multivibrator 906 in which the pulse width is regulated to provide an output signal $\overline{V'}$.

In the meantime, the output $Ho + Vo$ of the synchronizing signal separator 902 is subjected to voltage division by resistors 907 and 908 and is then reshaped by an inverter 909. The output of the inverter 909 is applied to monostable multivibrator 910 in which the pulse width is regulated, and output signals $H' + V'$ and $\overline{H' + V'}$ appear at an output terminal and an inverted output terminal respectively of the monostable multivibrator 910.

The inverted output $\overline{V'}$ of the monostable multivibrator 906 and the outpt $H' + V'$ of the monostable multivibrator 910 are applied to a NAND gate 911 and the output of the NAND gate 911 is applied to a setting input terminal of a flip-flop 912. The inverted output $\overline{V'}$ of the monostable multivibrator 906 is also applied to a resetting input terminal of the flip-flop 912. As a result, a vertical synchronizing signal V and an inverted vertical synchronizing signal $\overline{V}$ appear at an output terminal and an inverted output terminal respectively of the flip-flop 912.

In the meantime, the inverted output $\overline{H' + V'}$ of the monostable multivibrator 910 and the inverted output $\overline{V}$ of the flip-flop 912 are applied to a NAND gate 913. A horizontal synchronizing signal H appears from the NAND gate 913, and an inverted horizontal synchronizing signal $\overline{H}$ is obtained when the output of the NAND gate 913 is passed through an inverter 914.

The output $\overline{Vo}$ of the inverter 905 and the output $\overline{Ho + Vo}$ of the inverter 909 are applied to a NAND gate 915 to obtain a signal $H_T + V_T$ at the output of the NAND gate 915. This signal $H_T + _{VT}$ is used as a synchronizing signal for the monitoring television set 408, and a signal $\overline{H_T + V_T}$ obtained by applying the signal $H_T + V_T$ to an inverter 916 and an integrator 917 is used as a gate signal for the clamping circuit.

A signal $\overline{\text{SAMP.H}}$ obtained by inverting the signal SAMP.H is applied to another input terminal 918 of the circuit 419. This signal $\overline{\text{SAMP.H}}$ is applied to a NAND gate 919 to be gated by the output $\overline{H_T + V_T}$ of the integrator 917 therein and is then applied to a monostable multivibrator 902 in which the pulse width is regulated to provide a gate signal $\overline{\text{SAMP.T}}$ for the sampling and holding circuit.

2. Control signal generating circuit 412

Due to a modification of the structure of the memory 406, the number of horizontal scanning lines counted according to the output of the inverter 1209 differs from that in the first embodiment. More precisely, the number of counted horizontal scanning lines is 234 when the signal WDF is in the state "1" (MCF="0" in the first embodiment), that is, in the continuous write mode, and this number is 232 when the signal WDF is in the state "0" (MCF="1" in the first embodiment), that is, in the card engraving mode and in the one-frame write mode. The structure of the control signal generating circuit 412 in the second embodiment does not appreciably differ from that in the first embodiment as seen in FIG. 32.

3. Sampling circuit 403 and picture signal amplifying circuit 404

The structure of these circuits will be described with reference to FIG. 33. The picture signal delivered from the television camera 402 passes through a field effect transistor 4702 during the sampling period determined by the sampling signal SAMP.H after being controlled in gain by a slide resistor 4701. The picture signal is then sampled and held while being maintained at a predetermined potential by a capacitor 4703. The picture signal thus sampled and held is applied through a source follower circuit 4704 having a high input impedance to AC amplifiers 4705 and 4706 to be amplified thereby. The amplified signal is passed through an emitter follower transistor circuit 4707 to be applied to a clamping circuit 4710 composed of a capacitor 4708 and a field effect transistor 4709. A voltage signal obtained by converting the output $\overline{H_T + V_T}$ of the integrator 917 (FIG. 31) is applied to this clamping circuit 4710 as a gate signal. Therefore, the picture signal applied from the emitter follower transistor circuit 4707 to the clamping circuit 4710 is clamped by the capacitor 4708 to the voltage level appearing during the period of the signal $H_T + V_T$, and such a waveform is applied through an emitter follower transistor circuit 4712 to another emitter follower transistor circuit 4713. A video output appearing at an output terminal 4714 of the emitter follower 4713 is applied to the A-D converter 405. The sampling signal $\overline{\text{SAMP.T}}$ is applied to a voltage converter 4715 and the output signal of the voltage converter 4715 is used as a gate signal for the field effect transistor 4702. A bias circuit 4716 is provided for the source follower circuit 4704.

The sampling circuit 403 and picture signal amplifying circuit 404 in the second embodiment are advantageous over those in the first embodiment in that the picture signal output of the television camera 402 can be applied as an input signal to the A-D converter 405 without any substantial control due to the fact that the picture signal may merely be subjected to gain control and there is no need for correcting variations of the zero level due to AC amplification.

4. Memory clock control circuit 410

This circuit generates clock pulses $C\phi_1$ and $C\phi_2$ for driving the memory 406 in response to the application of various control signals from the control signal generating circuit 412. The structure and operation of the memory clock control circuit 412 employed in the second embodiment will be described with reference to FIGS. 34 to 38.

The signal $\overline{\text{P96}}$ applied from the inverter 1219 is inverted by an inverter 1220 and the output of the inverter 1220 is applied to one input terminal of a NAND gate 5901. This signal $\overline{\text{P96}}$ is also applied to a T-type flip-flop 5902 so that signal outputs KP48 and $\overline{\text{KP48}}$ appear at respective output terminals of the flip-flop 5902 at a rate of one pulse for every two pulses of the signal $\overline{\text{P96}}$. The signal $\overline{\text{KP48}}$ is applied to the other input terminal of the NAND gate 5901. Therefore, a pulse signal $\overline{\text{P48}}$ appears from the NAND gate 5901 at a rate of one pulse for every two pulses of the signal P96. The waveforms of these signals are shown in FIG. 36.

The pulse signal $\overline{\text{P48}}$ thus obtained and the auxiliary pulse signal output $\overline{\text{P128}}$ of the auxiliary pulse oscillator 1215 (FIGS. 13 and 32) are applied to a NAND gate 5903 which acts as an OR gate. The pulse signals P48 and P128 have respective waveforms as shown in FIGS. 36*c*, 36*d* and 36*h*, 36*i* during the period of IV when the signal WDF is in the state "0" and in the state "1" respectively. Therefore, an output $C\phi_2$ appears from the NAND gate 5903 and has a waveform as shown in FIG. 36*e* when the signal WDF is in the state "0" and a waveform as shown in FIG. 36*j* when the signal WDF is in the state "1". This signal $C\phi_2$ provides a clock signal for a main memory unit of the memory 406 described later.

The output of the NAND gate 5903 is applied through a NAND gate 1904 to NAND gate 1905 which acts as an OR gate. Therefore, when the signal MCF is in the state "0", that is, in the continuous write mode and one-frame write mode, the output $C\phi_2$ of the NAND gate 5903 appears as an output $C\phi_1$ of the NAND gate 1905. This signal $C\phi_1$ has a waveform as shown in FIG. 36*f* and provides a clock signal for a sub-memory unit of the memory 406 described later.

On the other hand, the sub-memory clock signal $C\phi_1$ is produced in a manner as described below when the signal MCF is in the state "1", that is, in the card engraving mode. A card counter 1910 is composed of seven flip-flops FF1 to FF7. The output of the flip-flop FF1 is applied to a triggering input terminal of the flip-flop FF2, the output of the flip-flop FF2 is applied to a triggering input terminal of the flip-flop FF3, and so on. Therefore, these flip-flops FF1 to FF7 constitute a binary counter. A signal CMF having a waveform as shown in FIG. 38a is applied to the triggering input terminal of the flip-flop FF1. This signal CMF is in the state "1" when one vertical line of the picture is being engraved on the card by the cutting tool of the card engraving unit 411, while this signal CMF is in the state "0" when the cutting tool is in the returned position. Each time this signal CMF is turned to the state "1", the output signal of the flip-flop FF1 is inverted. Thus, the flip-flop FF1 is repeatedly set and reset in response to the application of the signal CMF and 1 is successively substrated from the value stored in the card counter 1910.

When the card engraving mode is started, a signal CCRS2 which is the reshaped signal of CCR is applied from the card engraving unit 411 to setting input terminals of the flip-flops FF2, FF3, FF6 and FF7 and to resetting input terminals of the flip-flops FF1, FF4 and FF5. Therefore, $2^1 + 2^2 + 2^5 + 2^6 = 102$ is stored in the card counter 1910.

In response to the application of the next pulse of the signal CMF, 1 is subtracted from the contents of the card counter 1910. The output of the card counter 1910 in this case is $102 - 1 = 101$. Similar operation is repeated and the output of the card counter 1910 is changed in the order of 102, 101, 100, . . . . 7. The outputs of the flip-flops FF1 to FF7 in the card counter 1910 are applied to one input terminal of respective EXCLUSIVE-OR gates 1911 to 1917. The outputs of the flip-flops HDR2 to HDR7 in the horizontal division counter 414 are applied to the other input terminal of the EXCLUSIVE-OR gates 1912 to 1917 respectively. Thus, when the count of the horizontal division counter 414 is equal to that of the card counter 1910, the outputs of all of the EXCLUSIVE-OR gates 1912 to 1917 are in the state "1"and the output of the NAND gate 1909 is in the state "0" at such time only. Since the count of the card counter 1910 specifies the position of the picture line on the card, the output of the NAND gate 1909 provides a signal by which the picture signal portions stored in the order of scanning by the television camera 402 are rearranged in the order of engraving on the card. Further, the inverted output of the flip-flop FF1 and the signal HCl are applied to the EXCLUSIVE-OR gate 1911 and the output of this gate 1911 is applied to a NAND gate 1920. The output of the EXCLUSIVE-OR gate 1911 is in the state "1" when the value stored in the card counter 1910 is an even number and the signal HCl is in the state "0". The output of the EXCLUSIVE-OR gate 1911 is also in the state "1" when the value stored in the card counter 1910 is an odd number and the signal HCl is in the state "1".

The output of the NAND gate 1909 is inverted by an inverter 1918, and the output of the inverter 1918 is applied to a monostable multivibrator 1919 in which the signal is reshaped before being applied to the NAND gate 1920. When now the cutting tool in the card engraving unit 411 is in the returned position, that is, when the signal CMF is in the state "0", the output of the NAND gate 1908 is in the state "0" only when the first pulse of the signal V is applied after a flip-flop 1922 has been reset. Therefore, a flip-flp 1906 is maintained in the set position during the period of 1V only and an output RGF having a waveform as shown in FIG. 38*c* appears therefrom. This signal RGF is applied to the NAND gate 1920 together with the signals MP96, $\overline{\text{CMF}}$ and $\overline{\text{HCE}}$, the output of the EXCLUSIVE-OR gate 1911 and the output of the monostable multivibrator 1919. The output of the NAND gate 1920 is applied to the NAND gate 1905 to appear as the clock signal $C\phi_1$.

On the other hand, the output of the NAND gate 1920 is in the state "1" in the card engraving mode, that is, when the signal CMF is in the state "1". In this case, a new card clock signal NCC having a waveform as shown in FIG. 38*d* is applied to a NAND gate 1907 and passes through the NAND gate 1905 to provide the clock signal $C\phi_1$. Thus, the clock signal $C\phi_1$ has a waveform as shown in FIG. 38*e*.

Signals including the signals CMF and NCC are produced in the manner described below. Referring to FIG. 35, a diode 2001 clips the negative level of a signal CDCK which is produced by the card engraving unit 411 or an oscillator (not shown) for instructing the engraving position on the card. After the voltage of this clipped signal CDCK is suitably dropped by resistors 2002 and 2003, this signal CDCK is applied through a Schmitt circuit 2004 and a reshaping circuit 2005 to a monostable multivibrator 2006 to trigger same. The output of the monostable multivibrator 2006 is used as a card engraving position instructing signal CDCK2 having a waveform as shown in FIG. 38h. The output of the monostable multivibrator 2006 is also applied to one input terminal of a NAND gate 2007 and 2030.

In the meantime, a signal $\overline{\text{OLST}}$ having a waveform as shown in FIG. 38*i* for instructing engraving of one vertical line of the picture is produced by the card engraving unit 411 or an oscillator. This signal OLST is similarly clipped and subjected to voltage drop and is then applied through a Schmitt circuit 2014 and a reshaping circuit 2015 to a monostable multivibrator 2016 to trigger same. The output of the monostable multivibrator 2016 and the signal MCF are applied to a NAND gate 2017. Therefore, when the signal MCF is in the state "1", an output appears from the NAND gate 2017 to reset a binary counter 2008.

In the reset position of the binary counter 2008, the output of an inverter 2009 is turned to the state "1". A NAND gate 2007 is opened and the binary counter 2008 starts to count the output signal CDCK2 of a monostable multivibrator 2006. Since a NAND gate 2030 is opened when three pulses of the CDCK2 are counted, a fourth pulse and subsequent pulses thereto of the signal CDCK2 are obtained at the output of the NAND gate 2030. When four pulses of the signal CDCK2 are counted, the output of the binary counter 2008 is applied to the inverter 2009 causing the NAND gate 2007 to be closed. As a result, the binary counter 2008 cases the counting operation. The output of the binary counter 2008 is also applied to NAND gates 2010 and 2012.

Another binary counter 2020 is reset by a resetting signal $\overline{\text{CCRS2}}$. Therefore, a NAND gate 2019 is in the open position and the output pulses of the monostable multivibrator 2016 pass through the NAND gate 2017, an inverter 2018 and the NAND gate 2019 to be counted by the binary counter 2020. When three pulses of this output are counted, a NAND gate 2031 is opened. Consequently, through the NAND gate 2031, a fourth pulse and the subsequent pulses thereto from the output of the flip-flop 2016 are provided only during card engraving (MCF = 1) and further a NAND gate 2023. An output which detects a fourth pulse appears from the binary counter 2020 when it count four pulses of the output of the inverter 2018. This output is applied to NAND gates 2010, 2012 and 2022, and also through an inverter 2021 to the NAND gate 2019 to close same. As a result, the binary counter 2020 ceases the counting operation.

The output of the inverter 2018 is applied to the other input terminal of the NAND gate 2022. Therefore, the 5th and succeeding pulses of the output of the monostable multivibrator 2016 can pass through the NAND gate 2022 and are applied to the other terminal of the NAND gate 2023. Accordingly, from the NAND gate 2023, a signal CMF which is synchronous with the 5th and succeeding pulses of the signal $\overline{O}$LST is provided.

The outputs of the binary counters 2008 and 2020 which detect fourth pulse are applied to the NAND gate 2012. Therefore, an output appears from the NAND gate 2012 when these counters count four pulses of the respective signals CDCK and $\overline{O}$LST, and this output passes through an inverter 2013 to provide an engraving picture gate signal VDCL having a waveform as shown in FIG. 38*j*.

The signal CDCK2 can pass through the NAND gate 2010 after the four pulses of the signals CDCK and $\overline{O}$LST have been counted by the respective binary counters 2008 and 2020. The output $\overline{2010}$ of the NAND gate 2010 has a waveform as shown in FIG. 38*g*. This output is applied to a NAND gate 2026 and further applied to a NAND gate 2011. Consequently, from the NAND gate 2011, a fifth pulse and the subsequent pulses of the signal CDCK2 are obtained and are applied to a triggering input terminal of a flip-flop 2027 and to a resetting input terminal of another binary counter 2028.

This binary counter 2028 counts pulses applied from a gate oscillator 2024. This pulse signal has a waveform as shown in FIG. 38*f*. An output signal appears from a NAND gate 2029 when the binary counter 2028 counts 114 pulses of the pulse signal $\overline{2024}$ applied from the oscillator 2024. The output signal of the NAND gate 2029 resets the flip-flop 2027 with the result that the gate oscillator 2024 ceases to oscillate. The gate oscillator 2024 generates 114 pulses each time the output appears from the NAND gate 2010, and these pulses are applied through an inverter 2025 to a NAND gate 2026 which acts as an OR gate. Thus, the output of the NAND gate 2026 includes 114 pulses interposed between the output pulses of the NAND gate 2011. This output is the new card clock signal NCC and has a waveform as shown in FIG. 38*d*.

As will be seen from the foregoing, an engraving picture gate signal VDCL and a card clock signal NCC are produced when four pulses of a card engraving position instructing signal CDCK2 and four pulses of an engraving operation instructing signal $\overline{O}$LST are respectively counted. A one-line start signal CMF is also produced when four pulses of the engraving operation instructing signal $\overline{O}$LST are counted. Such an arrangement is based on the ground described hereinafter.

In the process of attaching a colored plastic film 32 on the plastic card 31, the plastic film 32 is not always attached precisely on the designated position, but the film 32 is sometimes attached on a shifted position deviated longitudinally or transversely from the correct position. Although, such deviations are limited usually within ±0.5 mm, since the pitch of picture elements engraved on the card is about 0.2 mm, where the film 32 is deviated from the correct position, a peripheral portion of the colored film 32 remains unengraved. Such an unengraved peripheral portion presents a colored frame around the engraved picture. The existence of such a colored frame not only degrade the quality of the engraved picture but also being offensive to viewers.

In order to prevent the occurrence of the colored frame or ungraved portion, it is only needed to intentionally engrave the first four lines from the start of the engraving operation and also to engrave the first four points of each line deep enough so as to presents white colored portion. The other lines and points of each line are engraved in accordance with the engraving picture signal. The production of the engraving picture signal VDCL, card clock signal NCC and one-line start signal CMF as described in the foregoing is to achieve such a particular engraving operation, and circuit arrangements for producing those signals constitute, so to speak, a colored frame preventing circuit. The colored frame preventing circuit include, in FIG. 35, NAND gates 2007, 2010, 2011, 2012, 2030, 2017, 2022, 2031 and 2023, and binary counters 2008 and 2020, and inverters 2009, 2013, 2018 and 2021.

5. Memory 406

One frame portion of the picture signal subjected to the A-D conversion in the A-D converter 405 is stored in the memory 406. Therefore, this memory 406 is a one-frame memory. The structure and operation of another form of the memory 406 will be described in detail with reference to FIGS. 39 to 45. It is to be noted that the circuit shown in FIG. 39 is required by the number of bits of the digitized signal, that is, five such circuits are required in the present embodiment.

The one-frame memory comprises a pair of 48-bit static shift registers 2400 and 2401, a 20-bit static shift register 2402, and a 11264-bit (96 × 116 + 128 bits) dynamic shift register 2403. In the description of shift registers 2400, 2402 and 2403, the number 48 corresponds to a half of the bit number of 96 which is the sampling number in 1H period of time, the number 20 corresponds to the difference between the sampling number 116 in 1V period of time and the sampling number 96 in 1H period of time, and the number 11264 is selected to be the number of bits which is not less than the sampling number in one frame. The memory is a digital memory, and the shift registers 2400, 2401 are designed to store the signals contained in one widthwise line of a picture to be engraved, and the shift register 2402 is designed to store the signals contained in one lengthwise line of the picture to be engraved, and the shift register 2403 is designed to store the signals contained in one frame of the picture to be engraved. These shift registers are connected with one another by a plurality of switching means 2410, 2420, 2430 and 2440 and a gate means 2460. A memory gate means 2451 consists of a series connection of a NAND gate and an inverter. The operation of the memory will now be described in the order of the continuous write mode, one-frame write mode and card engraving mode.

a. Continuous write mode (WDF = "1", MCF = "0")

Figure 41A:
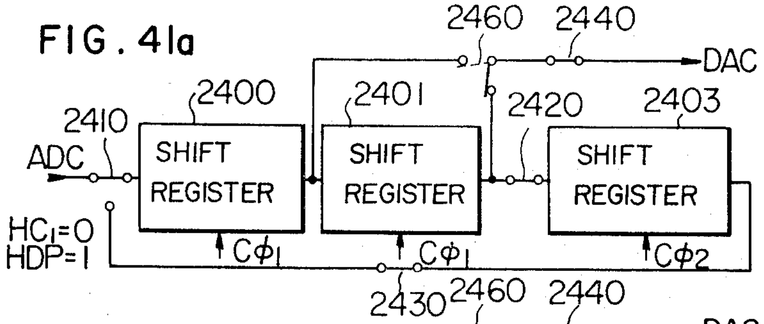
Figure 41B:
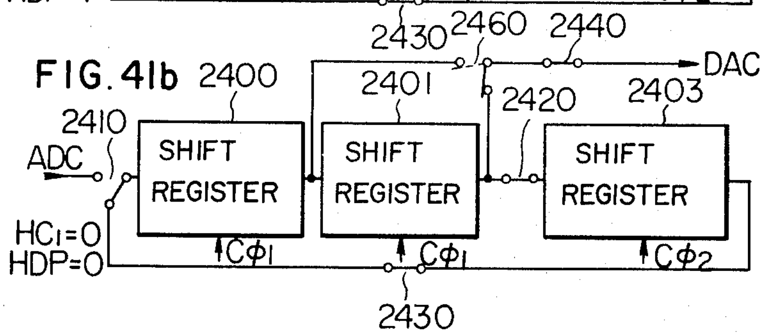

The memory gate means 2451 is in the open position since the signal WDF is in the state "1" and the signal MCF is in the state "0". Further, NAND gates 2421 and 2423 in the switching means 2420 and NAND gates 2441 and 2443 in the switching means 2440 are also in the open position. During the first horizontal scanning, the signal HC1 is in the state "0" as shown in FIG. 40*b*. Therefore, NAND gates 2463 and 2464 are in the open position, while NAND gates 2461 and 2462 are in the closed position. Further, NAND gates 2432 and 2433 in the switching means 2430 are also open due to the fact that the signal CMF is in the state "0". When the signal HDP having a waveform as shown in FIG. 40*d* is applied to the memory gate means 2451 in such a state, this signal HDP passes through the memory gate means 2451 and is applied to a NAND gate 2411 to open this NAND gate 2411 and then a NAND gate 2413. This state is shown in FIG. 41*a*. The signal HDP is immediately turned to the state "0" since each pulse thereof appears at intervals of four pulses of the clock signal $C\phi_1$. Therefore, the NAND gate 2411 is closed and a NAND gate 2412 is opened. This state is shown in FIG. 41*b*. Thus, the digital signal applied from the A-D converter 405 is registered in the shift register 2400 when the signal HDP is in the state "1" (FIG. 41*a*). At the next moment, the signal HDP is turned to the state "0" (FIG. 41*b*). In response to the application of the next pulse of the clock signal $C\phi_1$, the contents of the shift register 2400 are shifted by one bit. Thus, the content in the last bit position of the shift register 2400 is transferred to the first bit position of the shift register 2401, and the contents of the shift register 2401 are also shifted by one bit. Therefore, the content in the last bit position of the shift register 2401 is also transferred to the first bit position of the shift register 2403. Consequently, the contents of the shift register 2403 are shifted also by one bit, and the content in the last bit position of the shift register 2403 is transferred through the switching means 2430 to be added to the first bit position of the shift register 2400. Thereafter, three bits are circulated in response to the application of the clock signals $C\phi_1$ and $C\phi_2$ until the next pulse of the signal HDP is applied. In response to the application of the next pulse of the signal HDP to the memory gate means 2451, the digital signal applied from the A-D converter 405 is registered in the shift register 2400. The signal HDP is immediately turned to the state "0" and three bits are circulated again. Thereafter, similar operation is repeated until the end of the first horizontal scanning period, and the picture signal portion including the points 1, 9, 17, . . . 89 in the first widthwise line in FIG. 8 can be registered. The contents of the shift registers 2400, 2401 and 2403 at the end of the first horizontal scanning are shown in FIG. 42*a*. In FIG. 42*a*, the hatched portions represent the regions which contain information applied from the A-D converter 405 and the blank portions represent the regions which do not contain any information.

Figure 41C:
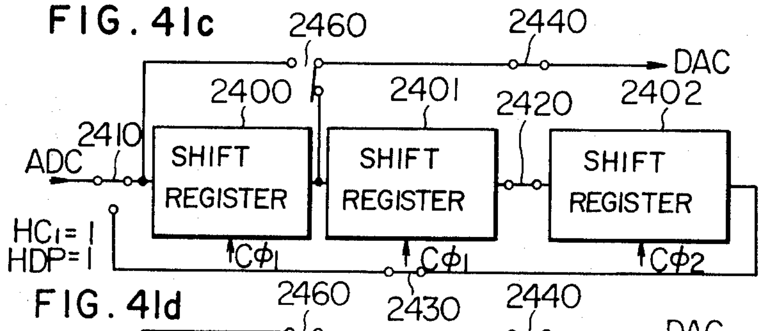
Figure 41D:
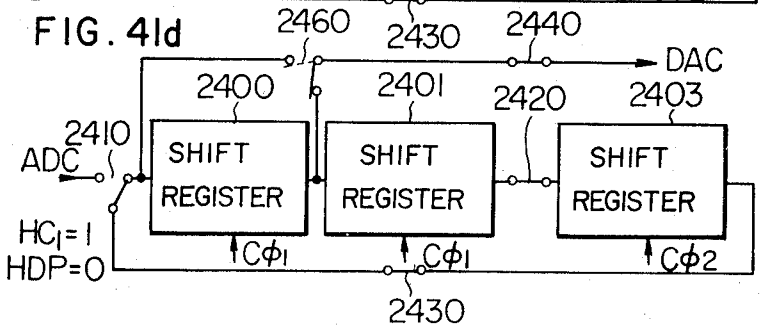

In the second horizontal scanning, the signal HC1 is in the state "1" as shown in FIG. 40*b*. Therefore, the NAND gates 2461 and 2462 are opened and the NAND gates 2463 and 2464 are closed. As a result, the states shown in FIGS. 41*a* and 41*b* are changed over to states as shown in FIGS. 41*c* and 41*d* respectively. In the case of the second horizontal scanning, the signal SAMP.H is shifted by one clock pulse position of the clock signal CLOKO relative to that in the first horizontal scanning, as seen in FIG. 16. Therefore, the timing of application of the signal HDP is also shifted by one clock pulse position of the clock signal CLOKO compared with that in the first horizontal scanning, and the picture signal portion including the points 2, 10, 18, 26, . . . . 90 in the second widthwise line in FIG. 8 is registered in the shift register 2400. The timing with which the signal is written in the shift register 2400 during the second horizontal scanning is the same as the writing timing during the first horizontal scanning due to the fact that the pulses of the clock signal $C\phi_1$ applied to the shift register 2400 appears at a rate of one for every two pulses of the clock signal CLOKO. Therefore, the picture signal portion is written in the shift registers 2400, 2401 and 2403 in the entirely same manner as the first horizontal scanning. More precisely, when the signal HDP is turned to the state "1" and then a signal SRG1 takes the state "1", the digital signal applied from the A-D converter 405 is registered in the shift register 2400. The signal HDP is turned to the state "0" at the next moment, and the content in the last bit position of the shift register 2400 is transferred to the first bit position of the shift register 2401. Then, the content in the last bit position of the shift register 2401 is transferred to the first bit position of the shift register 2403, and the content in the last bit position of the shift register 2403 is transferred through the switching means 2430 to the first bit position of the shift register 2400. Thereafter, similar operation is repeated until the end of the second horizontal scanning. FIG. 42*b* shows the contents of the shift registers 2400, 2401 and 2403 at the end of the second horizontal scanning.

In the third horizontal scanning, the signal HC1 is in the state "0", and operation entirely similar to that in the first horizontal scanning is carried out for the third widthwise line shown in FIG. 8. In the fourth horizontal scanning, the signal HC1 is in the state "1", and operation entirely similar to that in the second horizontal scanning is carried out for the fourth widthwise line shown in FIG. 8. In this manner, horizontal scanning of the succeeding odd-numbered widthwise lines is carried out in a manner entirely similar to that in the first horizontal scanning, and horizontal scanning of the succeeding even-numbered widthwise lines is carried out in a manner entirely similar to that in the second horizontal scanning. Repetition of the above manner of operation 234 times horizontal scanning completes one vertical scanning. FIG. 42*c* shows the contents of the shift registers 2400, 2401 and 2403 at the end of the 234th horizontal scanning.

Each horizontal scanning in the second vertical scanning period is entirely similar to that above described. Absence of the memory clock signal $C_2$ in the vertical blanking period results in erasion of the contents of the shift register 2403 since this register is a dynamic shift register. In order to avoid this trouble, the auxiliary pulse signal P128 shown in FIG. 36*d* must be applied to the memory during the vertical blanking period. This auxiliary pulse signal P128 includes 128 pulses. Thus, immediately before the second vertical scanning takes place, the contents of all the shift registers including the last bit position of the shift register 2403 are shifted to provide the same state as that existed immediately before the first vertical scanning took place. In the second vertical scanning, each pulse of the signal SAMP.H is shifted by two clock pulse positions relative to that in the first vertical scanning as seen in FIG. 16. Therefore, the timing with which the signal is applied to the shift registers 2400 and 2401 is also shifted by one memory clock pulse position and the contents of the shift registers 2400, 2401 and 2403 at the end of the second vertical scanning are as shown in FIG. 42*d*.

At the end of the fourth vertical scanning, one frame portion of the picture signal is entirely registered in the shift registers 2400, 2401 and 2403 as shown in FIG. 42*e*.

During the horizontal scanning of the odd-numbered line in the continuous write mode, the outputs of the shift registers 2400 and 2401 are alternately applied to the D-A converter 407 in response to the application of the pulse signal KP48 as shown in FIGS. 41*a* and 41*b*. During the horizontal scanning of the even-numbered line in the continuous write mode, the input and output of the shift register 2400 are alternately applied to the D-A converter 407 in response to the application of the pulse signal KP48 as shown in FIGS. 41*c* and 41*d*. Thus, the signal delivered from the A-D converter 405 is written in the memory 406, and at the same time, displayed on the monitoring television set 408.

b. One-frame write mode (WDF="1" → "0", CMF ="0")

In this mode, the signal WDF remains in the state "1" during the period of time of 4V and is then turned to the state "0". During the period of time in which the signal WDF in the state "1", operation is entirely similar to that in the continuous write mode, and one frame portion of the picture signal is stored in the shift registers 2400, 2401 and 2403. After the period of time of 4V, the signal WDF is turned to the state "0" and the memory gate means 2451 is closed. As a result, the signal SRG1 is turned to the state "0" thereby closing the NAND gate 2411 and opening the NAND gate 2412. Further, the NAND gates 2422 and 2423 in the switching means 2420 are opened, and the NAND gate 2421 is closed. The switching means 2430 and 2440 and the gate means 2460 remain in respective positions similar to those in the continuous write mode. States of connection in this case are shown in FIGS. 43*a* and 43*b* respectively.

During the period of time of 4V, one frame portion of the picture signal is recorded in the shift registers 2400, 2401 and 2403, and in response to the application of the 128 auxiliary pulses, the contents of these shift registers 2400, 2401 and 2403 are successively shifted. Thus, at the end of the period of time of 4V, the contents of the shift registers 2400, 2401 and 2403 are as shown in FIG. 44*a*.

Figure 43A:
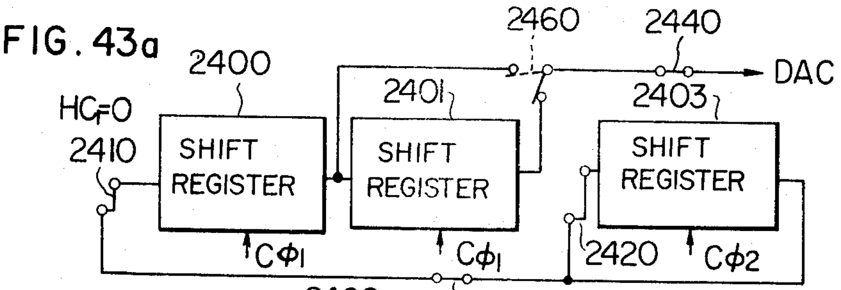

In the fifth vertical scanning, the signal HC1 is initially in the state "0", and thus, the shift registers in the memory are connected in a manner as shown in FIG. 43*a*. In response to the application of the clock signal $C\phi_2$, the contents of the shift register 2403 are read out from the last bit position to be circulated through the switching means 2420 to the first bit position thereof. At the same time, the contents thus read out are transferred through the switching means 2430 and 2410 to the shift register 2400 to be successively written in under in synchronism with the clock signal $C\phi_1$. The contents of the shift register 2400 are also read out from the last bit position in response to the application of the clock signal $C\phi_1$ to be successively written in the shift register 2401. This operation is repeated as 48 pulses of the clock signals $C\phi_1$ and $C\phi_2$ are applied. Thus, at the time at which the signal HC1 is finally turned from the state "0" to "1", the contents of the shift registers 2400, 2401 and 2403 are as shown in FIG. 44*b*.

Figure 43B:
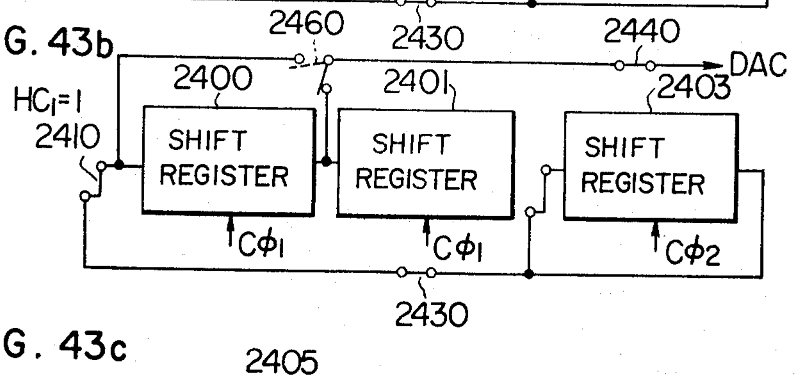

When the signal HC1 is subsequently turned to the state "1", the shift registers in the memory are connected in a manner as shown in FIG. 43*b*. Therefore, as in the case in which the signal HC1 is in the state "0", the contents of the shift register 2403 are read out from the last bit position in response to the application of the clock signal $C\phi_2$ and are circulated through the switching means 2420 to the first bit position thereof. At the same time, the contents of the shift register 2403 thus read out are transferred through the switching means 2430 and 2410 to the shift register 2400 to be successively written therein in synchronism with the clock signal $C\phi_1$. Further, the contents of the shift register 2400 are also read out from the last bit position in response to the application of the clock signal $C\phi_1$ to be successively written in the shift register 2401. This operation is repeated, and at the time at which the signal HC1 is finally turned from the state "1" to "0", the contents of the shift registers 2400, 2401 and 2403 are as shown in FIG. 44*c*.

Thereafter, similar operation is repeated depending on whether the signal HC1 is in the state "0" or "1". When the signal HC1 is in the state "0", the gate means 2460 is changed over by the pulse signals KP48 and $\overline{\text{KP48}}$ in a manner as shown in FIG. 43*a* so that the contents of the shift registers 2400 and 2401 are alternately applied to the D-A converter 407 through the gate means 2460. On the other hand, when the signal HC1 is in the state "1", the gate means 2460 is changed over by the pulse signals KP48 and $\overline{\text{KP48}}$ in a manner as shown in FIG. 43*b* so that the contents of the shift registers 2403 and 2400 are alternately applied to the D-A converter 407 through the gate means 2460. The digital signal applied to the D-A converter 407 is subjected to D-A conversion and the analog signal thus obtained is displayed on the monitoring television set 408.

Such operation is repeated until the contents of the shift register 2403 make one complete circulation. In this manner, all the picture information of one frame recorded in the shift register 2403 can be completely read out. The picture signal read out by the repetition of a series of operations as above described is displayed on the monitoring television set 408 as a still picture.

c. Card engraving mode (WDF = "0", MCF = "1")

Figure 43C:
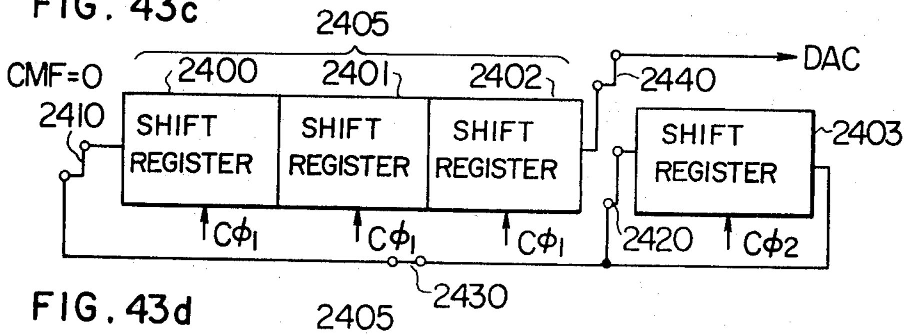
Figure 43D:
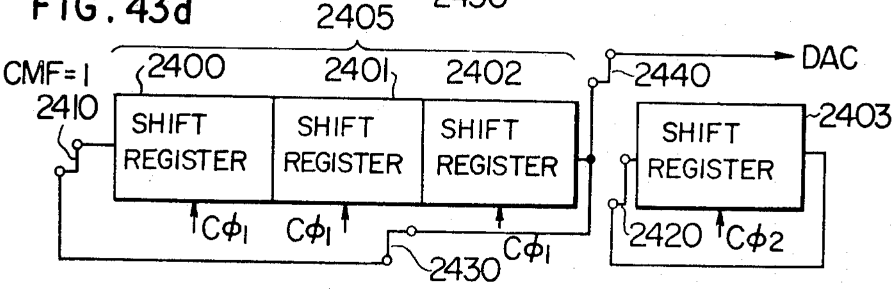

The NAND gates 2412 and 2413 in the switching means 2410, the NAND gates 2422 and 2423 in the switching means 2420, and the NAND gates 2442 and 2443 in the switching means 2440 are in the open position since the signal WDF is in the state "0" and the signal MCF is in the state "1". Therefore, the shift registers in the memory are connected in a manner as shown in FIG. 43*c* when the signal CMF is in the state "0" and in a manner as shown in FIG. 43*d* when the signal CMF is in the state "1", and the three shift registers 2400, 2401 and 2402 act as a single register 2405 as shown. The memory clock signals $C\phi_1$ and $C\phi_2$ have waveforms as shown in FIGS. 38*e* and 36*j* respectively.

During the period of time in which the signal CMF is in the state "0" when the cutting tool in the card engraving unit 411 is in the returned position, the contents of the shift register 2403 are read out with the timing of the memory clock signal $C\phi_2$ to be circulated through the switching means 2420, and at the same time, to be transferred to the shift register 2405 through the switching means 2430 and 2410. The memory clock signal $C\phi_1$ for the shift register 2405 is generated when the output of the card counter 1910 coincides with the output of the horizontal division counter 1206 in the state in which the signal CMF is in the state "0" as described previously. Thus, one pulse of the clock signal $C\phi_1$ is applied to the shift register 2405 during each of the horizontal scanning periods for the odd-numbered and even-numbered lines in the signal successively read out from the shift register 2403. After this operation is repeated 116 times, the picture signal portion corresponding to one lengthwise line of the picture is stored in the shift register 2405.

Then, when the signal CMF is turned to the state "1" and the cutting tool is moved downward toward the card to start engraving, the shift registers in the memory are connected in a manner as shown in FIG. 43*d* and the contents of the shift register 2403 circulate in response to the application of the clock signal $C\phi_2$. On the other hand, the contents of the shift register 2405 are read out in response to the application of the clock signal $C\phi_1$. This clock signal $C\phi_1$ includes 116 pulse sets each consisting of 115 pulses as shown in FIG. 38*e*. Therefore, in response to the application of the first pulse in the pulse set of 115 pulses, the content in the last bit position of the shift register 2405 is read out to be applied to the D-A converter 407 through the switching means 2440, and at the same time, this content is circulated to the first bit position thereof through the switching means 2430 and 2410. Then, in response to the application of the succeeding 114 pulses, the contents of the shift register 2405 are successively circulated. After the above manner of circulation is carried out 115 times, similar operation is done in response to the application of the next set of 115 pulses and the contents of the shift register 2405 are read out. The contents read out from the shift register 2405 are successively applied to the D-A converter 407 to be subjected to D-A conversion and the analog signal thus obtained is applied to the card engraving unit 411 so that the picture can be engraved on the card while controlling to cutting depth or depth of engraving depending on the amplitude of the analog signal as will be described in detail later. This manner of readout is repeated 116 times in response to the successive application of the 116 pulse sets each consisting of 115 pulses, and the picture signal portion corresponding to one lengthwise line of the picture is completely read out to be engraved on the card.

Subsequently, the signal CMF is turned to the state "0" again, and the picture signal portion corresponding to another vertical line of the picture is stored in the shift register 2405. This stored picture signal portion is read out from the shift register 2405 to be engraved on the card during the subsequent period of time in which the signal CMF is turned to the state "1". In this manner, lengthwise engraving is carried out 96 times in response to the successive application of 96 pulses of the signal CMF to complete engraving of one frame.

In the embodiment above described, the contents of the shift register 2405 are read out while shifting such contents 115 times to the right for the reasons described below. In the present invention, the picture signal is written in the memory 406 in the order of from above to below as shown on the left-hand side of FIG. 5*d*. Therefore, the picture signal is stored in the shift register 2405 of the memory 406 in a manner as shown in FIG. 45*a*. The numerals in FIG. 45*a* designate the order of scanning of the lines by the television camera 402 when counted from the uppermost horizontal scanning line. Thus, when they are successively read out from the right-hand end of FIG. 45*a*, they are read out in order of 1, 2, 3, 4, . . . . 115, 116 and this is entirely the same as the order of scanning by the television camera 402.

However, the picture is engraved on the card from below to above as shown on the right-hand side of FIG. 5*d*. Therefore, engraving must be carried out in the order of 116, 115, 114, . . . . 3, 2, 1. In order to carry out this manner of engraving, the contents of the shift register 2405 may be shifted 115 times to the right as shown in FIGS. 45*b* and 45*c* after reading out one of the contents stored in the shift register 405 shown in FIG. 45*a*.

Further, as described with reference to FIG. 35, the engraving picture gate signal VDCL does not appear until four pulses of the engraving operation instructing signal $\overline{O}$LST are counted and until four pulses of the engraving position instructing signal CDCK2 are counted after the appearance of the signal CMF. The picture signal is not applied to the cutting tool driving means during the period of time in which the engraving picture gate signal VDCL does not appear. However, in this period of time, the engraving operation is carried out by the 4-pulse portion of the signal OLST and by the portion of the signal CMF corresponding to the 4-pulse portion of the signal CDCK2. In this case, the cutting depth is maximum and the white base is exposed. Such a manner of engraving is required in order to prevent an undesirable situation such that portions of the colored plastic film 32 on the card blank 30 may be left non-engraved to leave colored frame portions due to possible displacement of the colored plastic film 32 from the predetermined position.

As described hereinbefore the operation speed of the shift registers 2400, 2401 and 2402 are determined by the clock pulse $C\phi_1$ and the clock pulse $C\phi_1$ contains 48 pulses in 1H period of time. On the other hand, the number of sampling in 1H period of time in 96 and the sampling frequency is 3.2 MHz. Accordingly, the frequency of the clock pulse $C\phi_1$ is 1.6 MHz and thus there is no problem for the operation of the shift registers in such a frequency. Owing to the employment of such a clock pulse frequency, a visible image displayed on the monitoring television set has the same magnification with respect to the length and the width of the visible image, and hence the visible image is an exactly magnified image of the picture to be engraved.

6. D-A converter 407

The D-A converter 407 converts the digital signal applied from the memory 406 into an analog signal and applies this analog signal to the monitoring television set 408 and to the card engraving unit 411. FIG. 46 shows the structure of the D-A converter 407 employed in the second embodiment.

The outputs of the individual memory units constituting the memory 406 are applied through input terminals 3136 to 3140 and inverters 3141 to 3145 to NAND gates 3131 to 3135 respectively. The signals VDCL and MCF are also applied to these NAND gates 3131 to 3135 through a NAND gate and an inverter. The outputs of the NAND gates 3131 to 3135 are applied to input terminals $D_1$ to $D_5$ of five D-type flip-flops 3101 to 3105 respectively. Therefore, when the engraving picture gate signal VDCL is in the state "0" in the card engraving mode in which the signal MCF is in the state "1", the outputs of all of the flip-flops 3101 3105 are in the state "1", and the output of an emitter follower transistor circuit 3117, to which the outputs of these flip-flops are applied through resistors 3106 to 3116, is a constant signal having a maximum level. In this case, therefore, the cutting depth or depth engraved by the cutting tool in the card engraving unit 411 is maximum and the white base is exposed.

In the case in which the engraving picture gate signal VDCL is in the state "1", the output signals of the individual memory units constituting the memory 406 are applied to the input terminals $D_1$ to $D_5$ of the flip-flops 3101 to 3105 respectively. The outputs of these flip-flops 3101 to 3105 are applied to the emitter follower transistor circuit 3117 while being superposed on one another by the resistors 3106 to 3116, and the output of the emitter follower transistor circuit 3117 is applied to the card engraving unit 411 through an integrator 3119.

When the signal MCF is in the state "0", that is, in the continuous write mode and one-frame write mode, the engraving picture gate signal VDCL is inactive for the flip-flops 3101 to 3105 and the signal MP96 is applied to resetting terminals of these flip-flops for resetting same during the period of time in which no picture signal is applied.

The output of the resistor 3116 is applied to another emitter follower transistor circuit 3118, and the output of this emitter follower transistor circuit 3118 is applied to the monitoring television set 408 after it is combined in a transistor circuit 3127 with the synchronizing signal $H_T + V_T$ applied through a NAND gate 3125 and an inverter 3126.

In this manner, the cutting tool in the card engraving unit 411 engraves the picture on the card while the depth of engraving with the cutting tool is successively varied depending on the amplitude of the analog signal applied to the cutting tool driving means. At the same time, the picture signal being engraved can be observed on the monitoring television set 408.

A gate circuit 3120 determines the timing of application of the outputs of the memory 406 to the flip-flops 3101 to 3105. More precisely, due to the fact that the signal MCF is in the state "0" in the continuous write mode and one-frame write mode, a NAND gate 3122 is in the closed position and NAND gates 3121 and 3123 are in the open position so that the signal P96 is applied to triggering input terminals $T_1$ to $T_5$ of the flip-flops 3101 to 3105 and the memory outputs are applied with the timing of the signal P96. On the other hand, the signal MCF is in the state "1" in the card engraving mode. Thus, the NAND gate 3121 is in the closed position and the NAND gates 3122 and 3123 are in the open position so that the card clock signal CDCK2 is applied to the triggering input terminals $T_1$ to $T_5$ of the respective flip-flops 3101 to 3105. Therefore, the outputs of the memory 406 are applied with the timing of the card clock signal CDCK2. The integrator 3119 has a time constant ($\tau$) of the order of 1.3 m sec so as to remove undesirable noises from the picture signal and improves the quality of the picture.

In the second embodiment above described, the direction of scanning by the television camera 402 and the direction of engraving on the card differ entirely from each other as seen in FIG. 5*d*. However, these directions are in no way limited to those illustrated in FIG. 5*d* and any other desired directions may be selected. For example, the scanning and engraving orders and directions may be as shown in FIGS. 30*a* to 30*h*.

In the second embodiment, due to the fact that the synchronizing pulses are suitably adjusted and the clock pulse signal used for picture signal sampling can be selected easily to have a frequency of about 3.2 MHz in order that the picture displayed on the monitoring television set can be exactly analogous to the engraved picture in both the longitudinal and lateral directions, the picture displayed on the monitoring television set is not oblong unlike that in the first embodiment and the picture exactly analogous to that engraved on the card can be monitored. Further, the input signal range to the A-D converter can be simply adjusted due to the fact that zero level adjustment is unnecessary in the A-D conversion of the picture signal.

In the case in which the card blank or the colored plastic film on the card blank is displaced relative to the predetermined card mounting position on the card engraving unit, engraving of the picture on the colored plastic film may be started at a position different from the predetermined starting position and portions of the colored plastic film may be left non-engraved to provide colored frame portions around the engraved picture. A suitable means for preventing such an undesirable situation is provided in the present invention so that a satisfactory engraved picture free from such colored frame portions can be always obtained.

The system of the present invention having many features and advantages as above described can easily and reliably make various cards such as including identification cards and credit cards within a very short period of time. Further, the picture thus recorded on the card is fully endurable against wear.

What we claim is:

1. An electronic engraving and recording system comprising:

image pickup means for picking up the image of an object and for converting the image into corresponding electric signals, sampling pulse generating means for generating sampling pulses, said sampling pulse generating means including a pulse generator for generating clock pulses having a frequency of the order of 3 MHz, gating means for gating said clock pulses at intervals of *n* pulses, where *n* is an integer between 2 and 8, and counting means for counting said clock pulses and producing signals which detect the completion of one horizontal scanning, one vertical scanning and *m* vertical scannings, where *m* is an integer equal to n/2or $n + 1/2$, sampling means for sampling the output of said image pickup means under the control of said sampling pulses until said *m* vertical scanning detecting signal is produced, analog-to-digital converting means coupled to said sampling means for converting the sampled signal into a digital signal, memory means connected to said analog-to-digital converting means for storing the digital signals from said analog-to-digital converting means, digital-to-analog converting means for converting the output signal from said memory means into an analog signal, display means connected to said digital-to-analog converting means for displaying the output of said digital-to-analog converting means as a visible image, and engraving means associated with said memory means for engraving the image of an object on a card plate in accordance with the output signal from said memory means.

2. A system according to claim 1, wherein said memory means is a digital memory and includes a first shift register for storing signals contained in one widthwise line of a picture image to be engraved, a second shift register for storing signals contained in one lengthwise line of the picture image to be engraved, said second shift register being in cooperative relationship with said first shift register, and a third shift register for storing signals contained in one frame of the picture image to be engraved.

3. A system according to claim 1, wherein said memory means is a digital memory which includes a first shift register for storing one half of the signals contained in one widthwise line of a picture image to be engraved, a second shift register for storing the other half of the signals contained in one widthwise line of the picture image to be engraved, a third shift register for storing signals contained in one lengthwise line of the picture image to be engraved, said third shift register being in cooperative relationship with said first and second shift registers, and a fourth shift register for storing signals contained in one frame of th picture image to be engraved.

4. A system according to claim 1, wherein said sampling pulse generating means includes a synchronizing signal generating circuit for enlarging the synchronizing signal from said image pickup means, a memory gate control circuit for producing gate pulses to store said digital signals in said memory means, a memory clock control circuit for producing clock pulses to read out digital signals stored in said memory means, and a control signal generating circuit for generating signals to control said memory gate control circuit and memory clock control circuit, and for generating pulses to drive said sampling and analog-to-digital converting means.

5. A system according to claim 1, wherein said analog-to-digital converting means includes an overflow detecting circuit, said overflow detecting circuit detecting an overflowing input to said analog-to-digital converting circuit and driving the output of said analog-to-digital converting means to zero level when said memory means is continuously storing and reading out said digital signals.

6. A system according to claim 1, wherein *n* is an even number larger than 2, and said gating means has a means for gating said clock pulses in different phases when said one vertical scanning detecting signal is produced.

7. A system according to claim 6, wherein *n* is 8.

8. A system according to claim 1, further comprising:

a synchronizing signal reshaping circuit for enlarging the width of the synchronizing signal from said image pickup means, said synchronizing signal reshaping circuit constituting electric signal selecting means for selecting an electric signal to be engraved with said sampling pulse generating means.

9. A system according to claim 1, further comprising:

a memory gate control circuit connected to said counting means for producing gate pulses to store said digital signals in said memory means; and a memory clock control circuit connected to said sampling pulse generating means for producing clock pulses to read out digital signals stored in said memory means, said memory clock control circuit including signal producing means for producing a signal to selectively take out the picture signal from said memory means, said signal producing means including a counter for producing a signal which determines a linear place to be engraved on the card plate, a coincident circuit connected to said counter and a horizontal division counter in said sampling pulse generating means.

10. A system according to claim 9, wherein said memory clock control circuit includes a colored frame preventing circuit, said colored frame preventing circuit comprising:

a first counter for counting signals for controlling the card engraving position, a second counter for counting signals for controlling the engraving of one vertical line of the picture, and a gate circuit connected to said first and second counter for producing an engraving picture gate signal.

11. A system according to claim 1, wherein said counting means comprises:

a first counter for assigning in one horizontal scanning period a predetermined number of pulses from said pulse generator and for producing a signal which detects the completion of one horizontal scanning, said number corresponding to a number of picture elements to be engraved, a second counter for counting the detection signal of the completion of one horizontal scanning supplied by said first counter and for producing a signal which detects the completion of one vertical scanning, and a third counter for counting the detection signal of the completion of one vertical scanning supplied by said second counter and for detecting the completion of taking in of information of the whole one frame.

* * * * *